United States Patent
Kim et al.

(10) Patent No.: US 11,219,032 B2
(45) Date of Patent: Jan. 4, 2022

(54) METHOD AND APPARATUS FOR PERFORMING FUNCTION OF RADIO ACCESS NETWORK

(71) Applicant: SAMSUNG ELECTRONICS CO., LTD., Suwon-si (KR)

(72) Inventors: Joonghoon Kim, Suwon-si (KR); Jihun Ha, Suwon-si (KR); Hanna Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/880,183

(22) Filed: May 21, 2020

(65) Prior Publication Data

US 2020/0383115 A1 Dec. 3, 2020

(30) Foreign Application Priority Data

May 28, 2019 (KR) .................. 10-2019-0062789
Jul. 31, 2019 (KR) .................. 10-2019-0093433
Sep. 27, 2019 (KR) .................. 10-2019-0119826

(51) Int. Cl.
*H04W 72/08* (2009.01)
*H04L 12/24* (2006.01)
(Continued)

(52) U.S. Cl.
CPC ............ *H04W 72/08* (2013.01); *G06F 9/505* (2013.01); *G06F 2009/4557* (2013.01); *H04L 41/0893* (2013.01); *H04L 41/0896* (2013.01)

(58) Field of Classification Search
CPC ......... G06F 9/5077; G06F 2009/45595; G06F 9/5016; G06F 9/505; H04L 41/0896;
(Continued)

(56) References Cited

U.S. PATENT DOCUMENTS

| 8,948,774 | B2 | 2/2015 | Capdevielle et al. |
| 9,729,396 | B2 | 8/2017 | Rosa de Sousa Teixeira et al. |

(Continued)

FOREIGN PATENT DOCUMENTS

| EP | 3 013 095 A1 | 4/2016 |
| EP | 3 282 359 A1 | 2/2018 |

(Continued)

OTHER PUBLICATIONS

European Search Report dated Jul. 20, 2020 for EP Application No. 20168368.7.
(Continued)

*Primary Examiner* — Margaret G Mastrodonato
(74) *Attorney, Agent, or Firm* — Nixon & Vanderhye P.C.

(57) ABSTRACT

Provided are a method and apparatus for performing a radio access network (RAN) function in a wireless communication system. A server performing a radio access network (RAN) function may obtain traffic processing information about a plurality of base stations (BSs) connected to the server, may obtain information about traffic according to each of service types to occur in the plurality of BSs, based on the traffic processing information and pre-configured service type information, and may adjust at least one of a resource or the number of software components (SCs) to virtualize at least one RAN function in the server, based on the information about the traffic according to each of the service types to occur in the plurality of BSs.

19 Claims, 25 Drawing Sheets

(51) Int. Cl.
*G06F 9/455* (2018.01)
*G06F 9/50* (2006.01)

(58) Field of Classification Search
CPC ............. H04L 41/0893; H04L 41/0803; H04L 41/0816; H04L 41/5025; H04L 41/5054; H04L 41/5096; H04L 43/0876; H04W 72/08
See application file for complete search history.

(56) References Cited

U.S. PATENT DOCUMENTS

| | | | |
|---|---|---|---|
| 10,405,254 B2 | 9/2019 | Salem et al. | |
| 2007/0072645 A1 | 3/2007 | Clark et al. | |
| 2007/0133468 A1 | 6/2007 | Hara | |
| 2010/0150076 A1 | 6/2010 | Nakata | |
| 2015/0358248 A1* | 12/2015 | Saha | H04L 47/12 709/226 |
| 2016/0050104 A1* | 2/2016 | Wackerly | H04L 45/74 370/220 |
| 2016/0057732 A1 | 2/2016 | Li et al. | |
| 2016/0100330 A1 | 4/2016 | Broustis et al. | |
| 2016/0255613 A1* | 9/2016 | Faerber | H04W 16/10 370/330 |
| 2016/0353465 A1 | 12/2016 | Vrzic et al. | |
| 2017/0244607 A1* | 8/2017 | Dujodwala | H04L 12/42 |
| 2017/0264500 A1* | 9/2017 | Koizumi | G06F 9/505 |
| 2017/0295066 A1* | 10/2017 | Ellis | H04L 49/70 |
| 2019/0042297 A1* | 2/2019 | Connor | G06F 9/5077 |

FOREIGN PATENT DOCUMENTS

| | | |
|---|---|---|
| KR | 10-2007-0052019 | 5/2007 |
| KR | 10-1461372 | 11/2014 |
| KR | 10-1884708 | 8/2018 |
| KR | 10-2018-0108940 | 10/2018 |
| KR | 10-2018-0125739 | 11/2018 |
| KR | 10-2016683 | 8/2019 |
| WO | WO 2015/133078 | 11/2015 |
| WO | WO 2017/074486 | 5/2017 |

OTHER PUBLICATIONS

European Search Report dated Sep. 8, 2020 for EP Application No. 20175935.4.
International Search Report and Written Opinion dated Sep. 11, 2020 for PCT/KR2020/006830, 11 pgs.
International Search Report and Written Opinion dated Aug. 28, 2020 for PCT/KR2020/006842, 8 pgs.
Sun et al., "Based Station Popularity-Based Dynamic Resource Allocation for VNF", 2019 $2^{nd}$ International Conference on Communication Engineering and Technology, 7 pgs.
Rakovic et al., "Dynamic Virtual Resource Allocation in Virtualized Multi-RAT Cellular Networks". Wireless Pers Commun(2017), 16pgs.
Garcia-Saavedra, "Joint Optimization of Edge Computing Architectures and Radio Access Networks", IEEE Journal on Selected Areas in Communications, vol. 36, No. 11, Nov. 2018, 11pgs.

* cited by examiner

METHOD AND APPARATUS FOR PERFORMING FUNCTION OF RADIO ACCESS NETWORK

CROSS-REFERENCE TO RELATED APPLICATIONS

This application is based on and claims priority under 35 U.S.C. § 119 to Korean Patent Application Nos. 10-2019-0062789, filed on May 28, 2019, 10-2019-0093433, filed on Jul. 31, 2019, and 10-2019-0119826, filed on Sep. 27, 2019, in the Korean Intellectual Property Office, the disclosures of which are incorporated by reference herein in their entireties.

BACKGROUND

1. Field

The disclosure relates to a method and apparatus for performing a radio access network (RAN) function.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication systems such as sensor networks, machine-to-machine (M2M) communication, machine-type communication (MTC), or the like are implemented by using techniques including beamforming, multiple-input and multiple-output (MIMO), array antennas, or the like. Application of cloud radio access network (Cloud-RAN) as the above-described big data processing technology may be an example of convergence of 5G communication technology and IoT technology.

Because various technologies can be applied due to the aforementioned technical features and the development of wireless communication systems, methods for efficiently managing a RAN by using such various technologies are desired.

SUMMARY

Embodiments of the disclosure provide a method and apparatus for performing a radio access network (RAN) function in a wireless communication system.

Additional aspects will be set forth in part in the description which follows and, in part, will be apparent from the description.

According to an example embodiment of the disclosure, a method of performing, by a server, a radio access network (RAN) function includes: obtaining traffic processing information about a plurality of base stations (BSs) which may be connected to the server; obtaining information about traffic according to each of service types to occur in the plurality of BSs, based on the traffic processing information and pre-configured service type information; and adjusting at least one of a resource or the number of software components (SCs), to virtualize at least one RAN function in the server, based on the information about the traffic according to each of the service types to occur in the plurality of BSs.

The traffic processing information may include information about traffic occurred in the plurality of BSs during at least one time period, and information about a resource used in processing the traffic.

The obtaining of the traffic processing information may include receiving the traffic processing information from the plurality of BSs or an external device connected to the server.

The service types may be classified according to at least one capability from among a data transmission rate, latency, and a maximum connection density that are requested for each of services.

The adjusting may include increasing the number of the SCs when an amount of the traffic to occur in the plurality of BSs is to increase, and decreasing the number of the SCs when an amount of the traffic to occur in the plurality of BSs is to decrease.

The adjusting may include adjusting the number of the SCs in a unit of a package including a plurality of SCs.

The obtaining of the information about the traffic to occur may include: identifying a pattern of an amount of traffic occurred in each of the service types, based on the traffic processing information; and obtaining information about traffic to occur in a particular service type, based on the pattern of the amount of the traffic.

The adjusting may include, when an amount of traffic to occur in a particular service type is increased, increasing a resource of a SC to perform a RAN function corresponding to the particular service type, and when an amount of traffic to occur in the particular service type is decreased, decreasing the resource of the SC to perform the RAN function corresponding to the particular service type.

The RAN function may include at least one of a physical (PHY) layer function, a medium access control (MAC) layer function, a radio link control (RLC) layer function, or a packet data convergence protocol (PDCP) layer function.

The SC may include at least one of a container or a virtual machine (VM).

According to an example embodiment of the disclosure, a server performing a radio access network (RAN) function includes a transceiver including transceiving circuitry; a memory storing one or more instructions; and at least one processor configured to execute the one or more instructions stored in the memory to obtain traffic processing information about a plurality of base stations (BSs) which may be connected to the server, obtain information about traffic according to each of service types to occur in the plurality of BSs, based on the traffic processing information and pre-configured service type information, and adjust at least one of a resource or the number of software components (SCs), to virtualize at least one RAN function in the server, based on the information about the traffic according to each of the service types to occur in the plurality of BSs.

According to an example embodiment of the disclosure, a computer program product including a computer-readable recording medium having recorded thereon a program by which a server performs a method of performing a radio access network (RAN) function, the method including: obtaining traffic processing information about a plurality of base stations (BSs) which may be connected to the server; obtaining information about traffic according to each of service types to occur in the plurality of BSs, based on the traffic processing information and pre-configured service type information; and adjusting a resource and/or the number of software components (SCs), to virtualize a RAN function in the server, based on the information about the traffic according to each of the service types to occur in the plurality of BSs.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
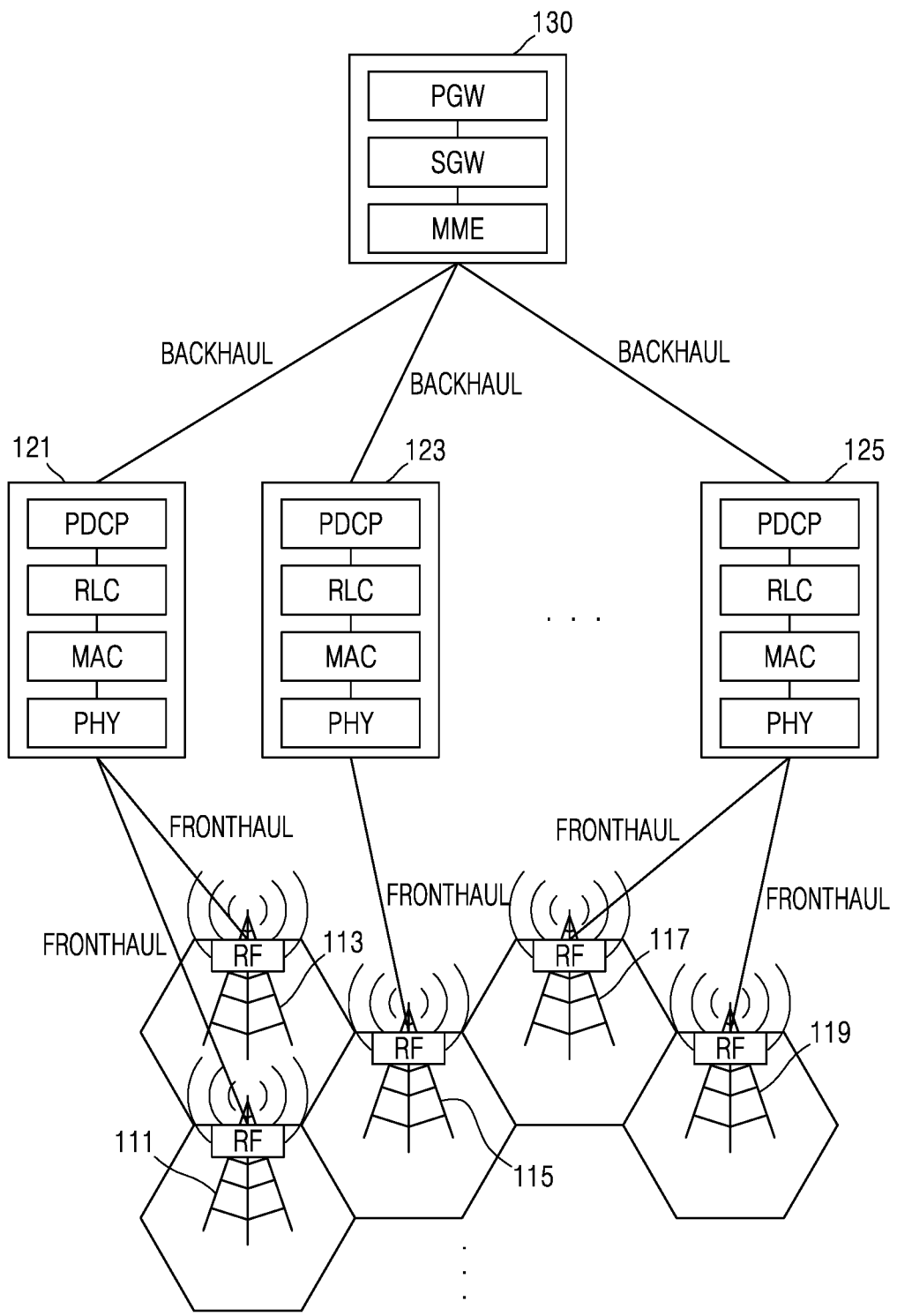
FIG. 1 is a diagram illustrating an example structure of a centralized/cloud radio access network (cRAN)

Example embodiments of the disclosure will now be described in greater detail with reference to the accompanying drawings. In the following description, descriptions of techniques that are well known in the art and not directly related to the disclosure may be omitted to clearly convey the gist of the disclosure.

Some elements in the drawings may be exaggerated, omitted, or schematically illustrated. The size of each element does not entirely reflect the actual size. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as being limited to embodiments set forth herein. In the disclosure, the same elements are denoted by the same reference numerals.

Throughout the disclosure, the expression "at least one of a, b or c" indicates only a, only b, only c, both a and b, both a and c, both b and c, all of a, b, and c, or variations thereof. Throughout the disclosure, the expression a "or" b may mean both a and b, either one of a and b, or variations thereof.

Examples of a terminal may include, for example, a user equipment (UE), a mobile station (MS), a cellular phone, a smartphone, a computer, a multimedia system capable of performing a communication function, or the like.

In the disclosure, a controller may also be referred to as a processor.

Throughout the disclosure, a layer (or a layer apparatus) may also be referred to as an entity.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in the disclosure may refer, for example, to a software or hardware component, such as field-programmable gate array (FPGA) or application-specific integrated circuit (ASIC), which performs certain tasks. However, the term "unit" is not limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in an embodiment of the disclosure.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-A, and LTE-Pro of the 3GPP, high rate packet data (HRPD) and ultra mobile broadband (UMB) of 3GPP2, 802.16e of the Institute of Electrical and Electronic Engineers (IEEE), or the like. As a next generation wireless communication system, $5^{th}$ generation (5G) or new radio (NR) wireless communication systems are being established.

In the next generation wireless communication system, at least one of services including enhanced Mobile BroadBand (eMBB), massive Machine Type Communications (mMTC), and Ultra-Reliable and Low-Latency Communications (URLLC) may be provided to the UE. The forementioned services may be classified according to at least one capability from among a data transmission rate, latency, and a maximum connection density that are requested for each of services. The services may be provided to a same UE or different UEs during a same time period. The eMBB service may be for high-speed transmission of high-volume data, the mMTC service may be for minimization of power of the terminal and accesses by multiple terminals, and the URLLC service may be for high reliability and low latency, but the disclosure is not limited thereto. The services may be primary services in a wireless communication system such as an LTE system or a 5G or new radio/next radio (NR) system after the LTE system.

For convenience of description, in the disclosure, terms and names or modifications of the terms and names defined in the 3rd Generation Partnership Project Long Term Evolution (3GPP LTE) standard are used therein. However, the disclosure is not limited to these terms and names, and may be equally applied to wireless communication systems conforming to other standards. For example, although 5G (or NR) systems are mentioned as examples in the following description, embodiments of the disclosure may also be applied to other wireless communication systems having similar technical backgrounds or channel types. As another example, embodiments of the disclosure may be applied to a LTE or LTE-A system which is a wireless communication system before the NR system, and furthermore, embodiments of the disclosure may be applied to a wireless communication system to be developed after the NR system. Furthermore, embodiments of the disclosure may be applied to other wireless communication systems through partial modifications at the discretion of one of ordinary skill in the art without greatly departing from the scope of the disclosure.

Hereinafter, terms identifying an access node, terms indicating network entities, terms indicating messages, terms indicating an interface between network entities, and terms indicating various pieces of identification information, as used in the following description, are used for convenience of explanation. Accordingly, the disclosure is not limited to terms to be described below, and other terms indicating objects having equal technical meanings may be used.

In the disclosure, a base station (BS) is an entity that allocates resources to a terminal, and may be at least one of a gNode B, an eNode B, a Node B, a base station (BS), a radio access unit, a BS controller, or a node on a network In the disclosure, a terminal may include, for example, and without limitation, a UE, a MS, a cellular phone, a smartphone, a computer, a multimedia system capable of performing a communication function, or the like.

In the disclosure, a cell may refer, for example, to an area covered by one BS in wireless communication. The cell may be classified into a mega cell, a macro cell, a micro cell, or a pico cell, based on a size of the cell, but this is merely an example and types of the cell are not limited thereto.

In the disclosure, a downlink (DL) may refer, for example, to a wireless transmission path of a signal transmitted from a BS to a UE, and an uplink (UL) is a wireless transmission path of a signal transmitted from a UE to a BS. For example, as a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link through which a UE (also referred to as a terminal) or an MS transmits data or a control signal to a BS (e.g., eNB), and the DL refers to a radio link through which a BS transmits data or a control signal to a UE.

FIG. 1 illustrates a diagram for describing a structure of a centralized/cloud radio access network (cRAN).

Referring to FIG. 1, in the cRAN, a radio transceiver (also referred to as a radio unit (RU)) and a data processor (also referred to as a data unit (DU)) used to be included in a BS according to the related art are now separate, and thus the radio transceiver is positioned in a BS 111 of a cell site, and the data processor (e.g., a data processor 121) may be positioned in a central server. A cell corresponds to an area covered by a BS in a wireless communication system, and at least one cell may exist for each BS. Unlike an integrated BS where both a radio transceiver and a data processor exist in a cell site, in the cRAN, radio transceivers may be positioned in BSs 111, 113, 115, 117, and 119 of the cell site, and data processors 121, 123, and 125 may be gathered to perform at least some functions among RAN functions. Descriptions of the RAN functions will be provided at a later time. The cRAN may gather and manage the data processors 121, 123, and 125, thereby easily adjusting interference between cells and providing a service including coordinated multi-point transmission and reception (CoMP) or the like.

The BSs 111, 113, 115, 117, and 119 of the respective cell sites may each include a radio frequency (RF) device or the like, and may deliver a signal to a data processor (e.g., the data processor 121) through a fronthaul. The fronthaul indicates a network portion that connects the BSs 111 and 113 of the cell site to a data processor (e.g., the data processor 121), and may perform digital signal processing (DSP), power amplification, a filtering function, or the like.

A data processor (e.g., the data processor 121) may process a signal received from a BS (e.g., the BS 111) of the cell site, and may deliver the processed signal to a core network device 130 through a backhaul. The core network device 130 may include devices that connect an end-to-end system consisting of a BS and a UE. For example, the core network device 130 may include a packet data network gateway (P-GW), a serving gateway (S-GW), a mobile management entity (MME), or the like. The P-GW may connect an internal node of a core network with external internet, may configure an Internet Protocol (IP) address to a UE, and may perform IP packet filtering. The S-GW may buffer a DL packet received from external internet, when radio resource control (RRC) connection is not configured in the UE. The MME may process a control signal related to location registration, authentication, and calls of the UE. However, this is a merely an example, and a configuration of the core network device 130 is not limited to the aforementioned example.

A backhaul indicates a network portion that connects a data processor (e.g., the data processor 121) to the core network device 130 and may be implemented as a wired interface such as an optical fiber, but this is merely an example, and the backhaul may be implemented as a wireless network.

A data processor (e.g., the data processor 121) may perform various RAN functions for processing signals. The RAN functions may include a packet data convergence protocol (PDCP) layer function, a radio link control (RLC) layer function, a medium access control (MAC) layer function, and a physical (PHY) layer function, but this is merely an example and thus, the RAN functions are not limited thereto. Hereinafter, the PDCP layer function, the RLC layer function, the MAC layer function, and the PHY layer function will now be described.

The PDCP layer function may include at least some functions among functions below.

Header compression and decompression: robust header compression (ROHC) only

Transfer of user data

In-sequence delivery of upper layer protocol data units (PDUs)

PDCP PDU reordering

Duplicate detection of lower layer service data units (SDUs))

Retransmission of PDCP SDUs

Ciphering and deciphering

Timer-based SDU discard in UL.

The reordering function of the PDCP layer may include at least one of a function of reordering PDCP PDUs received from a lower layer, on a PDCP sequence number (SN) basis, a function of delivering the reordered data to an upper layer in order, a function of recording missing PDCP PDUs by reordering the received PDCP PDUs, a function of reporting status information about the missing PDCP PDUs to a transmitter, or a function of requesting to retransmit the missing PDCP PDUs.

The RLC layer function may include at least some functions among functions below.

Transfer of upper layer PDUs
In-sequence delivery of upper layer PDUs
Out-of-sequence delivery of upper layer PDUs
Error Correction through automatic repeat request (ARQ)
Concatenation, segmentation and reassembly of RLC SDUs
Re-segmentation of RLC data
Reordering of RLC data
Duplicate detection
Protocol error detection
RLC SDU discard
RLC re-establishment The in-sequence delivery function of the RLC layer may include a function of delivering RLC SDUs received from a lower layer, to an upper layer in order, and a function of reassembling the RLC SDUs and delivering the reassembled RLC SDU when a plurality of RLC SDUs segmented from one RLC SDU are received. The in-sequence delivery function may also include a function of reordering received RLC PDUs on a RLC SN or PDCP SN basis, a function of recording missing RLC PDUs by reordering the received RLC PDUs, and a function of reporting status information about the missing RLC PDUs to a transmitter. The in-sequence delivery function may also include a function of requesting to retransmit the missing RLC PDUs, and a function of delivering only RLC SDUs prior to a missing RLC SDU, to an upper layer in order when the missing RLC SDU exists. The in-sequence delivery function may also include a function of delivering all RLC SDUs received before a timer starts, to an upper layer in order although a missing RLC SDU exists when a certain timer expires, or a function of delivering all RLC SDUs received so far, to an upper layer in order although a missing RLC SDU exists when a certain timer expires.

The RLC layer may process RLC PDUs in order of reception, regardless of SNs, and may deliver the RLC PDUs to the PDCP layer. When a segment is received, the RLC layer may reassemble the segment with other segments stored in a buffer or subsequently received, into a whole RLC PDU and may deliver the RLC PDU to the PDCP layer. In a NR system, the RLC layer may not have a concatenation function, and the concatenation function may be performed by the MAC layer or may be replaced with a multiplexing function of the MAC layer.

The MAC layer function may include at least some functions among functions below.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The PHY layer may perform at least some functions among functions below.

Transmission and reception of data by using an electrical signal
Channel coding/decoding function
Modulation/demodulation function
Power control
Cell search The PHY layer may perform channel coding and modulation on data of an upper layer, may generate an OFDM symbol thereof, and may transmit the OFDM symbol through a wireless channel. Also, the PHY layer may perform demodulation and channel decoding on an OFDM symbol received through a wireless channel, and may deliver data obtained therefrom to an upper layer.

A BS (e.g., the BS 111) of the cell site may be described by using terms such as a RU, a remote radio head (RRH), or the like, and a data processor (e.g., the data processor 121) may be described by using terms such as a DU, a base band unit (BBU), or the like.

To gather and manage the data processors 121, 123, and 125 that perform the aforementioned RAN functions, there may be provided a method of efficiently using physical resources for data processing. To this end, the disclosure provides a method of performing, through virtualization, one or more RAN functions performed by the data processors 121, 123, and 125. The virtualization refer to a technology of extending a resource, which was usable by one device, by integrating and managing a plurality of physical resources. Hereinafter, with reference to FIGS. 2 and 3, examples of a virtualized RAN (vRAN) according to the disclosure will now be described.

Figure 2:
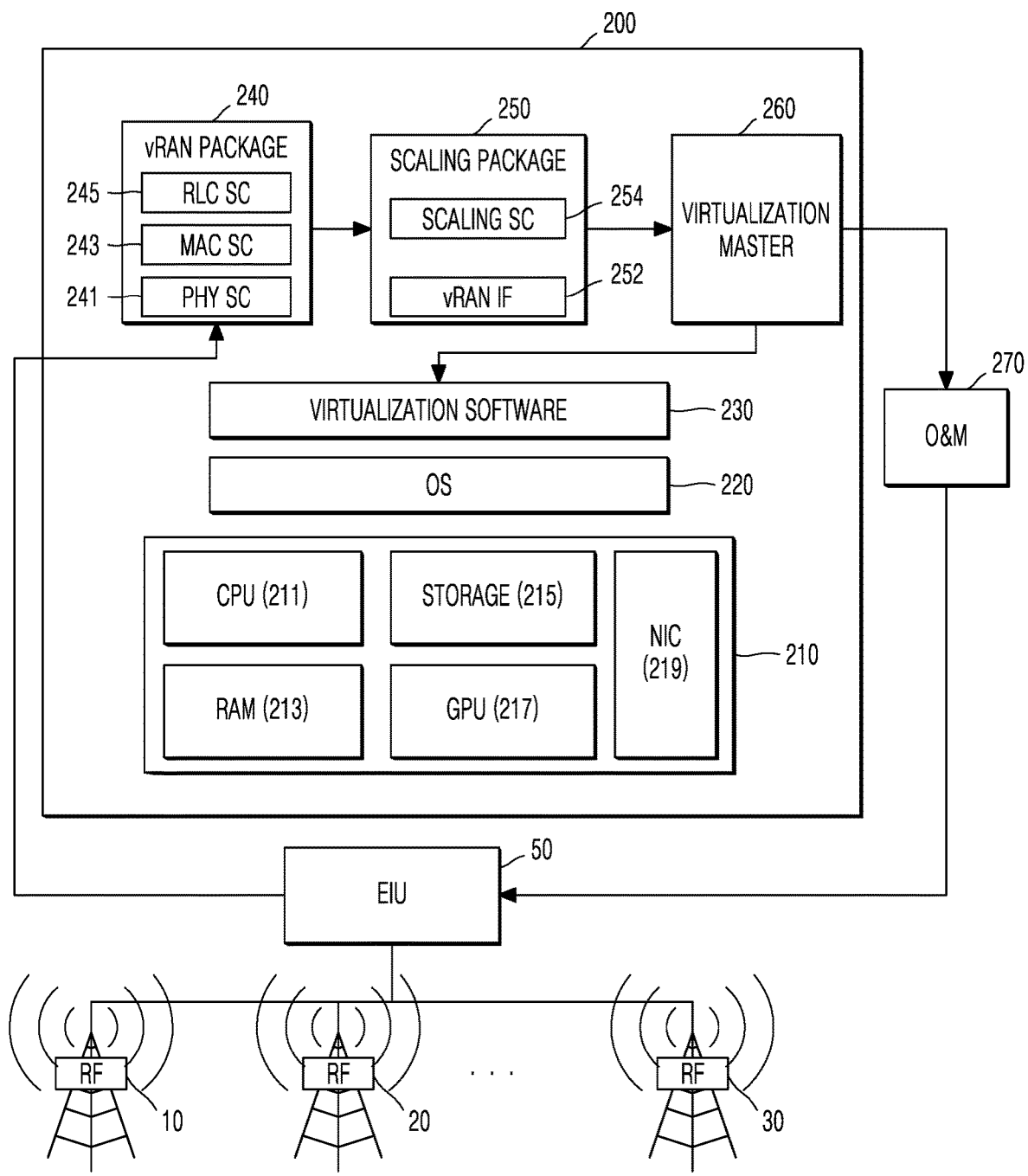
FIG. 2 is a diagram illustrating an example RAN virtualization method, according to an embodiment of the disclosure.

FIG. 2 is a diagram for describing a RAN virtualization method, according to an embodiment of the disclosure.

Referring to FIG. 2, a server 200 may include hardware 210 capable of driving software for performing a vRAN function. The hardware 210 may include a central processing unit (CPU) 211, a random access memory (RAM) 213, a storage 215, a graphics processing unit (GPU) 217, and a network interface controller (NIC) 219, but this is merely an example, and elements of the hardware 210 are not limited thereto. The storage 215 may include a hard disk drive (HDD), a solid-state drive (SDD), or the like.

One operating system (OS) 220 may operate in the hardware 210. The OS 220 may manage software (e.g., virtualization software 230) that is executed in the hardware 210 and the server 200.

The virtualization software 230 may logically divide a resource managed by the OS 220, and may allow a plurality of software components (SCs) to share the logically divided resource. The resource is an item used for a vRAN package 240 to process traffic. For example, the resource may include one or more of the CPU 211, the RAM 213, the storage 215, the GPU 217, or the like, but this is merely an example, and examples of the resource are not limited thereto. The logical division of the resource may be performed by distributing, through a switch, a physical communication line connecting the resource to the plurality of SCs. A SC indicates a component to be used as a separate server by gathering libraries or applications that are used to perform a particular function, and may be generated or removed in a unit of a package. The package is a minimum unit that shares one IP and may include one or more SCs. An example of the virtualization software 230 may include Kubernetes, and the SC may correspond to a container of the Kubernetes. Each of 240, 241, 243, 245, 250, 252, 254, 260, and 270 may be included in or may be implemented by at least one processor (e.g., see 311) and/or corresponding memory, including circuitry.

According to an embodiment of the disclosure, the SC may be used to perform a network function of the vRAN. Hereinafter, operations of the server 200 to implement the vRAN will now be described in detail.

The server 200 may be connected ("connected" may refer to, for example, one or more of operatively connected, electrically connected, and/or communicatively connected) to a plurality of BSs 10, 20, and 30 (see also BSs 111-119 in FIG. 1) of respective cell sites via an Ethernet interface unit (EIU) 50. The server may include at least one processor. The EIU 50 is a portion of a path connecting the server 200 to the plurality of BSs 10, 20, and 30 of the cell sites, and for example, traffic of a BS may be delivered to the vRAN package 240 via the EIU 50. Also, as another example, information about the vRAN package 240 to which the plurality of BSs 10, 20, and 30 of the cell sites are allocated may be delivered via the EIU 50.

According to an embodiment of the disclosure, the server 200 may perform at least some functions among RAN functions used to be performed by a data processor of an integrated BS. Here, the data processor may correspond to the data processor described above with reference to FIG. 1. Accordingly, a radio transceiver including a RF device may exist in each of the plurality of BSs 10, 20, and 30, and the RAN functions except for functions performed by the plurality of BSs 10, 20, and 30 may be performed by the server 200. For example, a PHY SC 241, a MAC SC 243, and a RLC SC 245 may be generated in the server 200, and the PHY SC 241, the MAC SC 243, and the RLC SC 245 may respectively perform the PHY layer function, the MAC layer function, and the RLC layer function. However, this is merely an example, and RAN functions performed by the server 200 are not limited thereto. Other examples will be described below with reference to FIG. 5.

According to an embodiment of the disclosure, the PHY SC 241, the MAC SC 243, and the RLC SC 245 may be included in one vRAN package 240, or multiple vRAN packages. The vRAN package 240 is a minimum unit that may include one or more SCs, each performing a RAN function. The vRAN package 240 may be configured so as to include instructions for allowing RAN functions to be virtualized and then performed, the RAN functions being used to be performed by a hardware device according to the related art, and an SC may be removed or generated in a unit of the vRAN package 240.

The vRAN package 240 may obtain traffic processing information about traffic which has occurred in the plurality of BSs 10, 20, and 30. Here, the traffic refers to a data flow passing through a communication network in a predefined time. According to an embodiment of the disclosure, the traffic may include a data flow between a UE and a BS (e.g., the BS 10), and may be indicated as a data transmission rate per unit time. The traffic processing information indicates information about a procedure of processing traffic, based on a RAN function. The traffic processing information may include traffic information about traffic occurred in a plurality of BSs, and resource information about a resource used in processing the traffic occurred in the plurality of BSs. The traffic information is information capable of directly or indirectly indicating an amount and a characteristic of the traffic. The traffic information may include a traffic processing speed (e.g., bps) per cell, the number of terminals connected to a BS, a bandwidth allocated to the BS, a spectrum sharing ratio between different wireless communication technologies, or the like. As another example, the traffic information may include a type of a service causing the traffic, a frequency band in which the traffic occurred, a type of a wireless communication system (e.g., an NR or an LTE) in which the traffic occurred, or the like. The resource information may directly or indirectly indicate a physical resource used in processing the traffic. The resource information may include a ratio of a CPU core to CPU cores allocated to a vRAN package, the CPU core being used in processing the traffic, the number of clock cycles used in processing the traffic, compared to a largest CPU core clock cycle, a size of a memory allocated to the vRAN package so as to process the traffic, or the like. However, this is merely an example, and examples of the traffic information or the resource information are not limited thereto.

The traffic processing information may be received by the vRAN package 240 via the EIU 50 from the plurality of BSs 10, 20, and 30, and according to another embodiment of the disclosure, the traffic processing information may be received from the OS 220 in the server 200 or another external device. For example, the traffic information in the traffic processing information may be received from the plurality of BSs 10, 20, and 30. Also, the resource information in the traffic processing information may be received from the OS 220 in the server 200. However, this is merely an example, and a method, performed by the vRAN package 240, of receiving the traffic processing information is not limited thereto. As another example, the traffic processing information may be obtained as a result of applying, by the vRAN package 240, a statistics method (e.g., an average, variance, or the like) to pre-obtained traffic processing information. The vRAN package 240 may deliver the obtained traffic processing information to a scaling package 250.

The scaling package 250 may comprise a group of instructions for controlling the number of SCs (e.g., a SC 241 and a resource allocated to the SCs (e.g., the SC 241) included in the vRAN package 240. The scaling package 250 may include a vRAN interface (vRAN IF) 252 and a scaling SC 254. The vRAN IF 252 may receive the traffic processing information from the vRAN package 240. As another example, the vRAN IF 252 may obtain, from an external device, information about an event predicted to cause a change in the traffic. For example, the vRAN IF 252 may obtain the information about the event via a core network device. The event corresponds to a reason that causes the change in the traffic with respect to a plurality of BSs.

The scaling SC 254 may obtain, based on the traffic processing information, information about traffic to occur in the plurality of BSs 10, 20, and 30. The information about traffic to occur in the plurality of BSs 10, 20, and 30 is information that directly or indirectly indicates an amount and a characteristic of the traffic predicted to occur in the plurality of BSs 10, 20, and 30. The information about traffic to occur in the plurality of BSs 10, 20, and 30 may include at least one of a predicted traffic processing speed (e.g., bps) per cell, the predicted number of terminals to be connected to a BS, a predicted bandwidth to be allocated to the BS, a spectrum sharing ratio between different wireless communication technologies, or the like. As another example, the information about traffic to occur in the plurality of BSs 10, 20, and 30 may include a predicted type of a service to cause the traffic, a frequency band in which the traffic is predicted to occur, a type of a wireless communication system (e.g., an NR or an LTE) in which the traffic is predicted to occur, or the like.

A method by which the scaling SC 254 predicts, based on the traffic processing information, traffic to occur in the plurality of BSs 10, 20, and 30 will be described below with reference to FIG. 8. Also, the scaling SC 254 may determine whether to adjust at least one of the number of SCs or a resource of the SC, based on the information about traffic to occur in the plurality of BSs 10, 20, and 30. In the disclosure, an operation of increasing an amount of a resource to be allocated to the SC is described as "scale up", and an operation of decreasing an amount of a resource to be allocated to the SC is described as "scale down". An operation of increasing the number of the SCs is described as "scale out", and an operation of decreasing the number of the SCs is described as "scale in". The scale up, scale down, scale out, and scale in that are described above may be collectively described as scaling.

When the scaling SC 254 determines to adjust at least one of the number of the SCs or the resource to be allocated to each SC, the scaling SC 254 may deliver a scaling command based on the determination to a virtualization master 260. The virtualization master 260 indicates a system that controls the vRAN package 240. The virtualization master 260 may be positioned in the server 200, and according to another embodiment of the disclosure, the virtualization master 260 may be positioned in a device other than the server 200, such as in another processor and/or another server. The virtualization master 260 may deliver the scaling command to the virtualization software 230, and may update and store vRAN package information changed in response to the scaling command. Also, the virtualization master 260 may deliver the updated vRAN package information to an operation and maintenance (O&M) 270. The O&M 270 is a device for controlling a traffic congestion level on a user plane of a UE. In a present embodiment of the disclosure, it is illustrated that the O&M 270 is located in the outside of the sever 200, but this is merely an example, and thus according to another embodiment of the disclosure, the O&M 270 may be positioned in the server 200.

In consideration of an adjusted vRAN package, the O&M 270 may command the EIU 50 to allocate traffic to each of vRAN packages, the traffic occurring in the plurality of BSs 10, 20, and 30. Accordingly, traffic received from at least one of the plurality of BSs 10, 20, and 30 may be newly allocated to the adjusted vRAN package.

The aforementioned RAN virtualization method may be merely an example of implementing a vRAN in the disclosure, and thus another virtualization method may be used. For example, a hypervisor-based virtualization method may be used to implement a vRAN, and this method will now be described with reference to FIG. 3.

Figure 3:
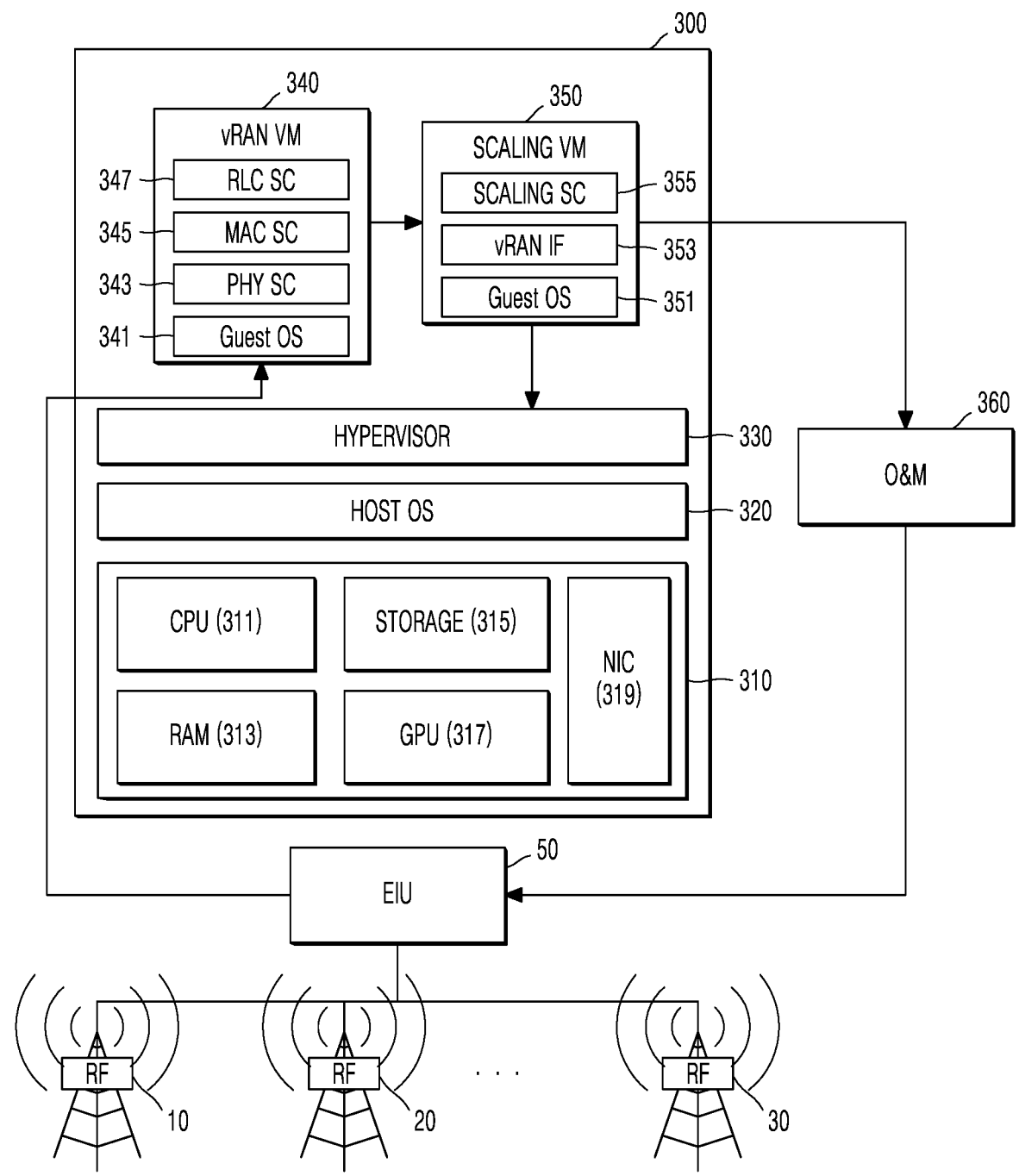
FIG. 3 is a diagram illustrating an example RAN virtualization method, according to another embodiment of the disclosure.

FIG. 3 is a diagram for describing a RAN virtualization method, according to another embodiment of the disclosure.

Referring to FIG. 3, a server 300 may include hardware 310 capable of driving software for performing a vRAN function. The hardware 310 may include a CPU 311, a RAM 313, a storage 315, a GPU 317, and a NIC 319, but this is merely an example, and elements of the hardware 310 are not limited thereto. The storage 315 may include a HDD, a SDD, or the like. Hereinafter, descriptions about elements of FIG. 3 which correspond to those of FIG. 2 are not provided.

In the hypervisor-based virtualization method, a host OS 320 and at least one guest OS 341 may be driven. The host OS 320 is an OS that manages software (e.g., a hypervisor 330) that is executed in the hardware 310 and the server 300. The guest OS 341 is an OS that is positioned in a vRAN virtual machine (vRAN VM) 340. The hypervisor 330 is software that divides an OS of the server 300 (e.g., the host OS 320) from the hardware 310. However, according to another embodiment of the disclosure, the hypervisor 330 may be embodied as a physical device. Also, the hypervisor 330 may drive a VM in the hardware 310. For example, the hypervisor 330 may help the vRAN VM 340 to execute and manage the guest OS 341. That is, unlike the container-based virtualization method, in the hypervisor-based virtualization method, a plurality of OSs may be executed. Also, the hypervisor 330 may distribute a resource (e.g., the RAM 313, the CPU 311, or the like) of the hardware 310 to VMs.

According to an embodiment of the disclosure, a method of performing a RAN function may involve implementing a vRAN by generating VMs respectively performing the aforementioned RAN functions.

According to an embodiment of the disclosure, the vRAN VM 340 may include the guest OS 341, a PHY SC 343, a MAC SC 345, and an RLC SC 347, and operations of the vRAN VM 340 may correspond to operations of the vRAN package 240 described above with reference to FIG. 2. Each of 340, 341, 343, 345, 347, 350, 351, 353, 355, and 370 may be included in or may be implemented by at least one processor and/or corresponding memory, including circuitry (e.g., see 310).

A SC may be used to have a same meaning as a VM process in the hypervisor-based virtualization method. According to an embodiment of the disclosure, a scaling VM 350 may include a guest OS 351, a vRAN IF 353, and a scaling SC 355. The guest OS 351 of the scaling VM 350 may be the same type as the guest OS 341 of the vRAN VM 340, but this is merely an example, and a different OS type may be used. Operations of the scaling VM 350 may correspond to operations of the scaling package 250 described above with reference to FIG. 2. However, when the scaling VM 350 determines to adjust at least one of the number of a plurality of the vRAN VMs 340 or a resource allocated to the vRAN VM 340, the scaling VM 350 may deliver a command therefor to the hypervisor 330. Also, the scaling VM 350 may deliver updated vRAN package information to an O&M 360.

Figure 4A:
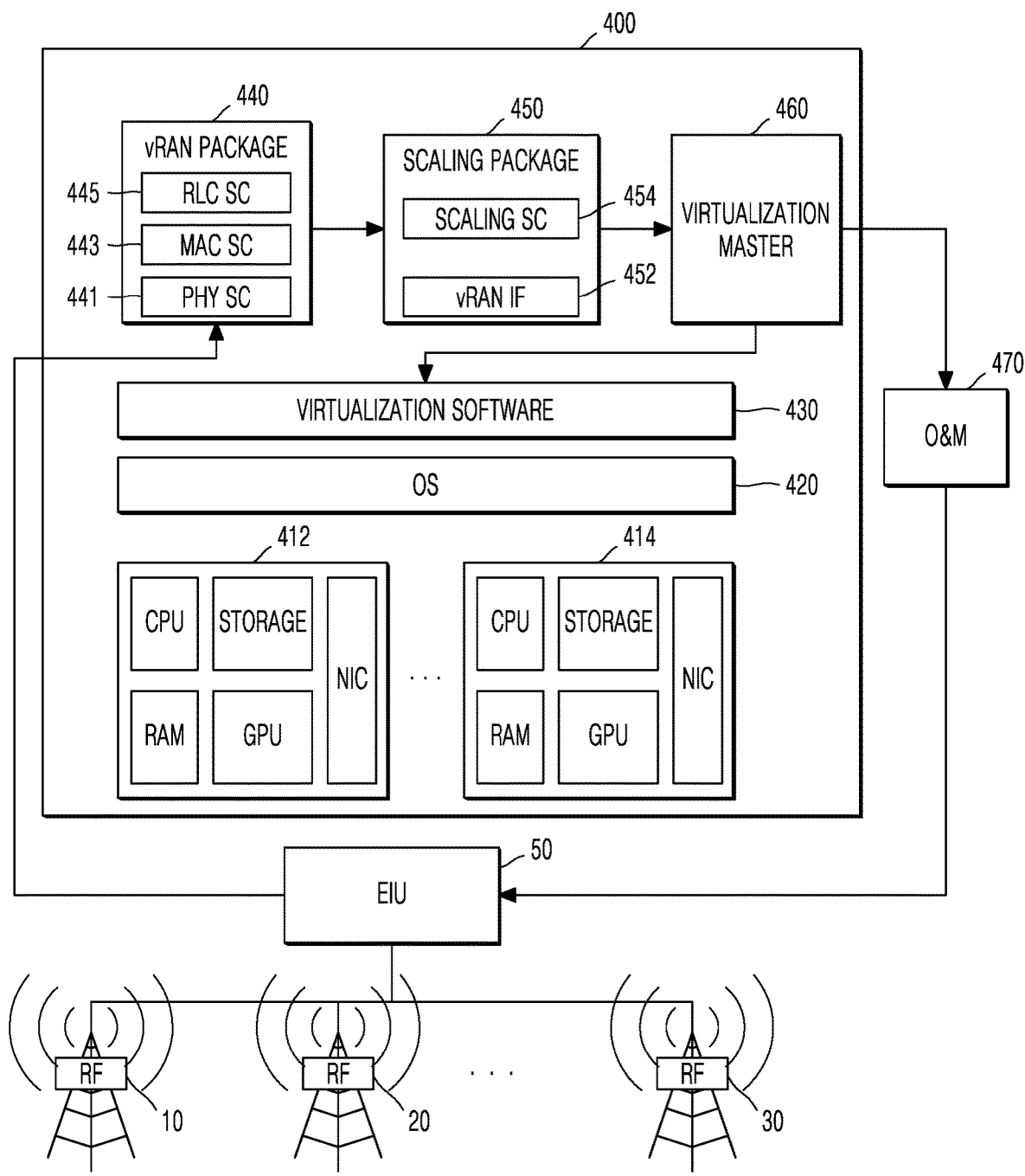
FIG. 4A is a diagram illustrating example resource allocation for traffic processing by a virtualized RAN (vRAN), according to an embodiment of the disclosure.

FIG. 4A is a diagram for describing resource allocation for traffic processing by a vRAN, according to an embodiment of the disclosure.

Referring to FIG. 4A, a server 400 may include a plurality of items of hardware 412 and 414 capable of driving software for performing a vRAN function. Each of the plurality of items of hardware 412 and 414 may include a CPU, a RAM, a storage, a GPU, and a NIC, but this is merely an example, and elements of the hardware are not limited thereto.

An OS 420 may manage hardware (e.g., the hardware 412) and software (e.g., virtualization software 430) executed in the server 400.

The virtualization software 430 may integrate and manage the plurality of items of hardware 412 and 414 so as to process traffic. The virtualization software 430 may be stored in hardware (e.g., the hardware 412) in which a vRAN package 440 is stored, or may be stored in hardware (e.g., the hardware 414) in which the vRAN package 440 is not stored.

Hereinafter, a method of allocating resources of the plurality of items of hardware 412 and 414 to the vRAN package 440 so as to process traffic of the plurality of BSs 10, 20, and 30 will be described in detail. In the present embodiment of the disclosure, a CPU included in each of the plurality of items of hardware 412 and 414 may have 20 cores, a RAM may have a capacity of 512 gigabytes (GB), and a storage may have a capacity of 1 terabytes (TB).

According to an embodiment of the disclosure, 10 cores from among all cores, 50 GB of RAM, and 500 GB of storage may be allocated to the vRAN package 440, according to initial setting. For example, 4 cores of the 10 cores may be allocated to a RLC SC 445, 3 cores may be allocated to a MAC SC 443, and 3 cores may be allocated to a PHY SC 441. 20 GB of 50 GB of RAM may be allocated to the RLC SC 445, 15 GB may be allocated to the MAC SC 443, and 15 GB may be allocated to the PHY SC 441. Also, 200 GB of 500 GB of storage may be allocated to the RLC SC 445, 150 GB may be allocated to the MAC SC 443, and 150 GB may be allocated to the PHY SC 441.

The vRAN package 440 may process traffic occurred in the plurality of BSs 10, 20, and 30, based on the allocated resource. Also, the vRAN package 440 may deliver traffic processing information to a vRAN IF 452.

The vRAN IF 452 may deliver the traffic processing information to a scaling SC 454. The scaling SC 454 may obtain, based on the traffic processing information, information about traffic to occur in the plurality of BSs 10, 20, and 30. According to an embodiment of the disclosure, the scaling SC 454 may obtain information about traffic to occur in a target prediction time, based on information about traffic previously occurred in a situation similar to the target prediction time and information about a resource used to process the occurred traffic. For example, when the target prediction time is an office-going hour, the scaling SC 454 may confirm that traffic previously occurred in the plurality of BSs 10, 20, and 30 in the office-going hour was 200 GBps, and a resource to process the traffic was 20 CPU cores and 200 GB of RAM.

Because 10 CPU cores and 200 GB of RAM which are current resources allocated to the vRAN package 440 may be insufficient for resources needed for processing the traffic, the scaling SC 454 may determine to increase a resource to be allocated to the vRAN package 440, or to additionally generate a vRAN package. For example, when a size of a resource that is additionally required is smaller than a preset threshold value, the scaling SC 454 may determine to perform scale up to increase the resource to be allocated to the vRAN package 440. In this case, the scaling SC 454 may request a virtualization master 460 for scale up of the vRAN package 440. Because the scale up request is received from the scaling SC 454, the virtualization master 460 may deliver a scale up command to the virtualization software 430. In response to the scale up command, the virtualization software 430 may increase the resource to be allocated to the vRAN package 440.

As another example, when the size of the resource that is additionally required is equal to or greater than the preset threshold value, the scaling SC 454 may determine to perform scale out to additionally generate the vRAN package 440. In this case, the scaling SC 454 may request the virtualization master 460 for scale out of the vRAN package 440. Because the scale out request is received from the scaling SC 454, the virtualization master 460 may deliver a scale out command to the virtualization software 430.

In response to the scale out command, the virtualization software 430 may additionally generate the vRAN package 440, and may allocate a resource to the additionally generated vRAN package 440. According to an embodiment of the disclosure, the virtualization software 430 may perform resource pinning of configuring a dedicated resource for each vRAN package. The resource pinning according to the disclosure indicates a resource allocation method of allocating a dedicated resource to each system for performing a particular process. The resource pinning may include CPU pinning, or the like.

When the CPU pinning is applied, the plurality of items of hardware 412 and 414 may have a Non-Uniform Memory Access (NUMA) structure in which an independent memory is allocated to each CPU. For example, when the CPU pinning is applied, first to tenth cores may be allocated to the vRAN package 440, and a memory grouped with the first to tenth cores may be allocated thereto. In this regard, a CPU core and a memory grouped with the CPU core may be described as a NUMA node. When the first to tenth cores are allocated to the vRAN package 440, and then a vRAN package is additionally generated, the virtualization software 430 may allocate a core other than the first to tenth cores to the vRAN package that is additionally generated The vRAN package 440 may process traffic by using the CPU core and the memory grouped as the NUMA node, thereby increasing a traffic processing speed. Also, the virtualization software 430 may allocate the CPU core and the memory grouped as the NUMA node to the additionally generated vRAN package, thereby increasing a traffic processing speed. When the CPU core processes the traffic by accessing a memory grouped with another NUMA node, the traffic processing speed may be decreased. However, this is merely an example, and a method by which the virtualization software 430 allocates a resource to the vRAN package 440 is not limited thereto. In another embodiment of the disclosure, when a vRAN package is additionally generated, the virtualization software 430 may allocate at least some portions of a resource to the additionally generated vRAN package, the resource having been allocated to the vRAN package 440, and may allocate another resource to the vRAN package 440.

Also, the virtualization master 460 may notify an O&M 470 of the additional generation of the vRAN package. Based on the additionally generated vRAN package, the O&M 470 may command the EIU 50 to allocate traffic occurring in the plurality of BSs 10, 20, and 30. Accordingly, traffic received from at least one of the plurality of BSs 10, 20, and 30 may be allocated to the additionally generated vRAN package.

Figure 4B:
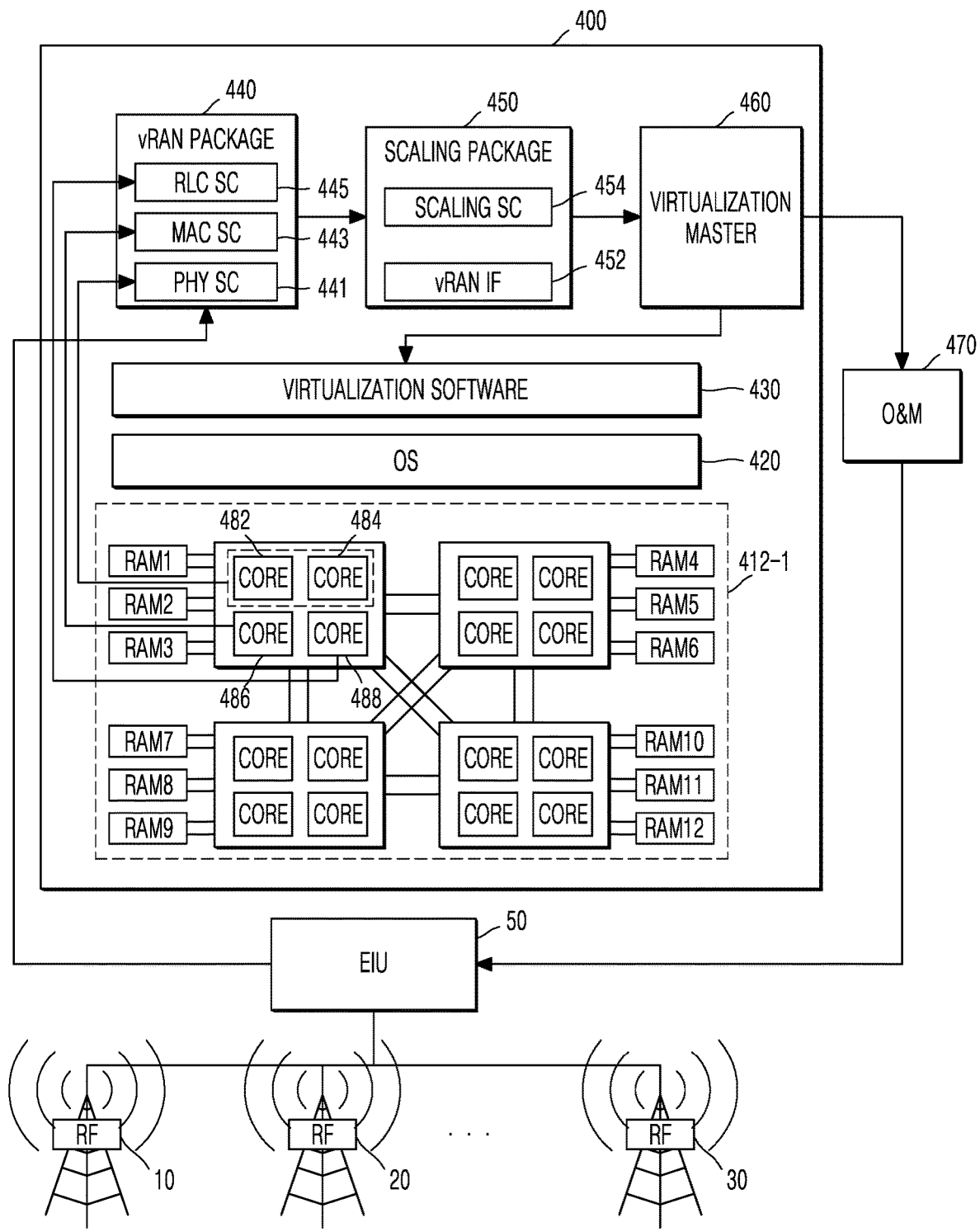
FIG. 4B is a diagram illustrating an example method of performing central processing unit (CPU) pinning during resource allocation for traffic processing by a vRAN, according to an embodiment of the disclosure.

FIG. 4B is a diagram for describing a method of performing CPU pinning during resource allocation for traffic processing by a vRAN, according to an embodiment of the disclosure.

Referring to FIG. 4B, according to an embodiment of the disclosure, a detailed structure 412-1 of the CPU and the RAM of the hardware 412 from among the plurality of items of hardware 412 and 414 of the server 400 described above with reference to FIG. 4A is illustrated. The first hardware 412 may include the storage, the GPU, and the NIC, in addition to the CPU and the RAM, but for convenience of description, elements other than the CPU and the RAM are not illustrated. In addition, descriptions about elements of FIG. 4B which correspond to those of FIG. 4A are not provided.

The virtualization software 430 according to an embodiment of the disclosure may perform resource pinning of allocating a dedicated resource to performing of a particular RAN function. For example, the virtualization software 430 may perform CPU pinning of allocating at least some cores and a RAM connected to the at least some cores to perform a RAN function, the at least some cores being from among cores included in the CPU.

When CPU pinning is applied, the CPU may have a NUMA structure in which an independent memory is allocated to the cores included in the CPU. For example, when CPU pinning is applied, a first core 482 and a second core 484 and RAM areas e.g., RAM 1 and RAM 2) grouped with the first and second cores 482 and 484 may be allocated to the PHY SC 441 included in the vRAN package 440. Also, a third core 486 and a RAM grouped with the third core 486 may be allocated to the MAC SC 443 included in the vRAN package 440. Also, a fourth core 488 and a RAM grouped with the fourth core 488 may be allocated to the RLC SC 445 included in the vRAN package 440.

Each of the PHY SC 441, the MAC SC 443, and the RLC SC 445 may process traffic by using a dedicated CPU core and a memory that are grouped as a NUMA node, thereby increasing a traffic processing speed. Also, the virtualization software 430 may allocate, to an additionally generated vRAN package, a CPU core and a memory that are grouped as a NUMA node, thereby increasing a traffic processing speed.

Figure 5:
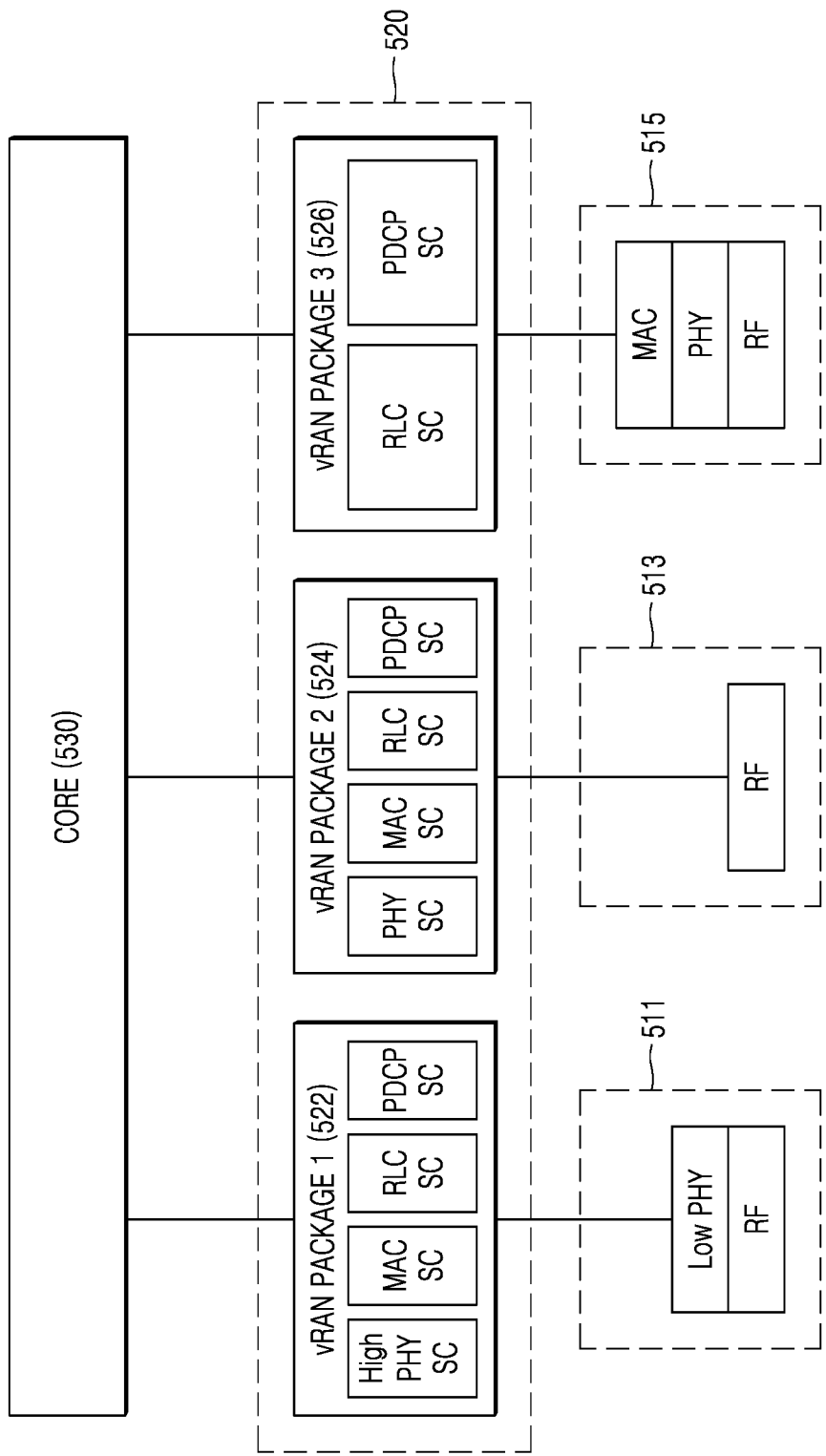
FIG. 5 is a diagram illustrating an example RAN function that may be performed in a server, according to an embodiment of the disclosure.

FIG. 5 is a diagram for describing a RAN function that may be performed in a server 520, according to an example embodiment of the disclosure.

Referring to FIG. 5, a SC configured to perform at least some functions among RAN functions used to be performed by an integrated BS according to the related art may be executed in the server 520. In this regard, the RAN functions may include a PHY layer function, a MAC layer function, a RLC layer function, a PDCP layer function, or the like, and in particular, the PHY layer function may be further divided into a low PHY layer function and a high PHY layer function. However, this is merely an example, and other layer functions may also be further divided.

A dividing time point of the RAN functions may be determined based on an amount of traffic processable by the server 520, a capability of a fronthaul connecting a BS 511 (also referred to as the first BS 511) to the server 520, a capability of a backhaul connecting the server 520 to a core network device 530, or the like.

In a vRAN according to an embodiment of the disclosure, when an amount of traffic occurring in a base station (e.g., the base station 511) of a cell site is greater than a traffic capacity of the fronthaul connecting the base station (e.g., the base station 511) of the cell site to the server 520, a delay or loss may occur due to congestion on the fronthaul while traffic is delivered to the server 520. In this case, unlike to the embodiment of the disclosure described above with reference to FIG. 2, to decrease a load of the fronthaul, the PHY layer function may be divided, and thus, the low PHY layer function may be executed in the first BS 511 of the cell site. Accordingly, a vRAN package 1 522 including a high PHY SC performing the high PHY layer function, a MAC SC performing the MAC layer function, a RLC SC performing the RLC layer function, and a PDCP SC performing the PDCP layer function may be executed in the server 520. The server 520 may include at least one processor, including circuitry, for such execution.

According to another example embodiment of the disclosure, in the vRAN, when the traffic capacity of the fronthaul is greater than an amount of traffic actually occurring in the BS 511, and traffic processing capability of the server 520 is equal to or greater than a certain level, a vRAN package 2 524 including a PHY SC performing the PHY layer function, a MAC SC performing the MAC layer function, a RLC SC performing the RLC layer function, and a PDCP SC performing the PDCP layer function may be executed in the server 520. In this case, a RF entity may be included in a second BS 513 of the cell site.

According to another embodiment of the disclosure, when the traffic capacity of the fronthaul is very low in the vRAN, a vRAN package 3 526 including a RLC SC performing the RLC layer function and a PDCP SC performing the PDCP layer function may be executed in the server 520. In this case, a RF entity, an entity for performing the PHY layer function, and an entity for performing the MAC layer function may be included in a third BS 515 of the cell site, and in this present embodiment of the disclosure, relatively many RAN functions are performed in the third BS 515 of the cell site, and thus, the load of the fronthaul may be decreased.

With respect to various vRAN package structures described with reference to FIG. 5, scaling operations according to an embodiment of the disclosure described with reference to FIGS. 2 to 4 may be applied. Also, at least one of hardware elements or software elements of FIGS. 2 to 4 which are necessary to perform the scaling operations may be equally applied to the various vRAN package structures according to the present embodiment of the disclosure.

Figure 6:
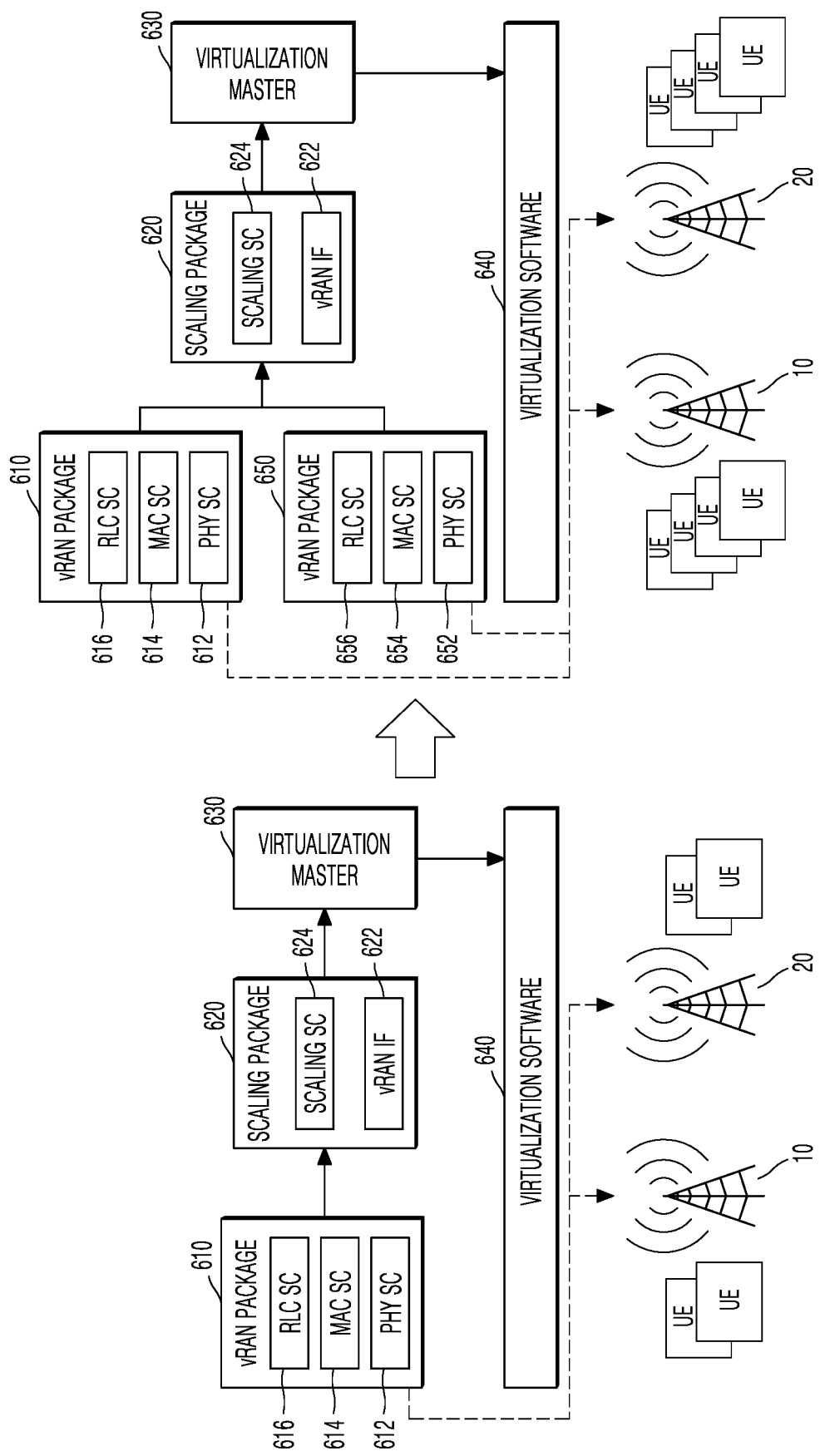
FIG. 6 is a diagram illustrating an example method, performed by a server, of adjusting the number of software components (SCs) when traffic information indicating an increase in traffic of a particular service is received, according to an embodiment of the disclosure.

FIG. 6 is a diagram for describing a method, performed by a server (e.g., see the servers in FIGS. 2-5), of adjusting the number of SCs (e.g., see the SCs in FIGS. 2-5) when traffic information indicating an increase (e.g., actual or predicted increase) in traffic of a particular service is received, according to an embodiment of the disclosure.

Referring to FIG. 6, the server according to an embodiment of the disclosure may drive software for performing a vRAN function through hardware included in the server. In particular, an OS may be driven in the hardware, and may manage the hardware and virtualization software 640 that is executed in the server. Because descriptions of the hardware, the OS, and the virtualization software are the same as those provided with reference to FIG. 2, further descriptions are not provided here.

Hereinafter, to describe a method of increasing, by the server, a vRAN package when an increase in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like.

Traffic occurred in a plurality of BSs 10 and 20 may be delivered to a vRAN package 610. The BSs 10 and 20 may also be referred to as the first and second BSs 10 and 20. A PHY SC 612, a MAC SC 614, and a RLC SC 616 included in the vRAN package 610 may respectively perform a PHY layer function, a MAC layer function, and a RLC layer function on the delivered traffic.

According to an embodiment of the disclosure, a scaling package 620 may include a vRAN IF 622 and a scaling SC 624. The vRAN IF 622 may receive traffic information about the traffic of the plurality of BSs 10 and 20, the traffic being delivered to the vRAN package 610. Also, the vRAN IF 622 may receive information about a resource allocated to the vRAN package 610 so as to process the delivered traffic.

The scaling SC 624 may obtain information about traffic to occur in the plurality of BSs 10 and 20, based on the traffic information received via the vRAN IF 622. For example, the scaling SC 624 may identify a traffic pattern according to each of service types occurred in the plurality of BSs 10 and 20, based on traffic processing information, and thus may predict, based on a result of the identifying, that an amount of traffic to occur in the plurality of BSs 10 and 20 would increase by at least a first threshold value due to an increase in UEs accessing the plurality of BSs 10 and 20 in the t1-t2 period.

Also, the scaling SC 624 may identify resource information from the traffic processing information, the resource information being used in processing pre-occurred traffic. For example, the scaling SC 624 may identify that 5 CPU cores and 50 GB of a RAM memory were used to process traffic A Gbps that previously occurred. Based on the information, when an amount of traffic increases in the t1-t2 period by at least the first threshold value, the scaling SC 624 may identify an amount of a resource that is additionally requested to process the traffic. For example, because the amount of the traffic increases in the t1-t2 period by at least the first threshold value, the scaling SC 624 may identify that 10 CPU cores and 100 GB of the RAM memory are requested to process the traffic.

When traffic increases, a time taken to process the traffic may increase due to an increase in a CPU capacity and a memory capacity of the vRAN package 610 which were previously configured, and such increase in the time may cause a decrease in throughput of the vRAN package 610. According to an embodiment of the disclosure, to prevent or reduce the decrease in throughput, the scaling SC 624 may deliver a scale-out command to a virtualization master 630 so as to increase the number of vRAN packages (and/or SCs) for the t1-t2 period in which traffic is predicted to increase. The virtualization master 630 may deliver the scale-out command to the virtualization software 640, and may update and store vRAN package information that is changed in response to the scale-out command. In response to the scale-out command, the virtualization software 640 may generate a new vRAN package 650 and may allocate a resource(s) to the new vRAN package 650.

The virtualization master 630 may deliver information about the new vRAN package 650 to O&M (not shown). In consideration of the new vRAN package 650, the O&M may determine a vRAN package to process the traffic to occur in the plurality of BSs 10 and 20. For example, traffic of the first BS 10 may be determined to be processed by the existing vRAN package 610, and traffic of the second BS 20 may be determined to be processed by the new vRAN package 650. According to the determination, the O&M may command an EIU (not shown) to allocate the traffic to occur in the plurality of BSs 10 and 20 to each of vRAN packages. Accordingly, the existing vRAN package 610 and the new vRAN package 650 process the traffic, such that the decrease in throughput may be prevented/reduced.

Figure 7:
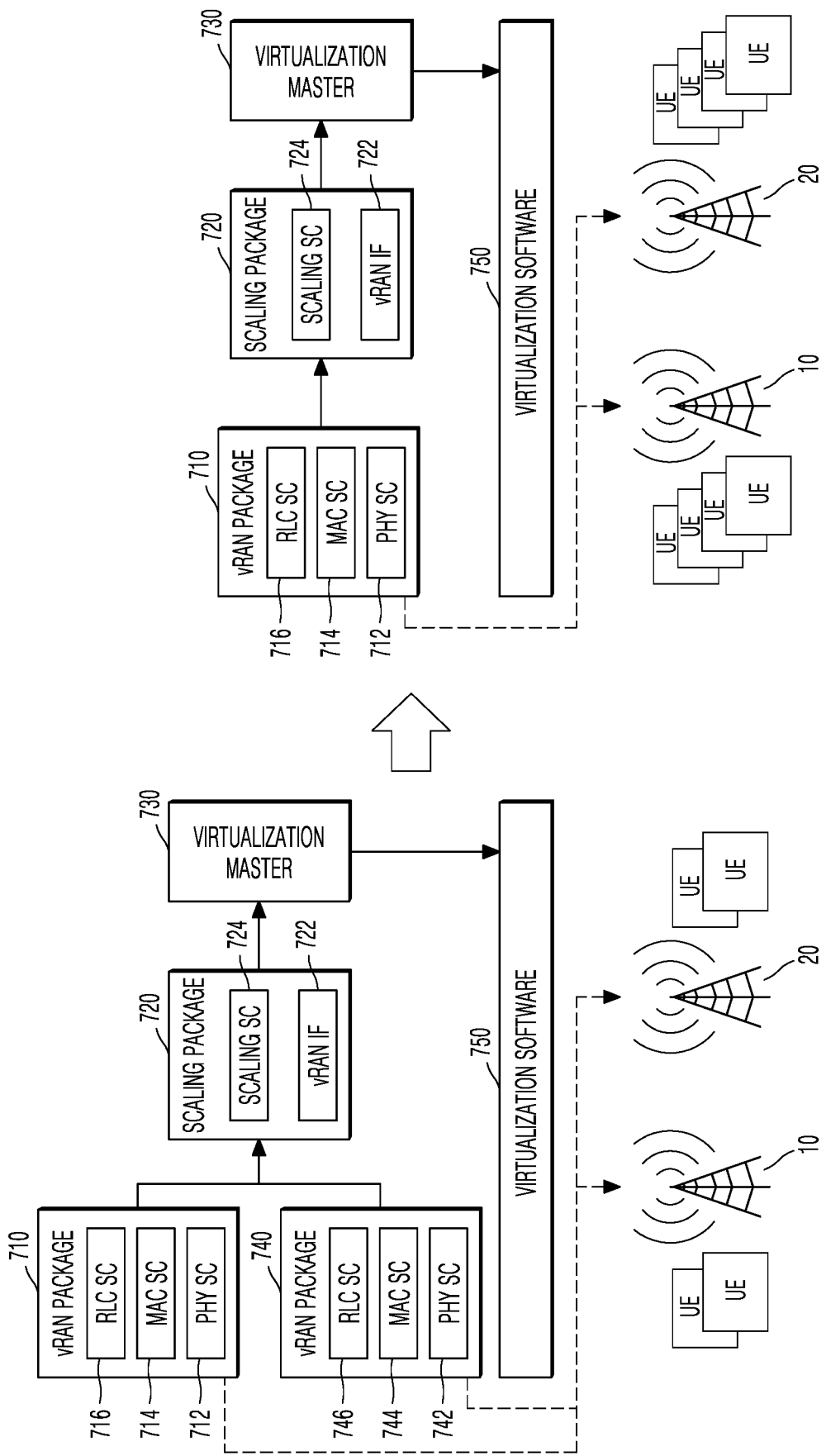
FIG. 7 is a diagram illustrating an example method of adjusting, by a server, the number of SCs when traffic information indicating a decrease in traffic of a particular service is received, according to an embodiment of the disclosure.

FIG. 7 is a diagram for describing a method of adjusting, by a server, the number of SCs when traffic information indicating a decrease (e.g., actual or predicted decrease) in traffic of a particular service is received, according to an embodiment of the disclosure.

Referring to FIG. 7, the server according to an embodiment of the disclosure may drive software for performing a vRAN function through hardware included in the server. In particular, an OS may be driven in the hardware, and may manage the hardware and virtualization software that is executed in the server. Because descriptions of the hardware, the OS, and the virtualization software are the same as those provided with reference to FIG. 2, further descriptions are not provided here.

Hereinafter, to describe a method of decreasing, by the server, a vRAN package when a decrease in traffic is predicted, an operation of each of a plurality of items of software described with reference to FIG. 2 will now be described in detail. In addition, an operation in each software may be performed in a manner that a CPU in the server executes at least one instruction stored in a RAM, a storage, or the like.

Traffic occurred in the plurality of BSs 10 and 20 may be delivered to a plurality of vRAN packages 710 and 740 (also referred to as the first and second vRAN packages 710 and 740). For example, the first vRAN package 710 may receive traffic occurred in the first BS 10, and the second vRAN package 740 may receive traffic occurred in the second BS 20. PHY SCs 712 and 742, MAC SCs 714 and 744, and RLC SCs 716 and 746 respectively included in the plurality of vRAN packages 710 and 740 may each perform a PHY layer function, a MAC layer function, and a RLC layer function on/for the delivered traffic.

According to an embodiment of the disclosure, a scaling package 720 may include a vRAN IF 722 and a scaling SC 724. The vRAN IF 722 may receive traffic information about the traffic of the plurality of BSs 10 and 20, the traffic being delivered to the plurality of vRAN packages 710 and 740. Also, the vRAN IF 722 may receive information about a resource allocated to the plurality of vRAN packages 710 and 740 so as to process the delivered traffic.

The scaling SC 724 may obtain information about traffic to occur in the plurality of BSs 10 and 20, based on the traffic information received via the vRAN IF 722.

For example, the scaling SC 724 may identify the traffic occurred in the plurality of BSs 10 and 20, based on traffic processing information, and thus may predict, based on a result of the identifying, that an amount of traffic to occur in the plurality of BSs 10 and 20 would decrease by at least a second threshold value due to a decrease in UEs accessing the plurality of BSs 10 and 20 in a t3-t4 period.

When traffic decreases, traffic processing may be available without deterioration in preset capabilities of the first vRAN package 710 and the second vRAN package 740, but, because traffic that is processable by one vRAN package is processed by the plurality of vRAN packages 710 and 740, a resource such as a CPU, a memory, a GPU, or the like allocated to a vRAN package may be wasted. Accordingly, when the scaling SC 724 determines that traffic processing may be available in the t3-t4 period by one vRAN package without capability deterioration, the scaling SC 724 may deliver a scale-in command to a virtualization master 730 so as to control one of the first vRAN package 710 and the second vRAN package 740 to be removed at a t3 time or within a certain time from the t3 time. The virtualization master 730 may deliver the scale-in command to virtualization software 750, and may update and store vRAN package information that is changed in response to the scale-in command. In response to the scale-in command, the virtualization software 750 may remove the second vRAN package 740 from among the plurality of vRAN packages 710 and 740.

The virtualization master 730 may deliver information about the removed second vRAN package 740 to O&M (not shown). In consideration of the removed second vRAN package 740, the O&M may determine a vRAN package to process the traffic to occur in the plurality of BSs 10 and 20. For example, the traffic of the plurality of BSs 10 and 20 may be determined to be processed by the first vRAN package 710. According to the determination, the O&M may command an EIU (not shown) to allocate the traffic to occur in the plurality of BSs 10 and 20 to each of vRAN packages. Accordingly, according to an embodiment of the disclosure, the scaling package 720 may decrease the number of vRAN packages in a traffic decrease period and thus may prevent/reduce a resource of the server from being unnecessarily wasted.

Figure 8:
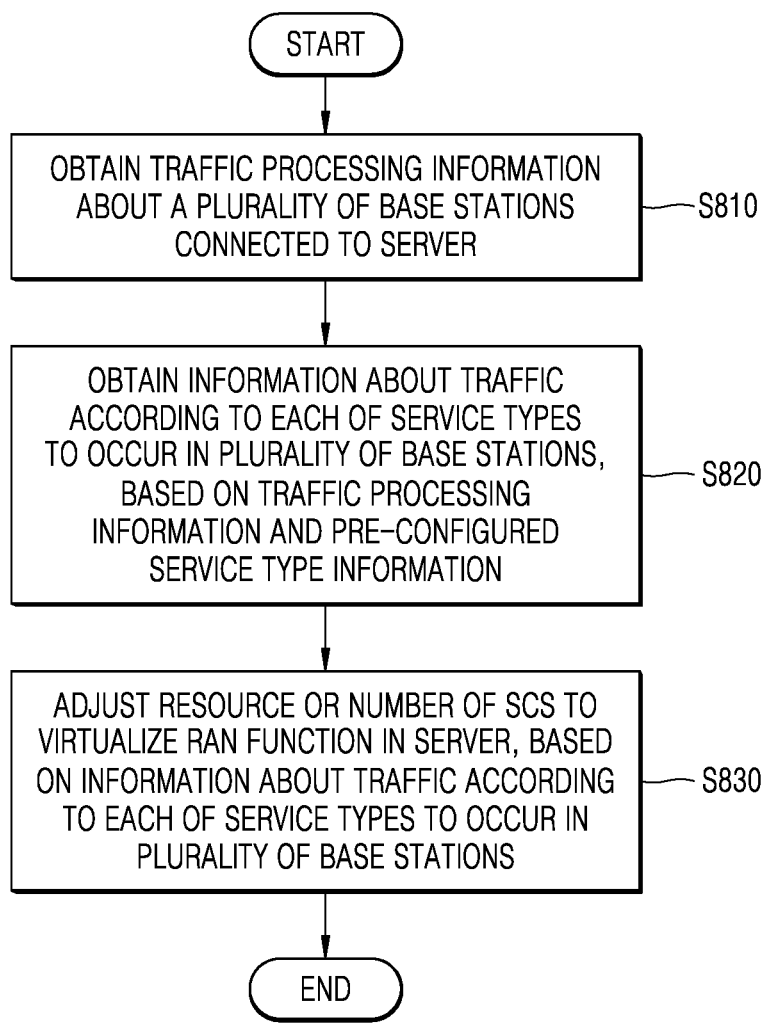
FIG. 8 is a flowchart illustrating an example method of adjusting, by a server, a SC based on information about traffic according to each of service types to occur in a plurality of base stations (BSs), according to an embodiment of the disclosure.

FIG. 8 is a flowchart for describing a method of adjusting, by a server, a SC based on information about traffic according to each of service types to occur in a plurality of BSs, according to an embodiment of the disclosure.

In operation S810, the server may obtain traffic processing information about the plurality of BSs which may be connected to the server. According to an embodiment of the disclosure, traffic refers to a data flow passing through a communication network between the plurality of BSs and UEs that respectively access the plurality of BSs. For example, the traffic may be indicated as a data transmission rate per unit time. As described above with reference to FIG. 2 (see also FIGS. 3-7), the traffic processing information indicates information about a procedure of processing traffic, based on a RAN function. The traffic processing information may include traffic information about traffic occurred in the plurality of BSs, and resource information about a resource used in processing the traffic occurred in the plurality of BSs. The traffic processing information may include information about a type of service causing traffic, and traffic information about each of service types.

The server according to an embodiment of the disclosure may identify, from the traffic processing information, information of an amount of traffic occurred according to each of at least one time period. For example, the server may identify an amount of traffic occurred one week ago or an amount of traffic occurred 10 minutes ago, or the like. When the traffic processing information includes the information about the service type causing traffic, the server may identify, based on the information, the service type causing traffic according to each of at least one time period. As another example, the server may identify a service type causing traffic, based on information about a time-frequency resource domain where the traffic occurred. For example, the server may identify that the traffic occurred a week ago due to a first-type service. The first-type service may be one of a vehicle-to-everything (V2X) service, a remote surgery service, a streaming-based mobile game service, an augmented reality (AR) telepresence service, an interactive streaming service, a private NR service, and a public NR service, but these are merely examples and thus the service type is not limited to the examples. Each of the services transmits and receives data by using a communication scheme based on at least one attribute among eMBB, mMTC, and URLLC. At least one attribute among eMBB, mMTC, and URLLC may be applied to the aforementioned services, according to functions providable by the services. For example, in a case where the V2X service provides a function of receiving image information about a nearby vehicle, it is desired to high-speed transmit high-volume data to a plurality of vehicles and thus, an eMBB attribute may be applied to the V2X service, and in a case where the V2X service provides a function of providing a notice of accident information, it is desired to fragment data in a small time unit such as 1 ms and fast transmit the data and thus, an URLLC attribute may be applied to the V2X service.

As another example, the server may identify, from the traffic processing information, an amount of traffic occurred in the plurality of BSs, according to each of wireless communication systems, and as another example, the server may identify an amount of traffic occurred in the plurality of BSs, according to each of time-frequency resource domains.

However, this is merely an example, and as another example, the server may identify, from the traffic processing information, a resource used in processing traffic. For example, the server may identify a RAM capacity, the number of CPU cores, or the like which are used to process traffic caused by a particular service.

The server according to an embodiment of the disclosure may request the plurality of BSs for traffic processing information so as to receive the traffic processing information. As another example, the server may periodically receive traffic processing information from the plurality of BSs, without a request for the traffic processing information. The server according to another embodiment of the disclosure may receive traffic processing information from a core network device. The server according to another embodiment of the disclosure may generate traffic processing information, based on information collected when traffic is previously processed in a vRAN package. However, this is merely an example, and a method by which the server obtains traffic processing information is not limited thereto. As another example, the server may directly receive an input of traffic processing information from a user.

In operation S820, the server may obtain information about traffic according to each of the service types to occur in the plurality of BSs, based on the traffic processing information and pre-configured service type information.

The server according to an embodiment of the disclosure may identify a pattern of the traffic which has occurred in the plurality of BSs, based on the received traffic processing information. The traffic pattern indicates types of a change in an amount of the traffic according to locations and time. The server may identify a pattern of an amount of traffic occurred in each of time-frequency resource domains, based on the traffic processing information. For example, the traffic pattern may include an average value, a maximum value, and a minimum value of the amount of the traffic, according to each preset time unit or each location. Also, the traffic pattern may indicate a change in the number of accesses and an access time of a UE, according to locations and time. Table 1 below shows average values of an amount of traffic, according to each preset time unit and each location.

TABLE 1

| Average values (Gbps) of amount of traffic, according to each location and each time unit | | | | | | |
|---|---|---|---|---|---|---|
| | Time | | | | | |
| Location | 6-9 | 9-12 | 12-15 | 15-18 | 18-21 | 21-24 |
| BS A | 10,343 | 10,285 | 7,564 | 8,129 | 27,486 | 25,316 |
| BS B | 7,287 | 2,614 | 375 | 572 | 24,259 | 22,810 |
| BS C | 140 | 30,112 | 28,311 | 40,488 | 14,792 | 914 |
| BD D | 384 | 601 | 1460 | 2349 | 3714 | 2,377 |

As another example, the traffic pattern may indicate a change in an amount of traffic, according to occurrence of an event. The server may identify a change in the amount of traffic at a time point of occurrence of an event. For example, when a football match is scheduled, the server may identify that traffic increases by three times one hour before a start time of the football match.

As another example, the server may identify a traffic pattern according to each of frequency resource domains and each of service types. The frequency resource domains may be classified, according to types of a wireless communication system. For example, the frequency resource domains may be classified to a frequency resource domain for LTE and a frequency resource domain for NR. Also, the service types may be classified, according to target capabilities aimed by services. For example, the service types may be classified to URLLC, MMTC, eMBB, or the like, according to requested capabilities including a data transfer rate, transmit latency, a maximum connection number, or the like. However, this is merely an example, and the frequency resource domains and the service types are not limited thereto.

The server may identify the traffic pattern by using a pre-generated artificial intelligence (AI) model. The pre-generated AI model may be configured of at least one layer, and a parameter of each of nodes included in the at least one layer may be configured through training based on the traffic processing information, event information, or the like.

The server according to an embodiment of the disclosure may obtain the information about the traffic according to each of the service types to occur in the plurality of BSs, based on the identified traffic pattern. The server may predict an amount of traffic to increase or decrease by at least a threshold value at a particular time, the traffic being caused by a first-type service. For example, the server may predict, based on the identified traffic pattern, an amount of traffic due to the eMBB service to increase by at least a threshold value in an office-going hour. Also, the server may obtain the information about the traffic to occur in the plurality of BSs, by combining amounts of traffic occurred according to respective time periods. For example, the server may determine a traffic flow indicating that traffic increases by two times, based on information of an amount of traffic occurred a week ago, and may obtain traffic information indicating that an amount of traffic to occur in the plurality of BSs to be 2A, based on A that is an amount of traffic occurred 10 minutes ago.

According to another embodiment of the disclosure, the server may obtain traffic information about a case in which a particular event occurs, based on the identified traffic pattern. For example, the server may obtain traffic information indicating that an amount of the traffic caused by the first-type service is to increase by at least a threshold value when a football match is scheduled.

As another example, the server may predict, based on the identified traffic pattern, an amount of traffic to increase or decrease by at least a threshold value at a particular time according to each frequency resource domain.

In operation S830, the server may adjust at least one of a resource or the number of SCs to virtualize at least one RAN function in the server, based on the information about the traffic according to each of the service types to occur in the plurality of BSs.

An operation of virtualizing the RAN function indicates an operation of virtualizing the RAN function as software, the RAN function being used to be performed by an existing dedicated hardware device. In this regard, the RAN function may correspond to the descriptions provided with reference to above figures.

According to an embodiment of the disclosure, the server may determine that traffic is to increase by at least a threshold value in a t11-t12 period, based on a result of the prediction, and thus may increase the number of the SCs before a t11 time. An operation of increasing the number of the SCs may be performed in a unit of the aforementioned vRAN package, but this is merely an example, and the operation of increasing the number of the SCs may not be performed in the unit of the vRAN package. For example, one or more of a PHY SC, a MAC SC, a RLC SC, a PDCP SC, or the like may each be generated or removed.

In the disclosure, the operation of increasing the number of the SCs may be described as scale-out. When the server determines, based on the result of the prediction, that the traffic is to decrease by at least a threshold value after a t12 time, the server may decrease the number of the SCs after the t12 time. An operation of decreasing the number of the SCs may also be performed in the unit of the aforementioned vRAN package, but this is merely an example, and the operation of decreasing the number of the SCs may not be performed in the unit of the vRAN package. The operation of decreasing the number of the SCs may be described as scale-in.

A layer function to which a load is added to process traffic may vary, the traffic having occurred according to each service type or each frequency domain. For example, when traffic of URLLC is increased, a resource scheduling period is short, and thus it may be predicted that a load of a SC to perform a MAC layer function is to be large. As another example, when traffic increases in an NR frequency domain, it may be predicted that a load of a SC to perform a PHY layer function is to be large. In this case, the server may increase a resource of a SC to perform a particular layer function. For example, the resource may include a CPU, a GPU, a RAM, and a storage, but this is merely an example, and examples of the resource are not limited thereto. The server may adjust the resource by increasing or decreasing an amount of the resource allocated to the SC. In the disclosure, an operation of increasing the resource allocated to the SC may be described as scale-up.

The server may decrease a resource of a SC to perform a particular layer function. In the disclosure, an operation of decreasing the resource allocated to the SC may be described as scale-down.

According to an embodiment of the disclosure, the server may predict a change in traffic. Based on the prediction, the server may adjust, before the change in the traffic, the number or a resource of a SC to correspond to the traffic to be changed, the SC performing a RAN function, such that it is possible to efficiently use resources of the server. However, this is merely an example, and the server may adjust both the number and the resource of the SC.

Figure 9A:
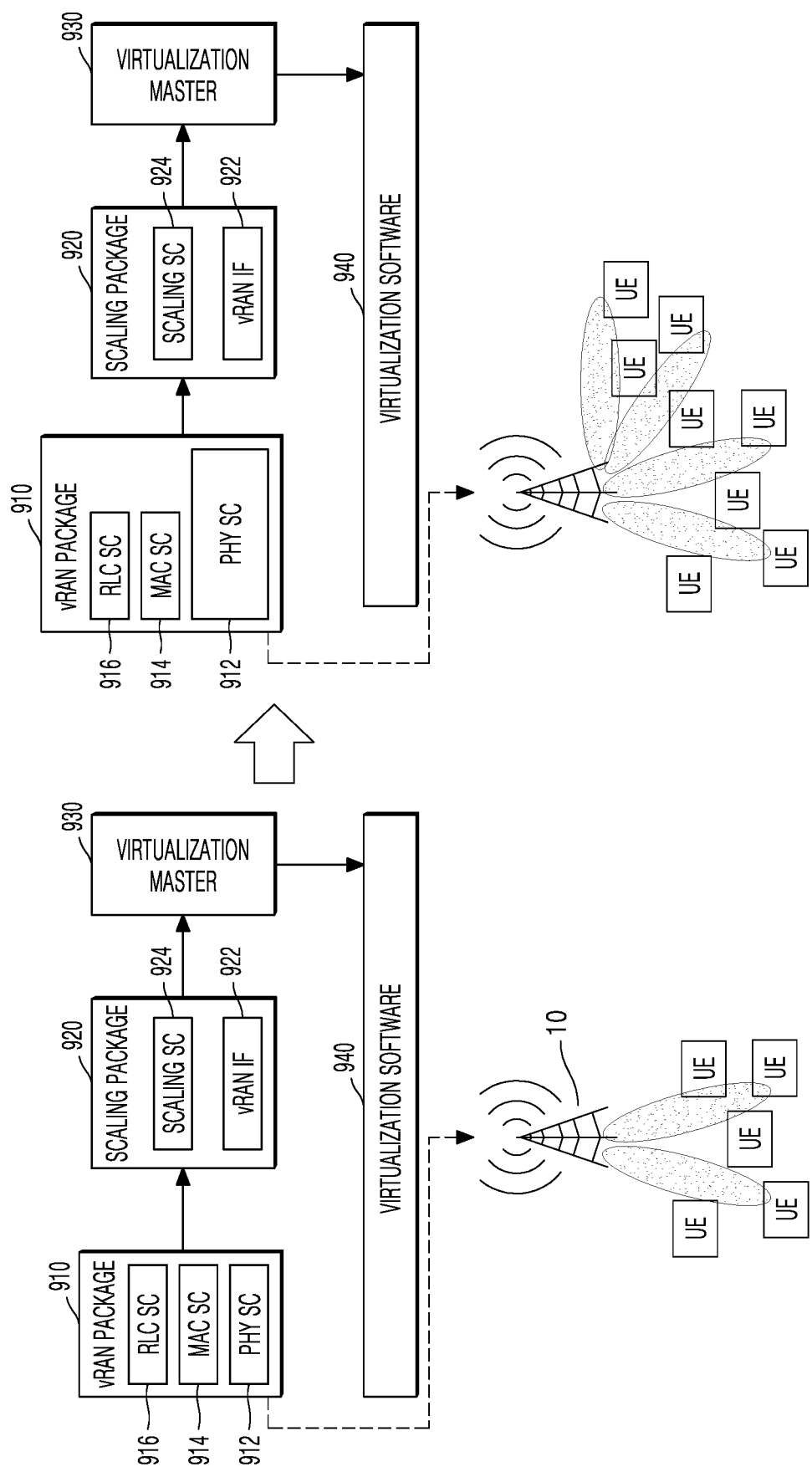
FIG. 9A is a diagram illustrating an example method of adjusting, by a server, the number of resources to be allocated to an SC when traffic of an enhanced Mobile BroadBand (eMBB) service is increased, according to an embodiment of the disclosure.

FIG. 9A is a diagram for describing a method of adjusting, by a server, the number of resources to be allocated to an SC when traffic of the eMBB service is increased, according to an embodiment of the disclosure.

Referring to FIG. 9A, the server may drive software for performing a vRAN function through hardware included in the server. In particular, an OS may be driven in the hardware, and may manage the hardware and virtualization software 940 that is executed in the server. Because descriptions of the hardware, the OS, and the virtualization software are the same as those provided with reference to FIG. 2 (see also FIGS. 3-7), further descriptions are not provided here.

Hereinafter, to describe a method of adjusting, by the server, the number of resources to be allocated to an SC of a vRAN package because it is predicted that traffic of the eMBB service is to occur, an operation of each of a plurality of items of software described with reference to FIG. 2 will now be described in detail. In addition, an operation in each software may be performed in a manner that a CPU in the server executes instructions stored in a RAM, a storage, or the like. For example, a PHY SC 912, a MAC SC 914, and a RLC SC 916 included in a vRAN package 910 may respectively perform, through execution of the instructions, a PHY layer function, a MAC layer function, and a RLC layer function on traffic delivered from the BS 10.

The BS 10 according to an embodiment of the disclosure may identify a service type a UE attempts to use, based on service type information included in an RRC connection configuration message transmitted by the UE in an initial access procedure. However, this is merely an example, and a method by which the BS 10 identifies a service type is not limited to the aforementioned example. As another example, when the BS 10 is pre-configured to provide a particular service to a particular time-frequency resource domain, the BS 10 may identify a service type by determining whether a resource domain where traffic occurred corresponds to a resource domain that was pre-configured for the particular service.

In a present embodiment of the disclosure, the BS may be provided an eMBB service by which UEs connecting the BS 10 transmit and receive high-volume data at a transfer rate of a certain level or above. Examples of the eMBB service may include a virtual reality (VR) service, an AR service, a multimedia streaming service, and the like. The UEs according to an embodiment of the disclosure may be provided one of the examples of the eMBB service.

The vRAN package 910 may identify, based on the service type information, which service caused traffic received from the BS 10, the service type information being identified in the initial access procedure between the UE and the BS 10. The vRAN package 910 may determine target capability information for processing the traffic, according to the identified service type. The target capability information may indicate a capability requirement or target to be satisfied when the vRAN package 910 processes the traffic, and may include a target data rate, target latency, or the like. For example, the vRAN package 910 may determine the target capability information about the traffic of the eMBB service to be a data rate of 20 Gbps.

To provide the eMBB service, a beamforming technology may be used to high-speed transmit high-volume data to a plurality of UEs. The beamforming technology denotes a technology by which an emission pattern of an antenna array differs according to UEs and then a signal is transmitted and received, and to implement the beamforming technology, a beam vector has to be calculated by considering channel information of each antenna such that computations by the PHY SC 912 may be increased. Accordingly, when the traffic due to the eMBB service is increased, a load of the PHY SC 912 may be increased.

A scaling package 920 according to an embodiment of the disclosure may predict an increase in the traffic of the eMBB service and thus may adjust a resource to be allocated to the PHY SC 912. The scaling package 920 may include a vRAN IF 922 and a scaling SC 924. The vRAN IF 922 may receive traffic information about the traffic of the BS 10 from the vRAN package 910. Also, the vRAN IF 922 may receive information about a resource allocated to the vRAN package 910 so as to process the traffic.

The scaling SC 924 may predict traffic to occur according to each of the service types in the BS 10, based on pre-configured service type information and the traffic information. The pre-configured service type information may be an identifier provided to distinguish between services and may be provided as code, but this is merely an example, and thus the pre-configured service type information is not limited to the aforementioned example. For example, the scaling SC 924 may identify which service causes traffic occurred after the initial access procedure, based on the service type information delivered in the initial access procedure between the UE and the BS 10. In this regard, the scaling SC 924 may identify which service corresponds to the delivered service type information, by using the pre-configured service type information.

The scaling SC 924 may predict that the number of UEs using the eMBB service will be increased by at least a first threshold value in a t1-t2 time period every day, based on the number of UEs using the eMBB service in each time zone on each day of a week. Also, the scaling SC 924 may identify an amount of a resource used to process traffic occurred in the t1-t2 time period every day. Based on a result of the identifying, the scaling SC 924 may predict that 2 CPU cores and 10 GB of a RAM memory have to be additionally allocated to the PHY SC 912 because the number of UEs using the eMBB service is increased by at least the first threshold value in the t1-t2 time period every day.

According to an embodiment of the disclosure, because it is predicted that the number of UEs using the eMBB service will be increased by at least the first threshold value in the t1-t2 time period every day, the scaling SC 924 may deliver, before a t1 time point, a scale-up command to a virtualization master 930 so as to increase a resource to be allocated to the PHY SC 912 of the vRAN package 910. The virtualization master 930 may deliver the scale-up command to the virtualization software 940, and may update and store information about the PHY SC 912 of the vRAN package 910, the information being changed in response to the scale-up command. In response to the scale-up command, the virtualization software 940 may increase the resource to be allocated to the PHY SC 912 of the vRAN package 910. For example, the virtualization software 940 may increase a CPU core and a RAM memory allocated to the PHY SC 912 of the vRAN package 910.

Figure 9B:
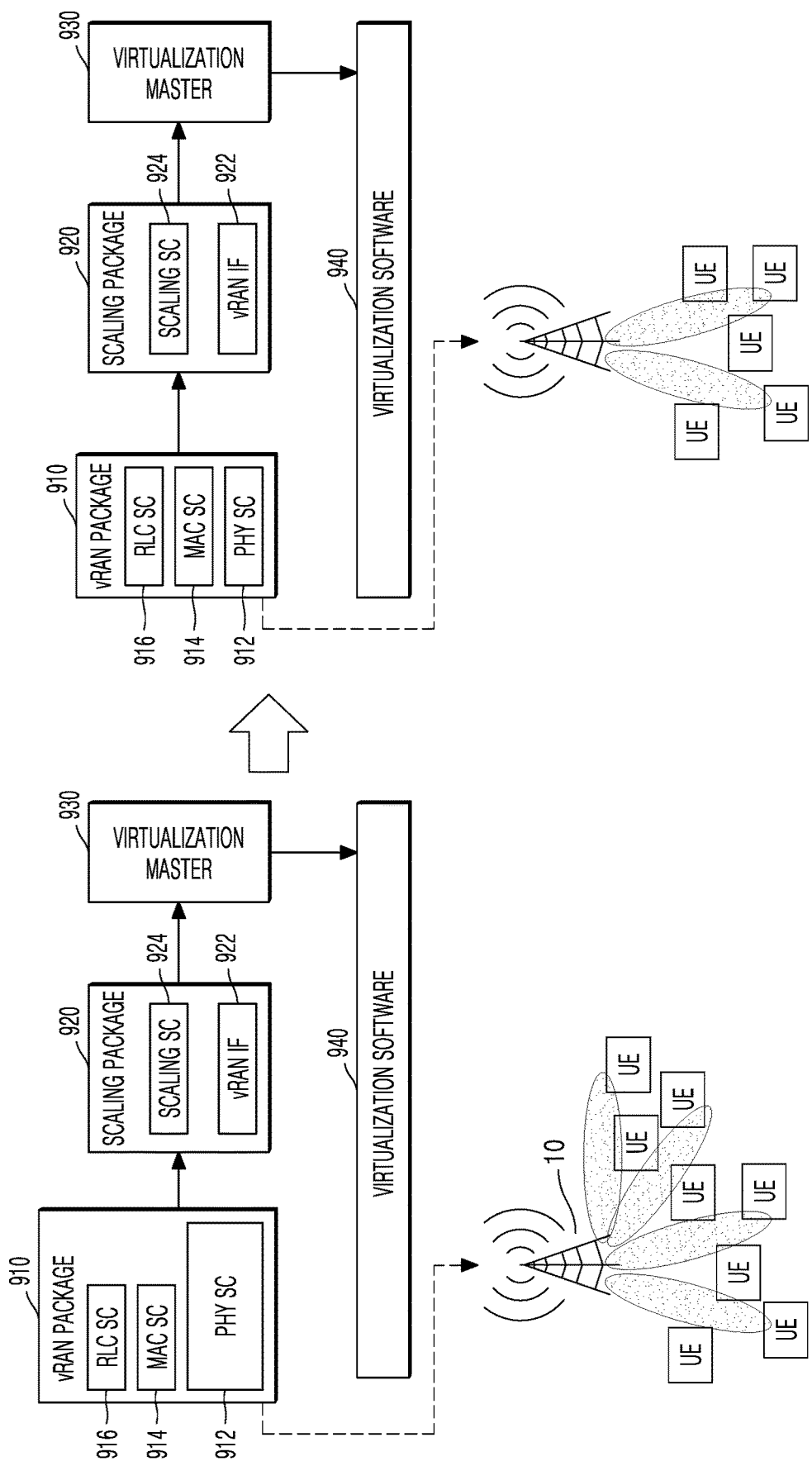
FIG. 9B is a diagram illustrating an example method of adjusting, by a server, the number of resources to be allocated to an SC when traffic of the eMBB service is decreased, according to an embodiment of the disclosure.

FIG. 9B is a diagram for describing a method of adjusting, by a server, the number of resources to be allocated to an SC when traffic of the eMBB service is decreased, according to an embodiment of the disclosure.

Referring to FIG. 9B, the server may drive software for performing a vRAN function through hardware included in the server. For example, the software may include a vRAN package 910, a scaling package 920, a virtualization master 930, and virtualization software 940. The vRAN package 910, the scaling package 920, the virtualization master 930, and the virtualization software 940 in FIG. 9B may correspond to a vRAN package, a scaling package, a virtualization master, and virtualization software that are described above with reference to FIG. 9A.

Hereinafter, in a present embodiment of the disclosure, descriptions of FIG. 9B which correspond to those of FIG. 9A are not provided.

A scaling SC 924 may predict traffic according to each of service types to occur in the BS 10, based on pre-configured service type information and traffic information. The pre-configured service type information may be an identifier provided to distinguish between services and may be provided as code, but this is merely an example, and thus the pre-configured service type information is not limited to the aforementioned example. For example, the scaling SC 924 may identify which service causes traffic occurred after the initial access procedure, based on the service type information delivered in the initial access procedure between the UE and the BS 10. In this regard, the scaling SC 924 may identify which service corresponds to the delivered service type information, by using the pre-configured service type information.

The scaling SC 924 may predict that the number of UEs using the eMBB service will be decreased by a second threshold value or less in a t3-t4 time period every day, based on the number of UEs using the eMBB service in each time zone on each day of a week. Also, the scaling SC 924 may identify an amount of a resource used to process traffic occurred in the t3-t4 time period every day. Based on a result of the identifying, an amount of traffic is decreased by the second threshold value or less in the t3-t4 time period every day, and only 4 CPU cores and 40 GB of a RAM memory are requested by a PHY SC 912 to process the traffic, such that the scaling SC 924 may predict that 2 CPU cores and 10 GB of a RAM memory will be decreased from a currently-allocated resource.

According to an embodiment of the disclosure, because it is predicted that the number of UEs using the eMBB service will be decreased by the second threshold value or less in the t3-t4 time period every day, the scaling SC 924 may deliver, before a t3 time point or at the t3 time point, a scale-down command to the virtualization master 930 so as to decrease a resource to be allocated to the PHY SC 912 of the vRAN package 910. The virtualization master 930 may deliver the scale-down command to the virtualization software 940, and may update and store information about the PHY SC 912 of the vRAN package 910, the information being changed in response to the scale-down command. In response to the scale-down command, the virtualization software 940 may decrease the resource to be allocated to the PHY SC 912 of the vRAN package 910. For example, the virtualization software 940 may decrease a CPU core and a RAM memory allocated to the PHY SC 912.

Figure 10A:
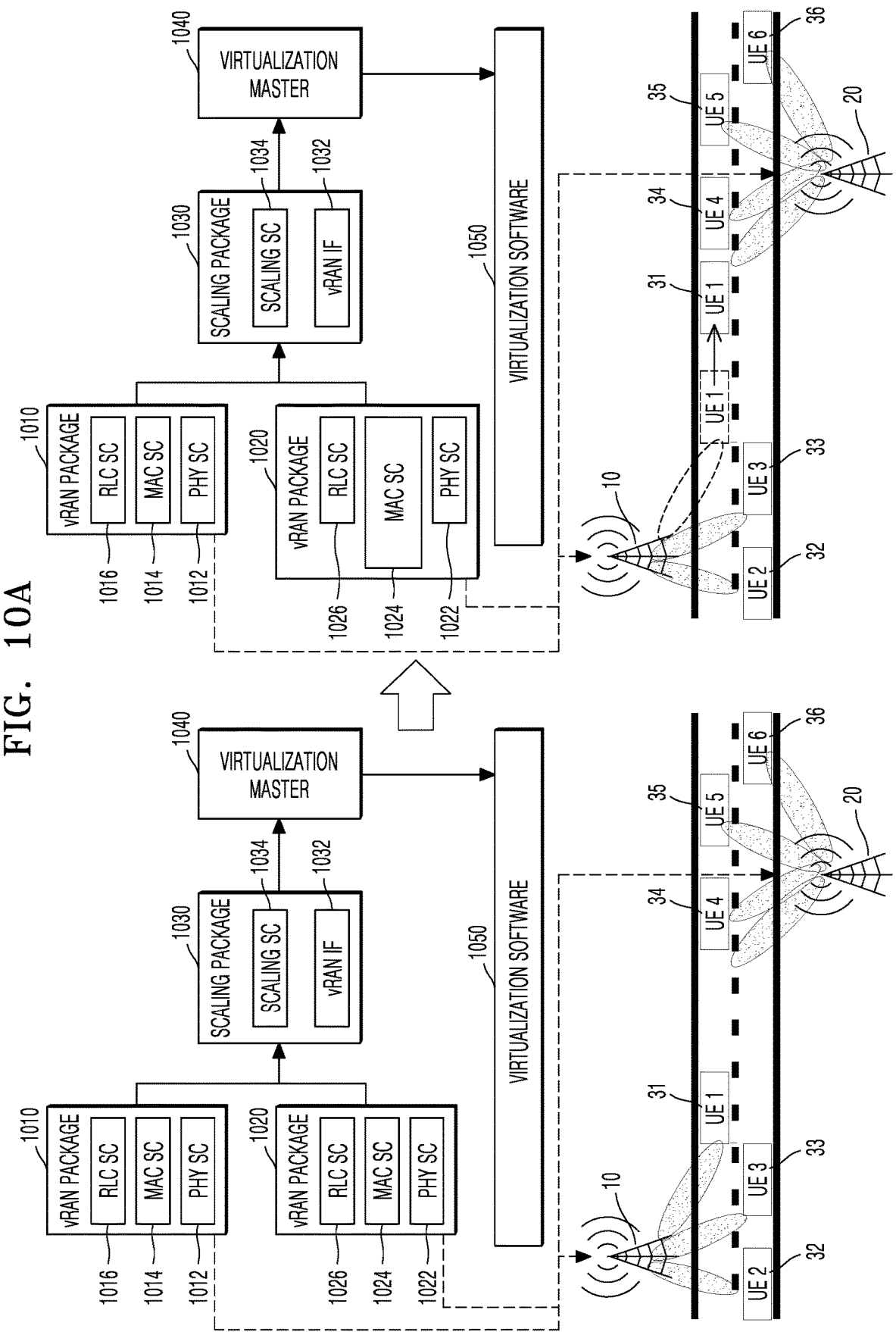
FIG. 10A is a diagram illustrating an example method of adjusting, by a server, the number of resources to be allocated to an SC when traffic of a vehicle-to-everything (V2X) service is increased, according to an embodiment of the disclosure.

FIG. 10A is a diagram for describing a method of adjusting, by a server, the number of resources to be allocated to an SC when traffic of the V2X service is increased, according to an embodiment of the disclosure.

Referring to FIG. 10A, the server may drive software for performing a vRAN function through hardware included in the server. In particular, an OS may be driven in the hardware, and may manage the hardware and virtualization software 1040 that is executed in the server. Because descriptions of the hardware, the OS, and the virtualization software are the same as those provided with reference to FIG. 2 (see also FIGS. 3-7), further descriptions are not provided here.

Hereinafter, to describe the method of adjusting, by the server, the number of resources to be allocated to an SC of a vRAN package, the method being performed when it is predicted that traffic of the V2X service is to occur, an operation of each of a plurality of items of software described with reference to FIG. 2 will now be described in detail. In addition, an operation in each software may be performed in a manner that a CPU in the server executes instructions stored in a RAM, a storage, or the like. For example, a PHY SC 1012, a MAC SC 1014, and a RLC SC 1016 included in a vRAN package 1010 may respectively perform, through execution of the instructions, a PHY layer function, a MAC layer function, and a RLC layer function on traffic delivered from the BS 10.

Each of the BSs 10 and 20 according to an embodiment of the disclosure may identify a service type at least one UE 31 attempts to use (see also UEs 32-36), based on service type information included in an RRC connection configuration message transmitted by the UE 31 in an initial access procedure. However, this is merely an example, and a method by which a BS (e.g., the BS 10) identifies a service type is not limited to the aforementioned example. As another example, when a BS (e.g., the BS 10 is pre-configured to provide a particular service to a particular time-frequency resource domain, the BS 10 may identify a service type by determining whether a resource domain where traffic occurred corresponds to a resource domain that was pre-configured for the particular service.

The vRAN package 1010 may identify, based on the service type information, which service caused traffic received from a BS (e.g., the BS 10), the service type information being identified in the initial access procedure between the UE 31 and the BS 10. The vRAN package 1010 may determine target capability information for processing the traffic, according to the identified service type. Descriptions about the target capability information are the same as those provided with reference to FIG. 9A. For example, in a case where a function of providing an alarm such as a warning message about an accidence-occurred area, the functions being from among various functions providable by the V2X service, is executed, an URLLC attribute is applied and thus the vRAN package 1010 may determine the target capability information about traffic of the V2X service to be latency of 1 ms. However, this is merely an example, and according to another embodiment of the disclosure, when high-volume data such as image information about a nearby vehicle is transmitted via the V2X service, an eMBB attribute is applied, and thus, the vRAN package 1010 may determine the target capability information, based on a data rate.

In the V2X service, a location of a UE (e.g., the UE 31) is often changed due to movement of the UE 31, and thus a handover operation may be frequently performed. In the handover operation, a process of detecting a next BS (e.g., the BS 20) to which connection is switched from a currently-connected BS (e.g., the BS 10), and exchanging information between the currently-connected BS (e.g., the BS 10) and the next BS (e.g., the BS 20) has to be performed such that computations by the MAC SC 1014 may be increased.

According to an embodiment of the disclosure, a scaling package 1030 may predict an increase in traffic of the V2X service and thus may adjust a resource to be allocated to MAC SCs 1014 and 1024 respectively included in vRAN packages 1010 and 1020 (also referred to as the first and second vRAN packages 1010 and 1020, respectively). The scaling package 1030 may include a vRAN IF 1032 and a scaling SC 1034. The vRAN IF 1032 may receive traffic information about traffic of the plurality of BSs 10 and 20 from the vRAN packages 1010 and 1020. Also, the vRAN IF 1032 may receive information about a resource allocated to the vRAN packages 1010 and 1020 so as to process the traffic.

The scaling SC 1034 may predict traffic according to each of service types to occur in the plurality of BSs 10 and 20, based on pre-configured service type information and traffic information. The pre-configured service type information may be an identifier provided to distinguish between services and may be provided as code, but this is merely an example, and thus the pre-configured service type information is not limited to the aforementioned example. For example, the scaling SC 1034 may identify which service causes traffic occurred after the initial access procedure, based on service type information delivered in the initial access procedure between UEs 31, 32, 33, 34, 35, and 36 and the BSs 10 and 20. In this regard, the scaling SC 1034 may identify which service corresponds to the delivered service type information, by using the pre-configured service type information.

The scaling SC 1034 may predict a time in which the number of UEs using the V2X service is increased by at least a first threshold value, based on the number of UEs using the V2X service in each time zone on each day of a week with respect to each of the BSs 10 and 20. For example, the scaling SC 1034 may predict that a time in which the number of UEs accessing the second BS 20 from among the BSs 10 and 20 is increased by at least the first threshold value will be a t1-t2 time period on Saturday. Also, the scaling SC 1034 may identify an amount of a resource used to process traffic occurred in the second BS 20 in the t1-t2 time period on Saturday. Based on a result of the identifying, the scaling SC 1034 may predict that 4 CPU cores and 20 GB of a RAM memory have to be additionally allocated to the second vRAN package 1020 to process traffic of the second BS 20 in the t1-t2 time period on Saturday.

According to an embodiment of the disclosure, the scaling SC 1034 may deliver, before the t1-t2 time period on Saturday, a scale-up command to a virtualization master 1040 so as to increase a resource to be allocated to the MAC SC 1024 of the second vRAN package 1020 to process traffic of the second BS 20. The virtualization master 1040 may deliver the scale-up command to virtualization software 1050, and may update and store information about the MAC SC 1024 of the second vRAN package 1020, the information being changed in response to the scale-up command. In response to the scale-up command, the virtualization software 1050 may increase the resource to be allocated to the MAC SC 1024 of the second vRAN package 1020. For example, the virtualization software 1050 may increase a CPU core and a RAM memory allocated to the MAC SC 1024 of the second vRAN package 1020.

Figure 10B:
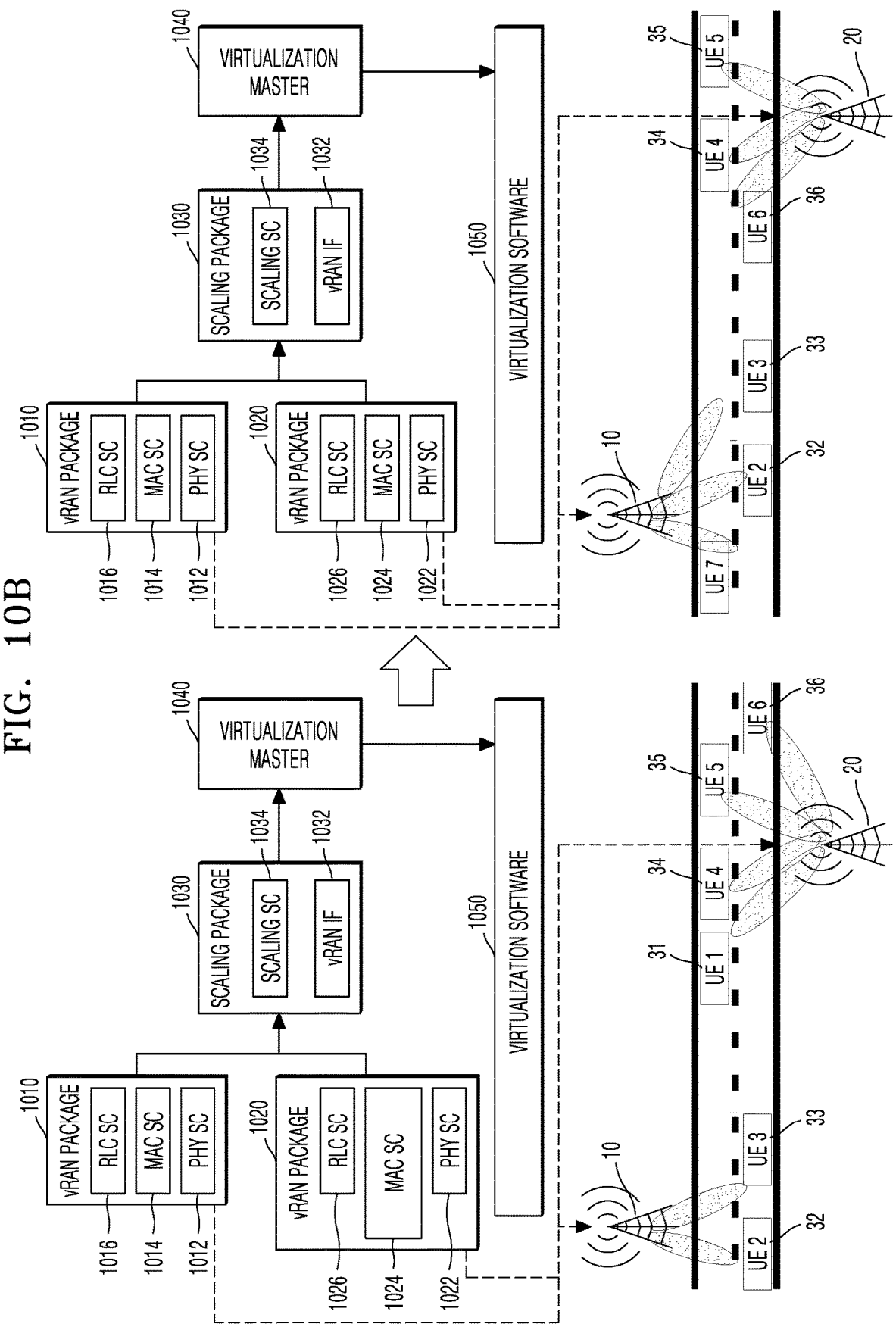
FIG. 10B is a diagram illustrating an example method of adjusting, by a server, the number of resources to be allocated to an SC when traffic of the V2X service is decreased, according to an embodiment of the disclosure.

FIG. 10B is a diagram for describing a method of adjusting, by a server, the number of resources to be allocated to an SC when traffic of the V2X service is decreased, according to an embodiment of the disclosure.

Referring to FIG. 10B, the server may drive software for performing a vRAN function through hardware included in the server. For example, the software may include a plurality of vRAN packages 1010 and 1020 (also referred to as the first and second vRAN packages 1010 and 1020), a scaling package 1030, a virtualization master 1040, and virtualization software 1050. The plurality of vRAN packages 1010 and 1020, the scaling package 1030, the virtualization master 1040, and the virtualization software 1050 in FIG. 10B may correspond to a plurality of vRAN packages, a scaling package, a virtualization master, and virtualization software that are described above with reference to FIG. 10A.

Hereinafter, in a present embodiment of the disclosure, descriptions of FIG. 10B which correspond to those of FIG. 10A are not provided.

A scaling SC 1034 may predict traffic according to each of service types to occur in the BSs 10 and 20, based on pre-configured service type information and traffic information. The pre-configured service type information may be an identifier provided to distinguish between services and may be provided as code, but this is merely an example, and thus the pre-configured service type information is not limited to the aforementioned example. For example, the scaling SC 1034 may identify which service causes traffic occurred after an initial access procedure, based on service type information delivered in the initial access procedure between UEs 31, 32, 33, 34, 35, and 36 and the BSs 10 and 20. In this regard, the scaling SC 1034 may identify which service corresponds to the delivered service type information, by using the pre-configured service type information.

Based on the number of UEs using the V2X service in each time zone on each day of a week, the scaling SC 1034 may predict that the number of UEs accessing the second BS 20 and using the V2X service will be decreased by a second threshold value or less in a t3-t4 time period on Monday. Also, the scaling SC 1034 may identify an amount of a resource used to process traffic occurred in the t3-t4 time period every day. Based on a result of the identifying, an amount of traffic is decreased by the second threshold value or less in the t3-t4 time period every day, and only 2 CPU cores and 20 GB of a RAM memory are requested by a MAC SC 1024 to process the traffic, such that the scaling SC 1034 may predict that 1 CPU core and 10 GB of a RAM memory will be decreased from a currently-allocated resource.

According to an embodiment of the disclosure, because it is predicted that the number of UEs using the V2X service will be decreased by the second threshold value or less in the t3-t4 time period every day, the scaling SC 1034 may deliver, before a t3 time point or at the t3 time point, a scale-down command to the virtualization master 1040 so as to decrease a resource to be allocated to the MAC SC 1024 of the second vRAN package 1020. The virtualization master 1040 may deliver the scale-down command to the virtualization software 1050, and may update and store information about the MAC SC 1024 of the second vRAN package 1020, the information being changed in response to the scale-down command. In response to the scale-down command, the virtualization software 1050 may decrease the resource to be allocated to the MAC SC 1024 of the second vRAN package 1020. For example, the virtualization software 1050 may decrease a CPU core and a RAM memory allocated to the MAC SC 1024 of the second vRAN package 1020.

Figure 11A:
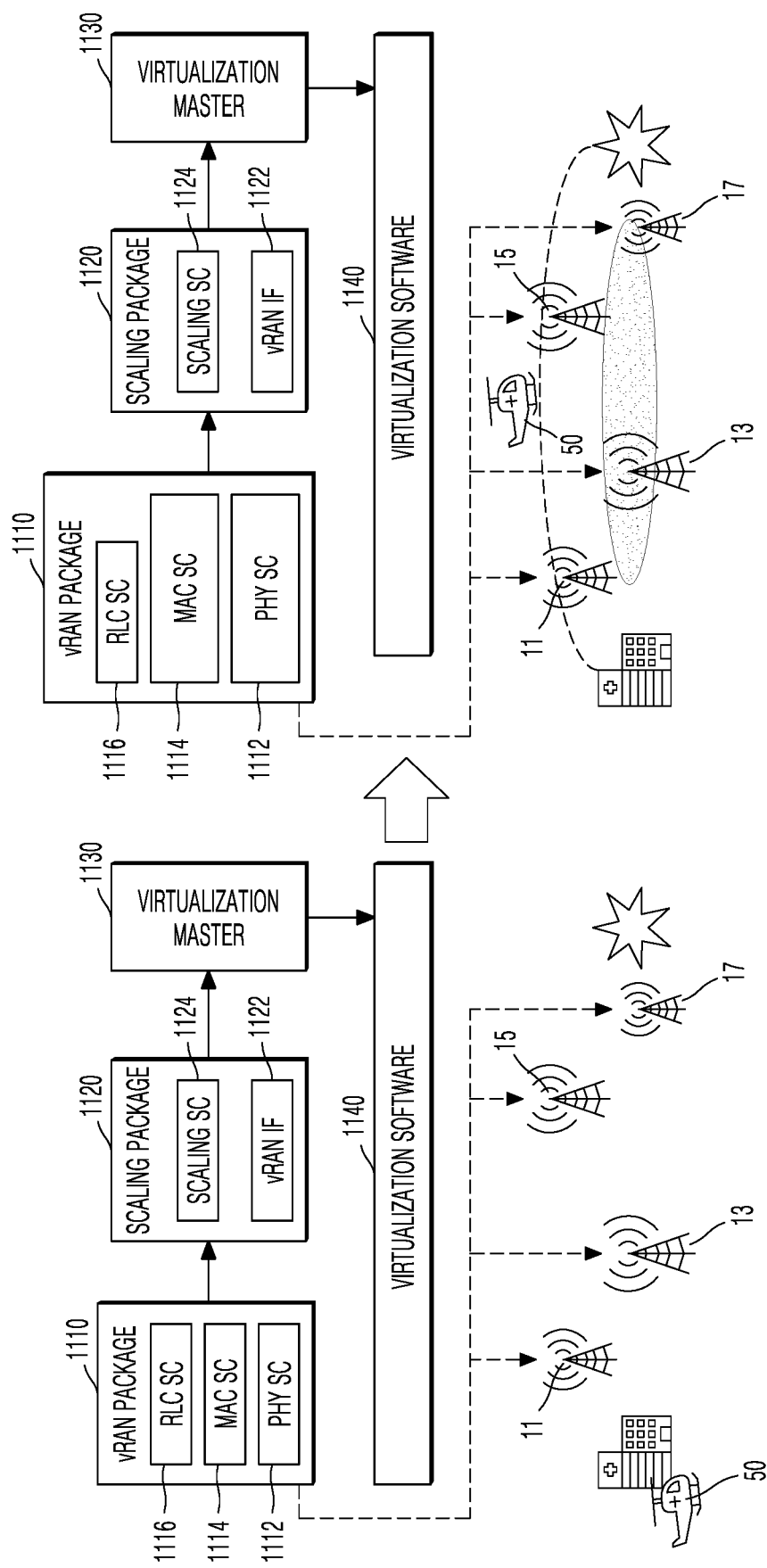
FIG. 11A is a diagram illustrating an example method of adjusting, by a server, a resource to be allocated to an SC, when traffic of a remote surgery service occurs, according to an embodiment of the disclosure.

FIG. 11A is a diagram for describing a method of adjusting, by a server, a resource to be allocated to an SC, when traffic of a remote surgery service occurs, according to an embodiment of the disclosure.

Referring to FIG. 11A, the server may drive software for performing a vRAN function through hardware included in the server. In particular, an OS may be driven in the hardware, and may manage the hardware and virtualization software 1140 that is executed in the server. Because descriptions of the hardware, the OS, and the virtualization software are the same as those provided with reference to FIG. 2 (see also FIGS. 3-7), further descriptions are not provided here.

Hereinafter, to describe the method of adjusting, by the server, a resource to be allocated to an SC, the method being performed when it is predicted that traffic of the remote surgery service is to occur, an operation of each of a plurality of items of software described with reference to FIG. 2 will now be described in detail. In addition, an operation in each software may be performed in a manner that a CPU in the server executes instructions stored in a RAM, a storage, or the like. For example, a PHY SC 1112, a MAC SC 1114, and a RLC SC 1116 included in a vRAN package 1110 may respectively perform, through execution of the instructions, a PHY layer function, a MAC layer function, and a RLC layer function on traffic delivered from each of a plurality of BSs 11, 13, 15, and 17.

Each of the BSs 11, 13, 15, and 17 according to an embodiment of the disclosure may identify a service type a UE 50 attempts to use, based on service type information included in an RRC connection configuration message transmitted by the UE 50 in an initial access procedure. However, this is merely an example, and a method by which the BSs 11, 13, 15, and 17 identify a service type is not limited to the aforementioned example. As another example, when each of the BSs 11, 13, 15, and 17 is pre-configured to provide a particular service to a particular time-frequency resource domain, each of the BSs 11, 13, 15, and 17 may identify a service type by determining whether a resource domain where traffic occurred corresponds to a resource domain that was pre-configured for the particular service.

In a present embodiment of the disclosure, the UE 50 may access each of the BSs 11, 13, 15, and 17 and may be provided a remote surgery service. The vRAN package 1110 may identify, based on the service type information, which service caused traffic received from each of the BSs 11, 13, 15, and 17, the service type information being identified in the initial access procedure between the UE 50 and each of the BSs 11, 13, 15, and 17. The vRAN package 1110 may determine target capability information for processing the traffic, according to the identified service type. For example, the vRAN package 1110 may determine the target capability information about traffic of the remote surgery service to be a data rate of 10 Gbps and latency of 0.1 ms. Because an eMBB attribute is applied to a function of transmitting high-resolution surgery images, the function being from among various functions provided via the remote surgery service, a high data transmission rate may be desired. Accordingly, computations by the PHY SC 1112 that supports an operation such as beamforming that is a technology for increasing a data transmission rate may be increased. Also, when an unexpected incident occurs during a remote surgery, the unexpected incident has to be rapidly noticed to a hospital. That is, an URLLC attribute is applied to a function of noticing an unexpected incident, and thus the UE 50 may urgently deliver a message in the middle of transmission of the surgery images. In this case, a message has to be transmitted by using a portion of a time-frequency resource domain allocated to transmission of the surgery images, such that an operation of re-allocating time-frequency resources is desired and thus computations by the MAC SC 1114 may be increased.

According to an embodiment of the disclosure, a scaling package 1120 may predict occurrence of traffic due to the remote surgery service and thus may adjust a resource to be allocated to the PHY SC 1112 and the MAC SC 1114. The scaling package 1120 may include a vRAN IF 1122 and a scaling SC 1124. The vRAN IF 1122 may receive, from the vRAN package 1110, traffic information about traffic of the BSs 11, 13, 15, and 17 and information about a resource allocated to the vRAN package 1110, the resource being used to process the traffic. Also, the vRAN IF 1122 may receive, from an external apparatus, event information informing occurrence of a remote surgery service.

The scaling SC 1124 may predict traffic to occur in the BSs 11, 13, 15, and 17 due to occurrence of the remote surgery service, based on pre-configured service type information and the traffic information. For example, the scaling SC 1124 may identify an amount of traffic and a resource used to process the traffic occurred in the BSs 11, 13, 15, and 17 located on a path from a region A to a region B when a remote surgery service previously occurred on the path from the region A to the region B. When a remote surgery service newly occurs on the path from the region A to the region B, the scaling SC 1124 may predict traffic to occur in the BSs 11, 13, 15, and 17 located on the path from the region A to the region B, based on the amount of the pre-occurred traffic and the resource used to process the traffic.

According to an embodiment of the disclosure, because it is predicted that traffic will occur in the BSs 11, 13, 15, and 17 by at least a first threshold value, the scaling SC 1124 may deliver, before the remote surgery service is to be provided, a scale-up command to a virtualization master 1130 so as to increase a resource to be allocated to the PHY SC 1112 and the MAC SC 1114. The virtualization master 1130 may deliver the scale-up command to virtualization software 1140, and may update and store information about the PHY SC 1112 and the MAC SC 1114 of the vRAN package 1110, the information being changed in response to the scale-up command. In response to the scale-up command, the virtualization software 1140 may increase the resource to be allocated to the PHY SC 1112 and the MAC SC 1114 of the vRAN package 1110. For example, the virtualization software 1140 may increase a CPU core and a RAM memory allocated to the PHY SC 1112 and the MAC SC 1114 of the vRAN package 1110.

Figure 11B:
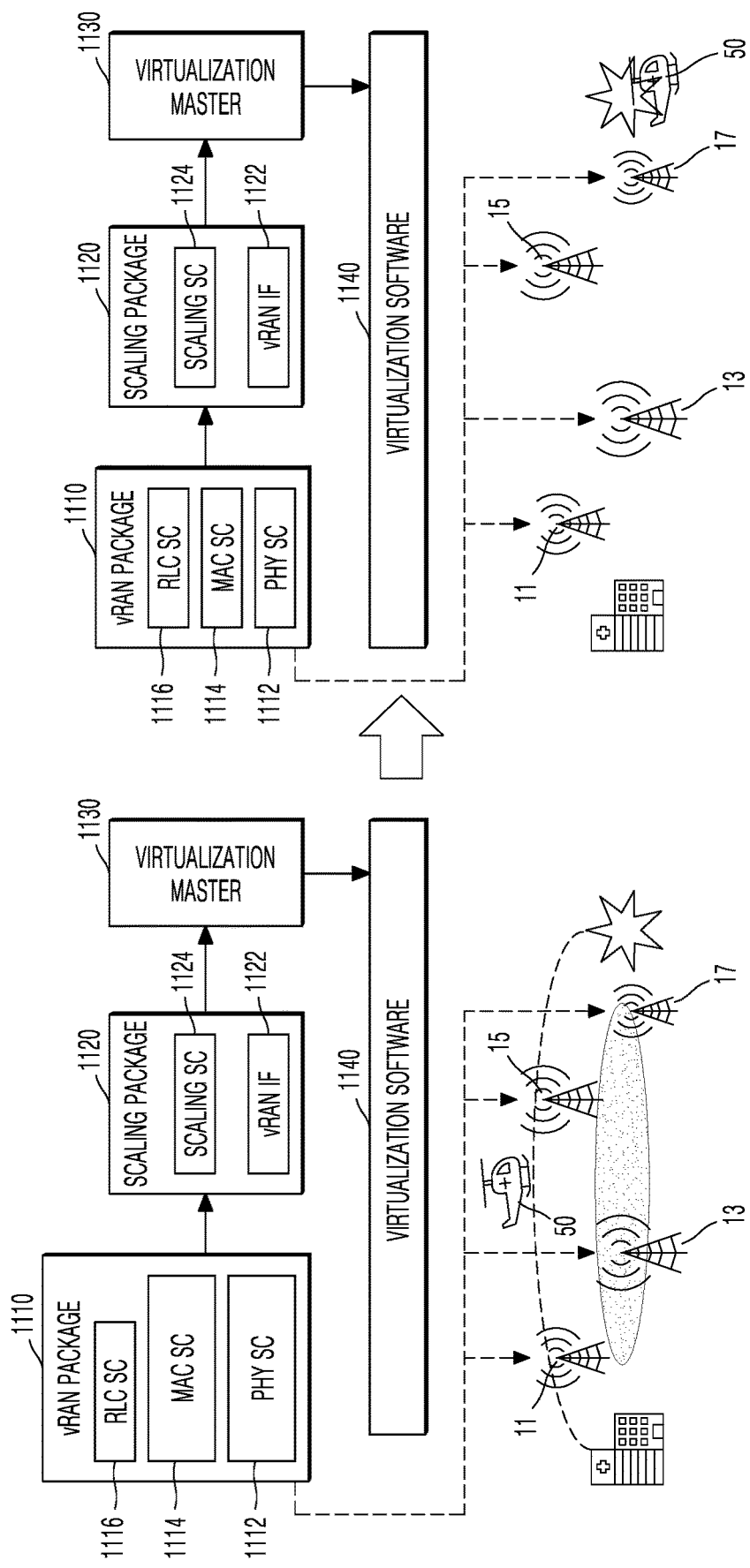
FIG. 11B is a diagram illustrating an example method of adjusting, by a server, a resource to be allocated to an SC, when traffic of a remote surgery service occurs, according to another embodiment of the disclosure.

FIG. 11B is a diagram for describing a method of adjusting, by a server, a resource to be allocated to an SC, when traffic of a remote surgery service occurs, according to another embodiment of the disclosure.

Referring to FIG. 11B, the server may drive software for performing a vRAN function through hardware included in the server. For example, the software may include a vRAN package 1110, a scaling package 1120, a virtualization master 1130, and virtualization software 1140. The vRAN package 1110, the scaling package 1120, the virtualization master 1130, and the virtualization software 1140 in FIG. 11B may correspond to a vRAN package, a scaling package, a virtualization master, and virtualization software that are described above with reference to FIG. 11A.

Hereinafter, in a present embodiment of the disclosure, descriptions of FIG. 11B which correspond to those of FIG. 11A are not provided.

According to an embodiment of the disclosure, the scaling package 1120 may predict a time when a remote surgery service is to end and then may adjust a resource to be allocated to a PHY SC 1112 and a MAC SC 1114. The scaling package 1120 may include a vRAN IF 1122 and a scaling SC 1124. The vRAN IF 1122 may receive, from the vRAN package 1110, traffic information about traffic of a BSs 11, 13, 15, and 17 and information about a resource allocated to the vRAN package 1110, the resource being used to process the traffic. Also, the vRAN IF 1122 may receive, from an external apparatus, event information informing occurrence of a remote surgery service.

The scaling SC 1124 may identify a start time and an end time of the remote surgery service at each of the BSs 11, 13, 15, and 17 located on a path from a region A to a region B when the remote surgery service previously occurred on the path from the region A to the region B. For example, a time when the remote surgery service started is to, traffic due to the remote surgery service may occur in a first BS at a time between a t0+td1 time period and a t0+td2 time period, and traffic due to the remote surgery service may occur in a second BS at a time between a t0+td3 time period and a t0+td4 time period. Accordingly, when the scaling SC 1124 newly provides a remote surgery service, the first BS may predict that occurrence of traffic will end after td2 after a start time of the remote surgery service. The scaling SC 1124 may previously predict the end of the traffic with respect to the first BS before a time when the traffic of the first BS ends and thus may rapidly control a resource to be applied to the PHY SC 1112 and the MAC SC 1114. In detail, the scaling SC 1124 may deliver a scale-down command to the virtualization master 1130 so as to decrease a resource to be allocated to the PHY SC 1112 and the MAC SC 1114 of the vRAN package 1110. The virtualization master 1130 may deliver the scale-down command to the virtualization software 1140, and may update and store information about the PHY SC 1112 and the MAC SC 1114 of the vRAN package 1110, the information being changed in response to the scale-down command. In response to the scale-down command, the virtualization software 1140 may decrease the resource to be allocated to the PHY SC 1112 and the MAC SC 1114 of the vRAN package 1110. For example, the virtualization software 1140 may decrease a CPU core and a RAM memory allocated to the PHY SC 1112 and the MAC SC 1114 of the vRAN package 1110.

Figure 12A:
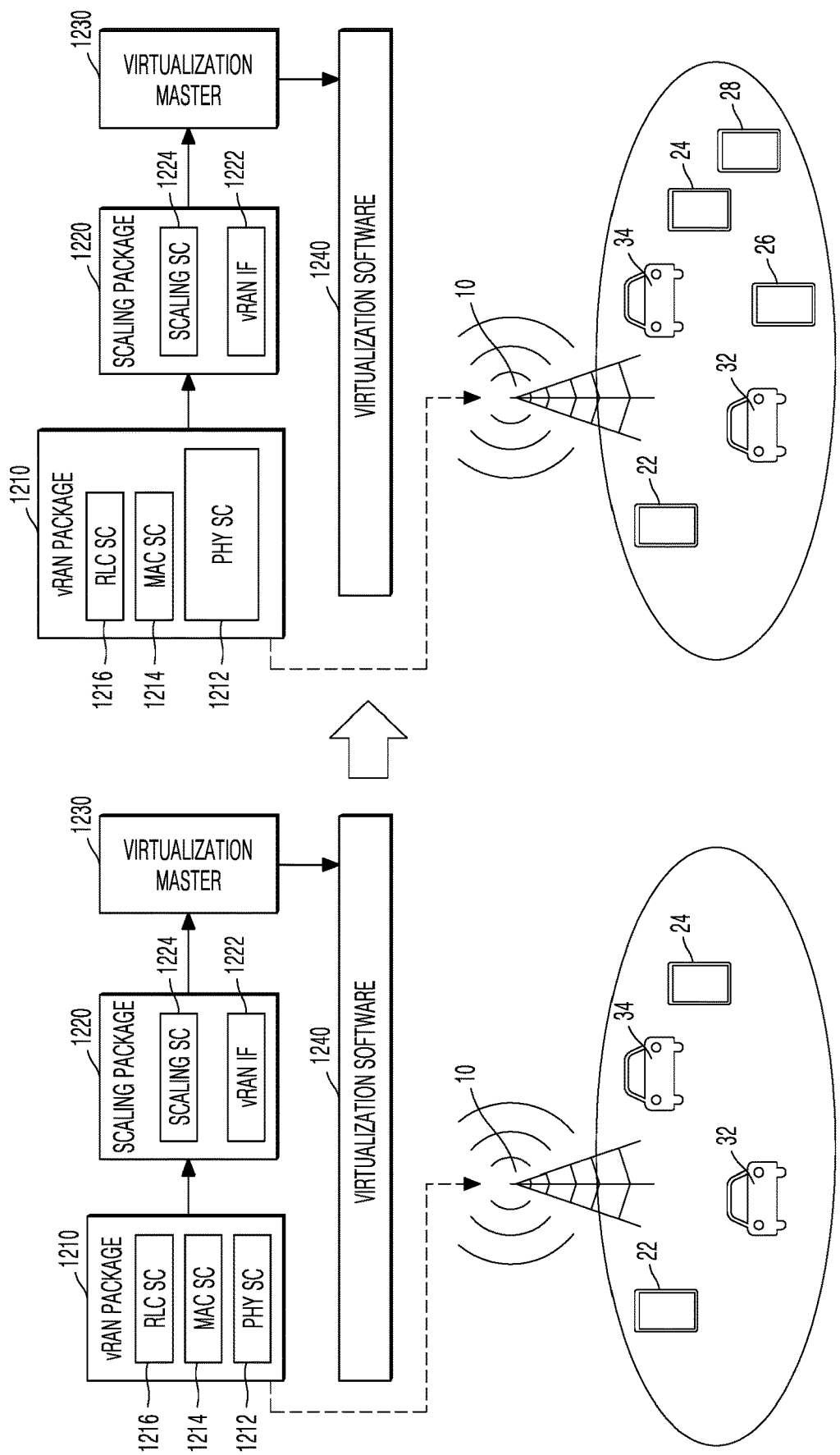
FIG. 12A is a diagram illustrating an example method of adjusting, by a server, a resource to be allocated to an SC, when different types of services coexist, according to an embodiment of the disclosure.

FIG. 12A is a diagram for describing a method of adjusting, by a server, a resource to be allocated to an SC, when different types of services coexist, according to an embodiment of the disclosure.

Referring to FIG. 12A, the server may drive software for performing a vRAN function through hardware included in the server. In particular, an OS may be driven in the hardware, and may manage the hardware and virtualization software 1240 that is executed in the server. Because descriptions of the hardware, the OS, and the virtualization software are the same as those provided with reference to FIG. 2 (see also FIGS. 3-7), further descriptions are not provided here.

Hereinafter, to describe the method of adjusting, by the server, a resource to be allocated to an SC of a vRAN package, the method being performed when a V2X service and a media streaming service coexist, an operation of each of a plurality of items of software described with reference to FIG. 2 will now be described in detail. In addition, an operation in each software may be performed in a manner that a CPU in the server executes instructions stored in a RAM, a storage, or the like. For example, a PHY SC 1212, a MAC SC 1214, and a RLC SC 1216 included in a vRAN package 1210 may respectively perform, through execution of the instructions, a PHY layer function, a MAC layer function, and a RLC layer function on traffic delivered from the BS 10.

The BS 10 according to an embodiment of the disclosure may identify a service type a UE (e.g., a UE 22) attempts to use, based on service type information included in an RRC connection configuration message transmitted by the UE 22 in an initial access procedure.

The vRAN package 1210 may identify, based on the service type information, which service caused traffic received from the BS 10, the service type information being identified in the initial access procedure between a plurality of UEs 22, 24, 32, and 34 and the BS 10. The vRAN package 1210 may determine target capability information for processing the traffic, according to the identified service type. For example, the vRAN package 1210 may determine target latency of the V2X service to be 0.1 ms, and may determine a target data rate of the media streaming service to be 10 Gbps.

According to an embodiment of the disclosure, a scaling package 1220 may predict an increase in traffic of the media streaming service and thus may adjust a resource to be allocated to the PHY SC 1212. In the media streaming service, a beamforming technology is used to high-speed transmit high-volume data, such that a load of the PHY SC 1212 may be increased, as described above with reference to FIG. 9A. The scaling package 1220 may include a vRAN IF 1222 and a scaling SC 1224. The vRAN IF 1222 may receive traffic information about the traffic of the BS 10 from the vRAN package 1210. Also, the vRAN IF 1222 may receive information about a resource allocated to the vRAN package 1210 so as to process the traffic.

The scaling SC 1224 may predict traffic according to each of the service types to occur in the BS 10, based on pre-configured service type information and the traffic information. For example, the scaling SC 1224 may identify which service causes traffic occurred after the initial access procedure, based on the service type information delivered in the initial access procedure between the UE and the BS 10.

The scaling SC 1224 may predict that the number of UEs using the media streaming service will be increased by at least a first threshold value in a t1-t2 time period every day, based on the number of UEs using the media streaming service in each time zone on each day of a week. Also, the scaling SC 1224 may identify an amount of a resource used to process traffic occurred in the t1-t2 time period every day. Based on a result of the identifying, the scaling SC 1224 may predict that 2 CPU cores and 10 GB of a RAM memory have to be additionally allocated to the PHY SC 1212 because the number of UEs using the media streaming service is increased by at least the first threshold value in the t1-t2 time period every day.

According to an embodiment of the disclosure, because it is predicted that the number of UEs using the media streaming service will be increased by at least the first threshold value in the t1-t2 time period every day, the scaling SC 1224 may deliver, before a t1 time point, a scale-up command to a virtualization master 1230 so as to increase a resource to be allocated to the PHY SC 1212 of the vRAN package 1210. The virtualization master 1230 may deliver the scale-up command to the virtualization software 1240, and may update and store information about the PHY SC 1212 of the vRAN package 1210, the information being changed in response to the scale-up command. In response to the scale-up command, the virtualization software 1240 may increase the resource to be allocated to the PHY SC 1212 of the vRAN package 1210. For example, the virtualization software 1240 may increase a CPU core and a RAM memory allocated to the PHY SC 1212 of the vRAN package 1210.

Figure 12B:
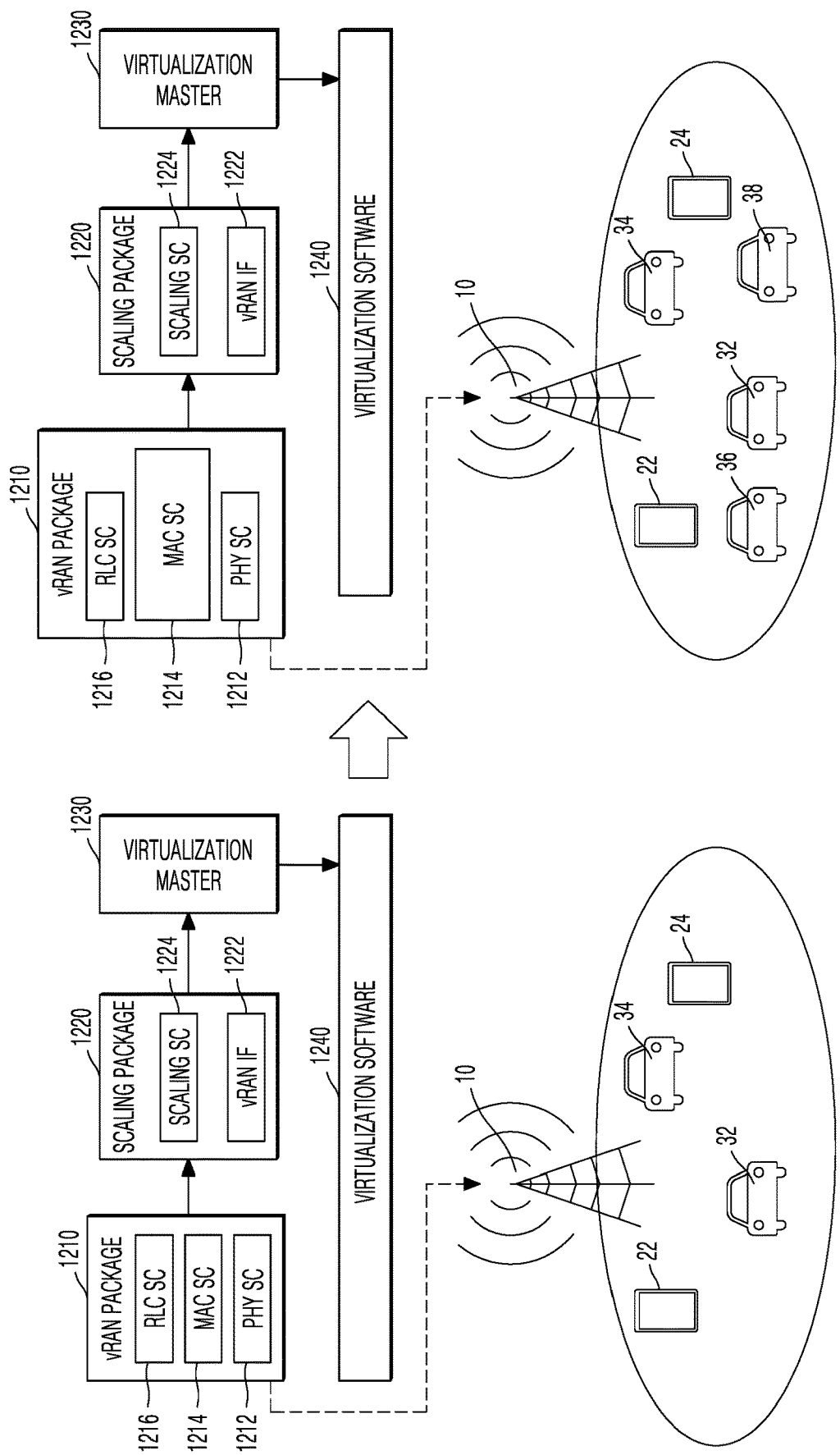
FIG. 12B is a diagram illustrating an example method of adjusting, by a server, a resource to be allocated to an SC, when different types of services coexist, according to another embodiment of the disclosure.

FIG. 12B is a diagram for describing a method of adjusting, by a server, a resource to be allocated to an SC, when different types of services coexist, according to another embodiment of the disclosure.

Referring to FIG. 12B, the server may drive software for performing a vRAN function through hardware included in the server. For example, the software may include a vRAN package 1210, a scaling package 1220, a virtualization master 1230, and virtualization software 1240. The vRAN package 1210, the scaling package 1220, the virtualization master 1230, and the virtualization software 1240 in FIG. 12B may correspond to a vRAN package, a scaling package, a virtualization master, and virtualization software that are described above with reference to FIG. 12A.

Hereinafter, in a present embodiment of the disclosure, descriptions of FIG. 12B which correspond to those of FIG. 12A are not provided.

The scaling SC 1224 may predict that the number of UEs using a V2X service will be increased by at least a second threshold value in a t3-t4 time period every day, based on the number of UEs using the media streaming service in each time zone on each day of a week. When traffic of the V2X service is increased, a load of a MAC SC 1214 may be increased due to handover, as described above with reference to FIG. 10A. Also, the scaling SC 1224 may identify an amount of a resource used to process traffic occurred in the t3-t4 time period every day. Based on a result of the identifying, the scaling SC 1224 may predict that 4 CPU cores and 20 GB of a RAM memory have to be additionally allocated to the MAC SC 1214 because the number of UEs using the V2X service is increased by at least the second threshold value in the t3-t4 time period every day.

According to an embodiment of the disclosure, because it is predicted that the number of UEs using the V2X service will be increased by at least the second threshold value in the t3-t4 time period every day, the scaling SC 1224 may deliver, before a t3 time point, a scale-up command to the virtualization master 1230 so as to increase a resource to be allocated to the MAC SC 1214 of the vRAN package 1210. The virtualization master 1230 may deliver the scale-up command to the virtualization software 1240, and may update and store information about the MAC SC 1214 of the vRAN package 1210, the information being changed in response to the scale-up command.

In response to the scale-up command, the virtualization software 1240 may increase the resource to be allocated to the MAC SC 1214 of the vRAN package 1210. For example, the virtualization software 1240 may increase a CPU core and a RAM memory allocated to the MAC SC 1214 of the vRAN package 1210.

Figure 13A:
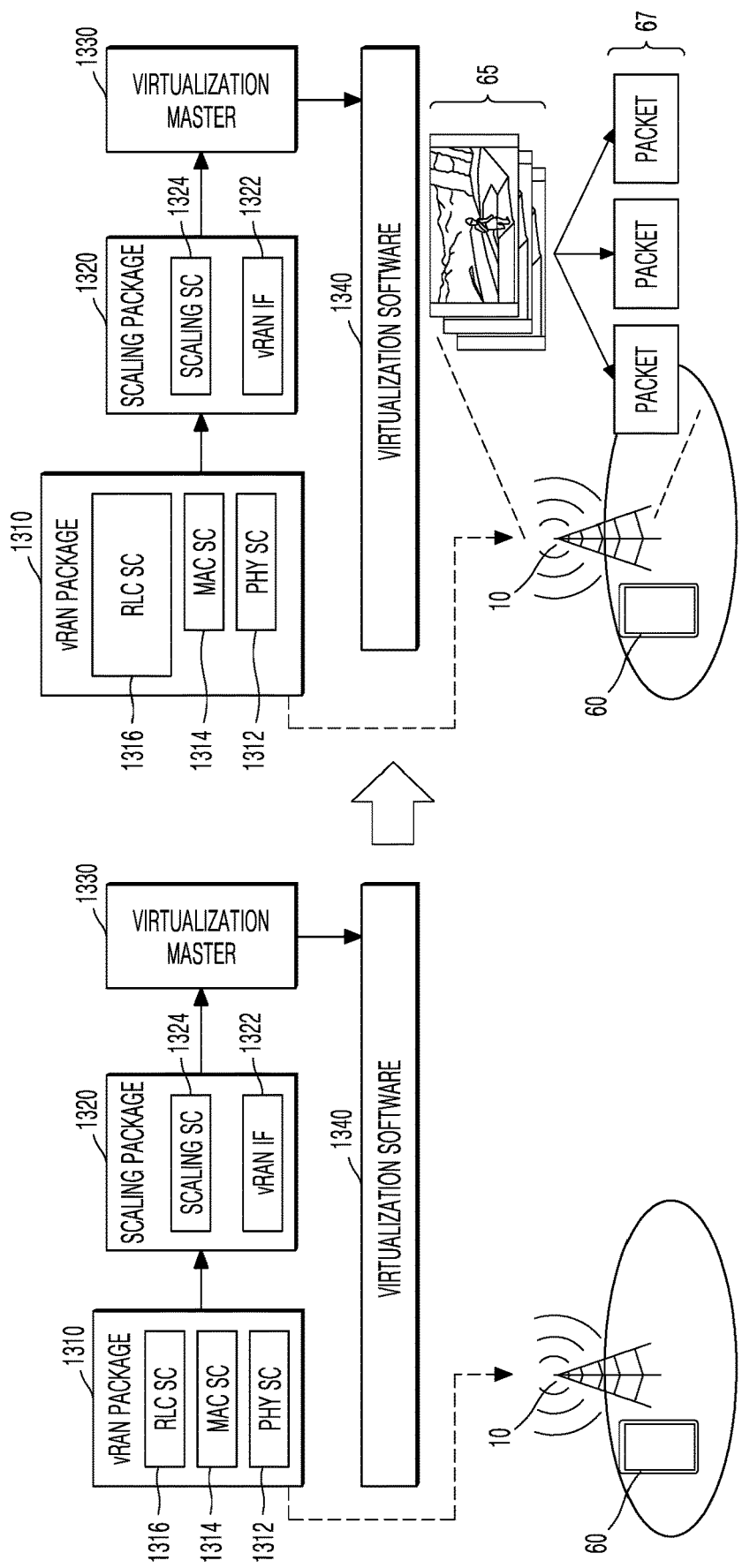
FIG. 13A is a diagram illustrating an example method of adjusting, by a server, a resource to be allocated to an SC, when traffic of a streaming-based mobile game service occurs, according to an embodiment of the disclosure.

FIG. 13A is a diagram for describing a method of adjusting, by a server, a resource to be allocated to an SC, when traffic of a streaming-based mobile game service occurs, according to an embodiment of the disclosure.

Referring to FIG. 13A, the server may drive software for performing a vRAN function through hardware included in the server. In particular, an OS may be driven in the hardware, and may manage the hardware and virtualization software 1340 that is executed in the server. Because descriptions of the hardware, the OS, and the virtualization software are the same as those provided with reference to FIG. 2 (see also FIGS. 3-7), further descriptions are not provided here.

Hereinafter, to describe the method of adjusting, by the server, a resource to be allocated to an SC of a vRAN package, the method being performed when traffic of a streaming-based mobile game service occurs, an operation of each of a plurality of items of software described with reference to FIG. 2 will now be described in detail. In addition, an operation in each software may be performed in a manner that a CPU in the server executes instructions stored in a RAM, a storage, or the like. For example, a PHY SC 1312, a MAC SC 1314, and a RLC SC 1316 included in a vRAN package 1310 may respectively perform, through execution of the instructions, a PHY layer function, a MAC layer function, and a RLC layer function on traffic delivered from the BS 10.

The BS 10 according to an embodiment of the disclosure may identify a service type a UE 60 attempts to use, based on service type information included in an RRC connection configuration message transmitted by the UE 60 in an initial access procedure.

The vRAN package 1310 may identify, based on the service type information, which service caused traffic received from the BS 10, the service type information being identified in the initial access procedure between the UE 60 and the BS 10. The vRAN package 1310 may determine target capability information for processing the traffic, according to the identified service type. For example, the vRAN package 1310 may determine target latency of the streaming-based mobile game service to be 0.01 s, and a target data rate thereof to be 10 Gbps. However, this is merely an example, and according to types of a mobile game service, for a game service in which real-time control is more important than an image quality, a URLLC attribute is further important, and in this case, the vRAN package 1310 may determine target latency of the game service to be 0.001 s, and a target data rate thereof to be 1 Gbps.

According to an embodiment of the disclosure, a scaling package 1320 may predict an increase in traffic of the streaming-based mobile game service and thus may adjust a resource to be allocated to the RLC SC 1316. In the streaming-based mobile game service, a game may be executed in a cloud server (not shown) and a screen image due to execution of the game may be captured in a fast and periodic manner and then may be transmitted to a UE. In this regard, when a size of captured screen images 65 is great and thus it is difficult to transmit them at one time, it is desired to divide the captured screen images 65 into a plurality of packets 67. An operation of dividing the captured screen images 65 into the plurality of packets 67 may be performed by a RLC layer. Accordingly, when a number of the UE accessing the base station for using the streaming-based mobile game service is increased, computations by the RLC SC 1316 may be increased.

The scaling package 1320 may include a vRAN IF 1322 and a scaling SC 1324. The vRAN IF 1322 may receive traffic information about traffic of the BS 10 from the vRAN package 1310. Also, the vRAN IF 1322 may receive information about a resource allocated to the vRAN package 1310 so as to process the traffic.

The scaling SC 1324 may predict traffic according to each of the service types to occur in the BS 10, based on pre-configured service type information and the traffic information. For example, the scaling SC 1324 may identify which service causes traffic occurred after the initial access procedure, based on the service type information delivered in the initial access procedure between the UE 60 and the BS 10.

The scaling SC 1324 may predict that traffic of the streaming-based mobile game service will occur in a t5-t6 time period on Friday, based on the number of UEs using the streaming-based mobile game service in each time zone on each day of a week. Also, the scaling SC 1324 may identify an amount of a resource used to process traffic occurred in the t5-t6 time period on Friday. Based on a result of the identifying, the scaling SC 1324 may predict that 4 CPU cores and 30 GB of a RAM memory have to be additionally allocated to the RLC SC 1316 because the number of UEs using the streaming-based mobile game service is increased by at least a third threshold value in the t5-t6 time period on Friday.

According to an embodiment of the disclosure, because it is predicted that the number of UEs using the streaming-based mobile game service will be increased by at least the third threshold value in the t5-t6 time period on Friday, the scaling SC 1324 may deliver, before a t5 time point, a scale-up command to a virtualization master 1330 so as to increase a resource to be allocated to the RLC SC 1316 of the vRAN package 1310. The virtualization master 1330 may deliver the scale-up command to the virtualization software 1340, and may update and store information about the RLC SC 1316 of the vRAN package 1310, the information being changed in response to the scale-up command. In response to the scale-up command, the virtualization software 1340 may increase the resource to be allocated to the RLC SC 1316 of the vRAN package 1310. For example, the virtualization software 1340 may increase a CPU core and a RAM memory allocated to the RLC SC 1316 of the vRAN package 1310.

Figure 13B:
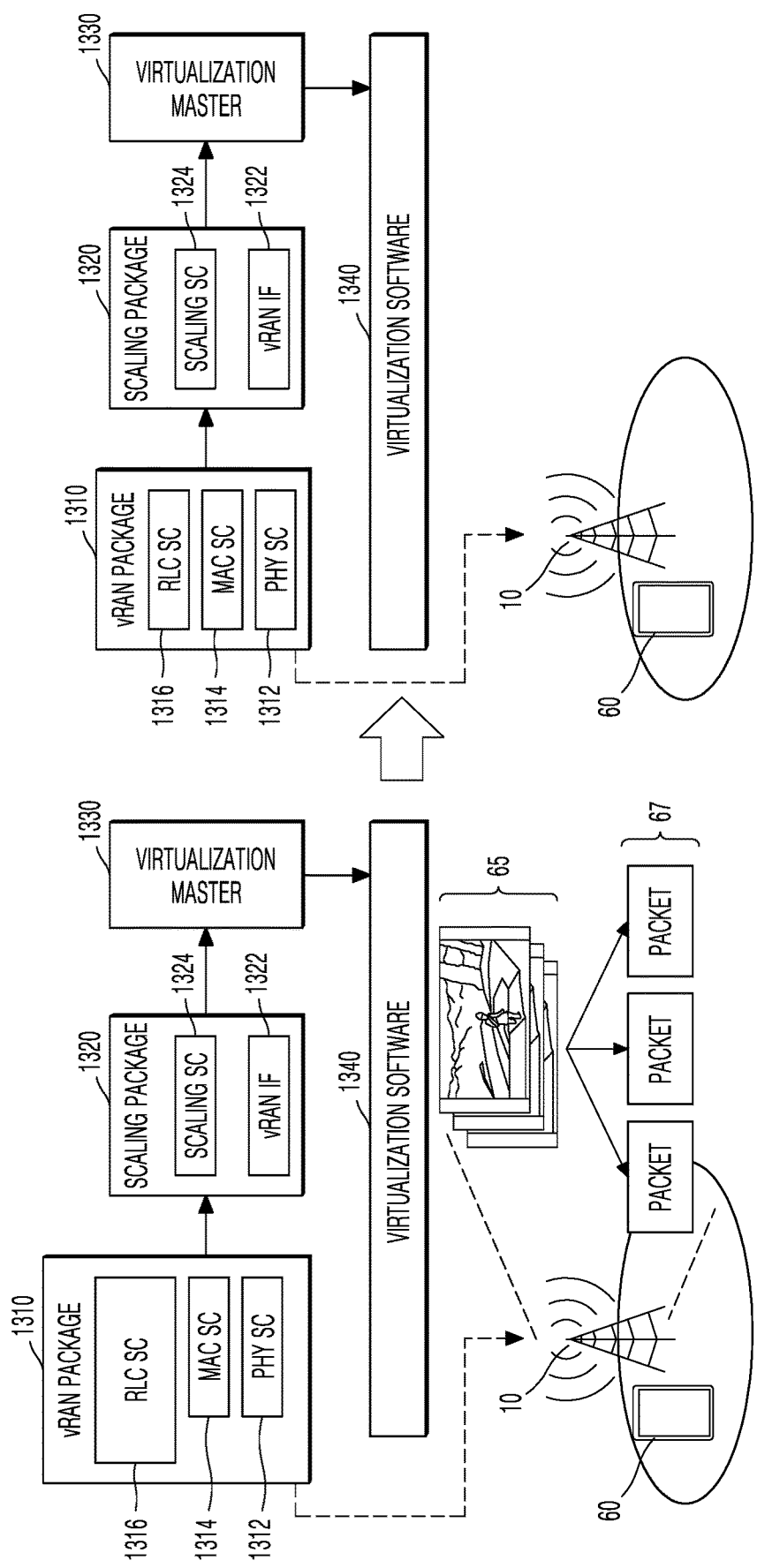
FIG. 13B is a diagram illustrating an example method of adjusting, by a server, a resource to be allocated to an SC, when traffic of a streaming-based mobile game service occurs, according to another embodiment of the disclosure.

FIG. 13B is a diagram for describing a method of adjusting, by a server, a resource to be allocated to an SC, when traffic of a streaming-based mobile game service occurs, according to another embodiment of the disclosure.

Referring to FIG. 13B, the server may drive software for performing a vRAN function through hardware included in the server. For example, the software may include a vRAN package 1310, a scaling package 1320, a virtualization master 1330, and virtualization software 1340. The vRAN package 1310, the scaling package 1320, the virtualization master 1330, and the virtualization software 1340 in FIG. 13B may correspond to a vRAN package, a scaling package, a virtualization master, and virtualization software that are described above with reference to FIG. 13A.

Hereinafter, in a present embodiment of the disclosure, descriptions of FIG. 13B which correspond to those of FIG. 13A are not provided.

According to an embodiment of the disclosure, the scaling package 1320 may predict a time when the streaming-based mobile game service ends and thus may adjust a resource to be allocated to a RLC SC 1316. The scaling package 1320 may include a vRAN IF 1322 and a scaling SC 1324. The vRAN IF 1322 may receive traffic information about traffic of a UE 60 from the vRAN package 1310 and information about a resource allocated to the vRAN package 1310 so as to process the traffic.

For example, the scaling SC 1324 may predict that the streaming-based mobile game service will end after a t6 time point on Friday. The scaling SC 1324 may previously predict the end of the traffic of the streaming-based mobile game service with respect to the BS 10 before a time when the traffic ends and thus may rapidly control a resource to be applied to the RLC SC 1316. In detail, the scaling SC 1324 may deliver a scale-down command to the virtualization master 1330 so as to decrease a resource to be allocated to the RLC SC 1316 of the vRAN package 1310. The virtualization master 1330 may deliver the scale-down command to the virtualization software 1340, and may update and store information about the RLC SC 1316 of the vRAN package 1310, the information being changed in response to the scale-down command. In response to the scale-down command, the virtualization software 1340 may decrease the resource to be allocated to the RLC SC 1316 of the vRAN package 1310. For example, the virtualization software 1340 may decrease a CPU core and a RAM memory allocated to the RLC SC 1316 of the vRAN package 1310.

Figure 14A:
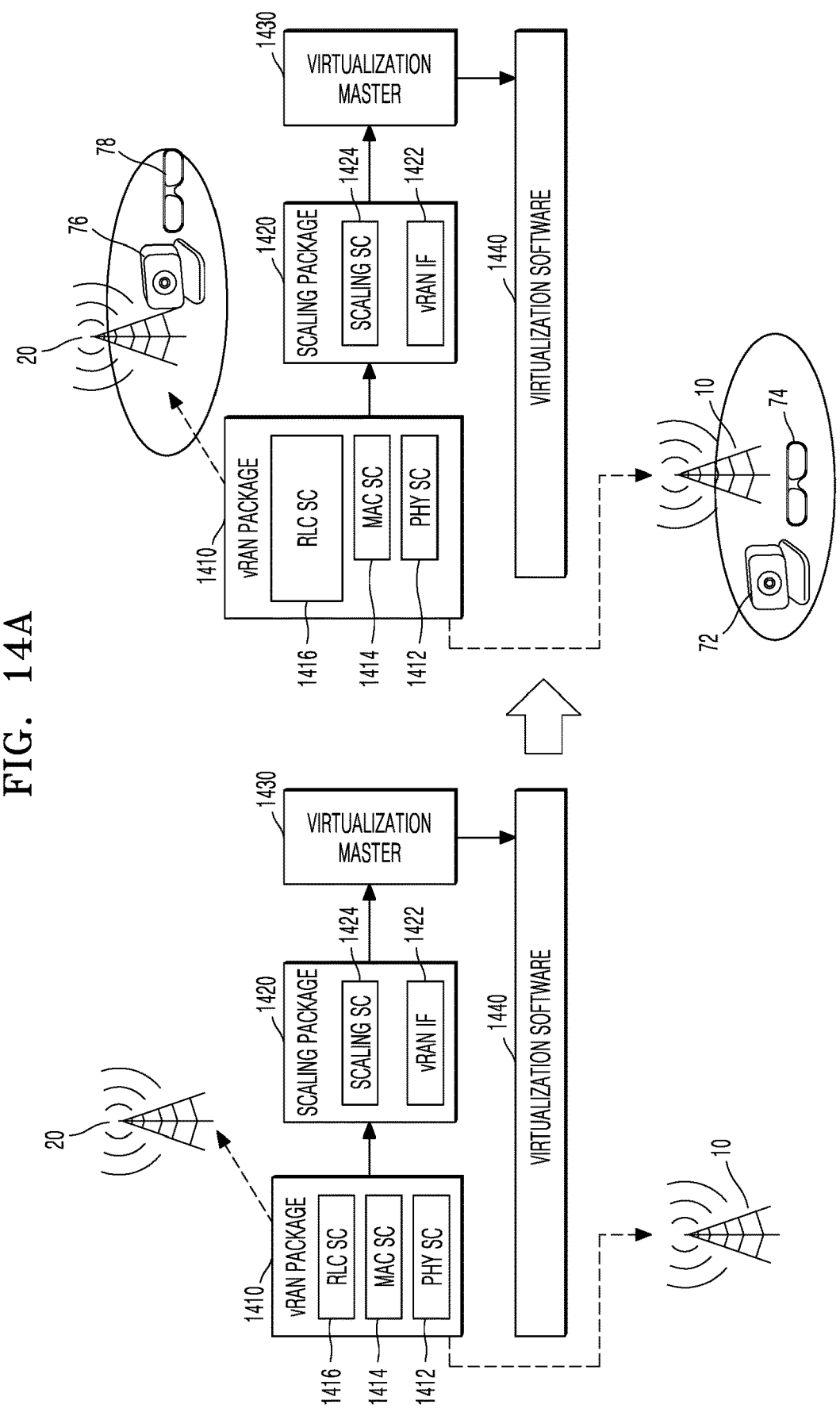
FIG. 14A is a diagram illustrating an example method of adjusting, by a server, a resource to be allocated to an SC, when traffic of an augmented reality (AR) telepresence service occurs, according to an embodiment of the disclosure.

FIG. 14A is a diagram for describing a method of adjusting, by a server, a resource to be allocated to an SC, when traffic of an AR telepresence service occurs, according to an embodiment of the disclosure.

Referring to FIG. 14A, the server may drive software for performing a vRAN function through hardware included in the server. In particular, an OS may be driven in the hardware, and may manage the hardware and virtualization software 1440 that is executed in the server. Because descriptions of the hardware, the OS, and the virtualization software are the same as those provided with reference to FIG. 2 (see also FIGS. 3-7), further descriptions are not provided here.

Hereinafter, to describe the method of adjusting, by the server, a resource to be allocated to an SC of a vRAN package, the method being performed when it is predicted that traffic of an AR telepresence service will occur, an operation of each of a plurality of items of software described with reference to FIG. 2 will now be described in detail. In addition, an operation in each software may be performed in a manner that a CPU in the server executes instructions stored in a RAM, a storage, or the like.

Traffic occurred in the BSs 10 and 20 may be delivered to a vRAN package 1410. A PHY SC 1412, a MAC SC 1414, and a RLC SC 1416 included in the vRAN package 1410 may respectively perform a PHY layer function, a MAC layer function, and a RLC layer function on the delivered traffic.

Each of the BSs 10 and 20 may identify a service type a UE attempts to use, in an initial access procedure with the UE. For example, each of the BSs 10 and 20 may identify a service type the UE attempts to use, based on service type information included in an RRC connection configuration message transmitted by the UE in the initial access procedure. However, this is merely an example, and a method by which the BSs 10 and 20 identify a service type is not limited to the aforementioned example. As another example, when each of the BSs 10 and 20 is pre-configured to provide a particular service to a particular time-frequency resource domain, each of the BSs 10 and 20 may identify a service type by determining whether a resource domain where traffic occurred corresponds to a resource domain that was pre-configured for the particular service.

The vRAN package 1410 may receive, from the BSs 10 and 20, information about the service type the UE attempts to use. When the information about the service type is delivered, the vRAN package 1410 may determine a processing capability with respect to traffic to occur between the UE and a BS (e.g., the BS 10). For example, the vRAN package 1410 may obtain, from the BSs 10 and 20, information indicating that a service type connected UEs 72, 74, 76, and 78 attempt to use is an AR telepresence service. Traffic of the AR telepresence service may occur in a process of delivering images captured by webcam terminals 72 and 76 to AR glasses 74 and 78 of users. In the AR telepresence service, the captured images have to be rapidly delivered to the AR glasses 74 and 78 of the users in remote places, such that an URLLC attribute may be important. Accordingly, the PHY SC 1412, the MAC SC 1414, and the RLC SC 1416 included in the vRAN package 1410 may process traffic so as to/reduce latency from being greater than 1 ms, the traffic being received from the UEs 72, 74, 76, and 78. However, this is merely an example, and, when a quality of a captured image provided via the AR telepresence service to the users in remote places is important, an eMBB attribute is important such that the PHY SC 1412, the MAC SC 1414, and the RLC SC 1416 included in the vRAN package 1410 may process traffic so as to make a data rate maintain at least a certain level or above.

In the AR telepresence service, a high-resolution image is divided into a plurality of packets and the packets are transmitted in real time, such that a load of the RLC SC 1416 from among the PHY SC 1412, the MAC SC 1414, and the RLC SC 1416 may be relatively large, compared to processing of traffic due to different service types. Accordingly, to process traffic due to the AR telepresence service, it is desired to increase a resource to be allocated to the RLC SC 1416.

According to an embodiment of the disclosure, the scaling package 1420 may output a command for adjusting resources allocated to the PHY SC 1412, the MAC SC 1414, and the RLC SC 1416. To further describe the scaling package 1420, the scaling package 1420 may include a vRAN IF 1422 and a scaling SC 1424. The vRAN IF 1422 may receive traffic information about traffic of the BSs 10 and 20, the traffic being processed by the vRAN package 1410. The vRAN IF 1422 may receive information about a resource used by the vRAN package 1410 so as to process traffic. However, this is merely an example, and the information about a resource used by the vRAN package 1410 so as to process traffic may be obtained by the scaling SC 1424 via hardware monitoring.

According to an embodiment of the disclosure, the scaling SC 1424 may determine traffic of the AR telepresence service which is to occur in the BSs 10 and 20, based on traffic information about traffic of the AR telepresence service, the traffic being previously processed by the vRAN package 1410. For example, as a result of classifying, based on service types, traffic information about traffics processed by the vRAN package 1410 for a week, the scaling SC 1424 may identify that traffic of the AR telepresence service occurs in a t1-t2 time period on every Tuesday. Accordingly, to process traffic of the AR telepresence service, the scaling SC 1424 may deliver, before a t1 time point on Tuesday, a scale-up command to a virtualization master 1430 so as to increase a CPU and a memory allocated to the RLC SC 1416.

The virtualization master 1430 may deliver the scale-up command to the virtualization software 1440, and may update and store information about the RLC SC 1416 for which a resource to be allocated thereto is changed in response to the scale-up command. In response to the scale-up command, the virtualization software 1440 may increase the resource to be allocated to the RLC SC 1416 of the vRAN package 1410. For example, the virtualization software 1440 may increase a CPU core and a RAM memory allocated to the RLC SC 1416 of the vRAN package 1410.

Figure 14B:
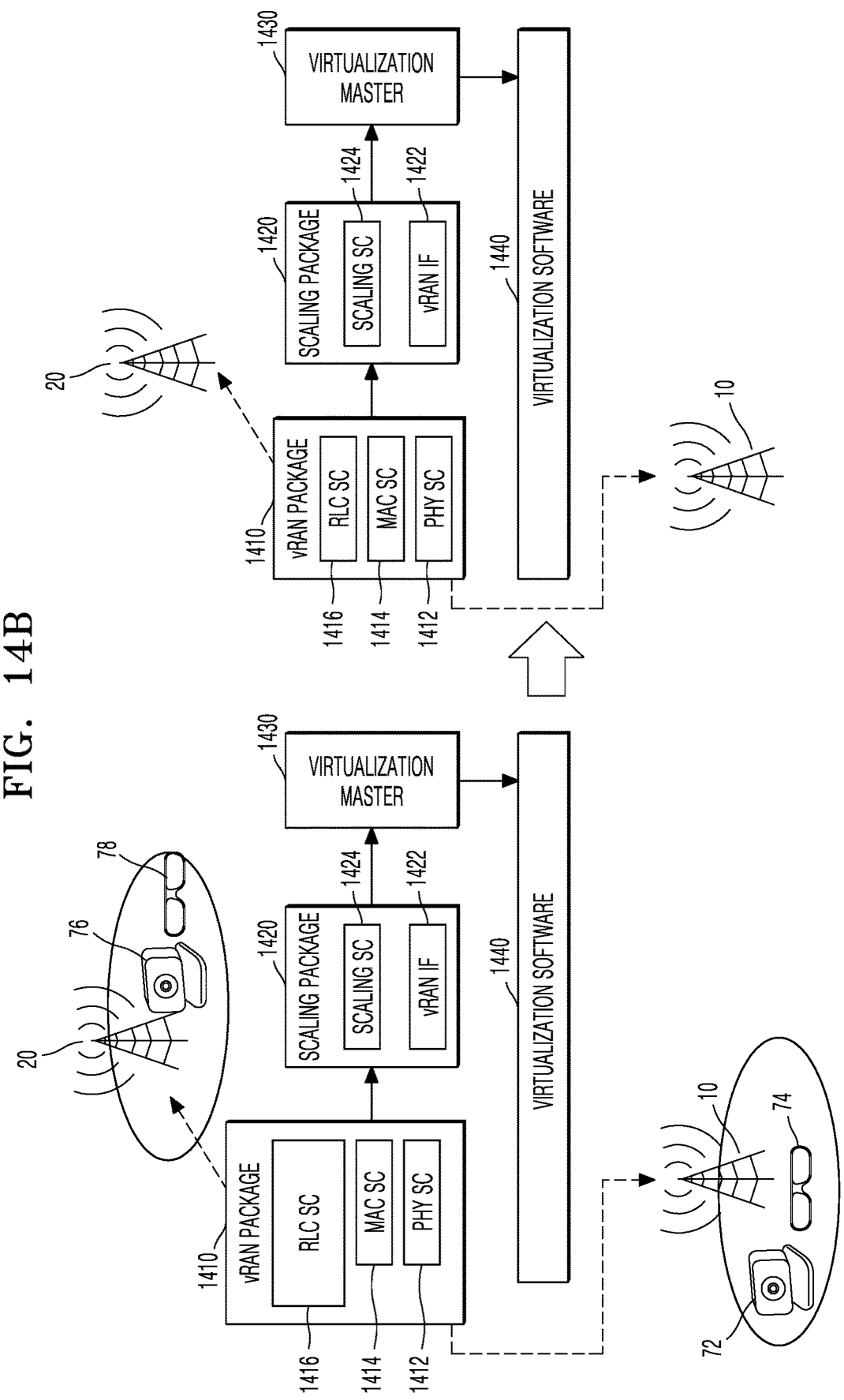
FIG. 14B is a diagram illustrating an example method of adjusting, by a server, a resource to be allocated to an SC, when traffic of an AR telepresence service occurs, according to another embodiment of the disclosure.

FIG. 14B is a diagram for describing a method of adjusting, by a server, a resource to be allocated to an SC, when traffic of an AR telepresence service occurs, according to another embodiment of the disclosure.

Referring to FIG. 14B, the server may drive software for performing a vRAN function through hardware included in the server. For example, the software may include a vRAN package 1410, a scaling package 1420, a virtualization master 1430, and virtualization software 1440. The vRAN package 1410, the scaling package 1420, the virtualization master 1430, and the virtualization software 1440 in FIG. 14B may correspond to a vRAN package, a scaling package, a virtualization master, and virtualization software that are described above with reference to FIG. 14A.

Hereinafter, in a present embodiment of the disclosure, descriptions of FIG. 14B which correspond to those of FIG. 14A are not provided.

According to an embodiment of the disclosure, the scaling package 1420 may predict a time when the AR telepresence service ends and thus may adjust a resource to be allocated to a RLC SC 1416. The scaling package 1420 may include a vRAN IF 1422 and a scaling SC 1424. The vRAN IF 1422 may receive traffic information about traffic of UEs 72, 74, 76, and 78 from the vRAN package 1410 and information about a resource allocated to the vRAN package 1410 so as to process the traffic.

For example, the scaling SC 1424 may predict that the AR telepresence service will end after a t6 time point on Tuesday. The scaling SC 1424 may previously predict the end of the traffic of the AR telepresence service with respect to a BS (e.g., the BS 10) before a time when the traffic ends and thus may rapidly control a resource to be applied to the RLC SC 1416. In detail, the scaling SC 1424 may deliver a scale-down command to the virtualization master 1430 so as to decrease a resource to be allocated to the RLC SC 1416 of the vRAN package 1410. The virtualization master 1430 may deliver the scale-down command to the virtualization software 1440, and may update and store information about the RLC SC 1416 of the vRAN package 1410, the information being changed in response to the scale-down command. In response to the scale-down command, the virtualization software 1440 may decrease the resource to be allocated to the RLC SC 1416 of the vRAN package 1410. For example, the virtualization software 1440 may decrease a CPU core and a RAM memory allocated to the RLC SC 1416 of the vRAN package 1410.

Figure 15A:
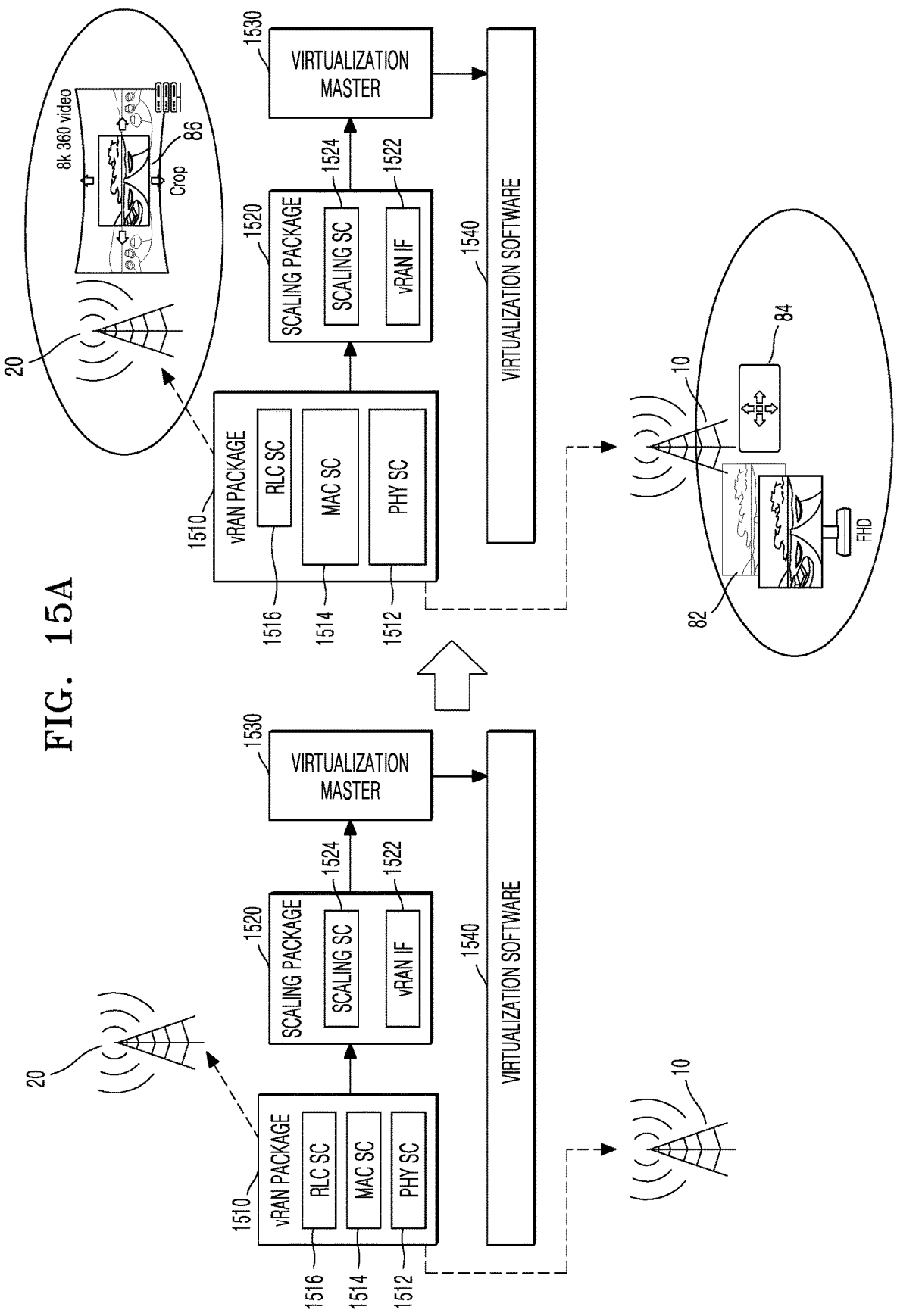
FIG. 15A is a diagram illustrating an example method of adjusting, by a server, a resource to be allocated to an SC, when traffic of an interactive streaming service occurs, according to an embodiment of the disclosure.

FIG. 15A is a diagram for describing a method of adjusting, by a server, a resource to be allocated to an SC, when traffic of an interactive streaming service occurs, according to an embodiment of the disclosure.

Referring to FIG. 15A, the server may drive software for performing a vRAN function through hardware included in the server. In particular, an OS may be driven in the hardware, and may manage the hardware and virtualization software 1540 that is executed in the server. Because descriptions of the hardware, the OS, and the virtualization software are the same as those provided with reference to FIG. 2 (see also FIGS. 3-7), further descriptions are not provided here.

Hereinafter, to describe the method of adjusting, by the server, a resource to be allocated to an SC of a vRAN package, the method being performed when it is predicted that traffic of an interactive streaming service will occur, an operation of each of a plurality of items of software described with reference to FIG. 2 will now be described in detail. In addition, an operation in each software may be performed in a manner that a CPU in the server executes instructions stored in a RAM, a storage, or the like.

Traffic occurred in the BSs 10 and 20 may be delivered to a vRAN package 1510. A PHY SC 1512, a MAC SC 1514, and a RLC SC 1516 included in the vRAN package 1510 may respectively perform a PHY layer function, a MAC layer function, and a RLC layer function on the delivered traffic.

Each of the BSs 10 and 20 may identify a service type a UE attempts to use, in an initial access procedure with the UE. For example, each of the BSs 10 and 20 may identify a service type the UE attempts to use, based on service type information included in an RRC connection configuration message transmitted by the UE in the initial access procedure. However, this is merely an example, and a method by which the BSs 10 and 20 identify a service type is not limited to the aforementioned example. As another example, when each of the BSs 10 and 20 is pre-configured to provide a particular service to a particular time-frequency resource domain, each of the BSs 10 and 20 may identify a service type by determining whether a resource domain where traffic occurred corresponds to a resource domain that was pre-configured for the particular service.

The vRAN package 1510 may receive, from the BSs 10 and 20, information about the service type the UE attempts to use. When the information about the service type is delivered, the vRAN package 1510 may determine a processing capability with respect to traffic to occur between the UE and a BS (e.g., the BS 10). For example, the vRAN package 1510 may obtain, from the BS 10, information indicating that a service type connected UEs 82 and 84 attempt to use is the interactive streaming service. Traffic of the interactive streaming service may occur in a process of cropping a part 86 of high-resolution images stored in a cloud server, in response to a control signal of a terminal 84 of a user, and delivering the part 86 to a display device 82 of the user. In the interactive streaming service, because the control signal of the terminal 84 of the user has to be rapidly transmitted to the cloud server, a low latency capability may be requested, and because a high-resolution image has to be cropped and then delivered to the display device 82 of the user, a high data rate capability may be requested. Accordingly, eMBB and URLLC attributes are important, such that the PHY SC 1512, the MAC SC 1514, and the RLC SC 1516 included in the vRAN package 1510 may be configured to process traffic in a manner that latency does not exceed 5 ms and a data rate is equal to or less than 20 Gbps. However, this is merely an example, and target capability information may be differently configured according to types of content provided by the interactive streaming service.

In the interactive streaming service, a range of an image to be cropped in response to a user input has to be configured in real time, and a high-volume image has to be transmitted, such that a load of the PHY SC 1512 and the MAC SC 1514 may be relatively large, compared to processing of traffic due to different service types. Accordingly, to process traffic due to the interactive streaming service, it is desired to increase a resource to be allocated to the PHY SC 1512 and the MAC SC 1514.

According to an embodiment of the disclosure, the scaling package 1520 may output a command for adjusting resources allocated to the PHY SC 1512, the MAC SC 1514, and the RLC SC 1516. To further describe the scaling package 1520, the scaling package 1520 may include a vRAN IF 1522 and a scaling SC 1524. The vRAN IF 1522 may receive traffic information about traffic of the BSs 10 and 20, the traffic being processed by the vRAN package 1510. The vRAN IF 1522 may receive information about a resource used by the vRAN package 1510 so as to process traffic. However, this is merely an example, and the information about a resource used by the vRAN package 1510 so as to process traffic may be obtained by the scaling SC 1524 via hardware monitoring.

According to an embodiment of the disclosure, the scaling SC 1524 may determine traffic of the interactive streaming service which is to occur in the BSs 10 and 20, based on traffic information about traffic of the interactive streaming service, the traffic being previously processed by the vRAN package 1510.

For example, as a result of classifying, based on service types, traffic information about traffics processed by the vRAN package 1510 for a week, the scaling SC 1524 may identify that traffic of the interactive streaming service occurs in a t3-t4 time period of every evening. Accordingly, to process traffic of the AR telepresence service, the scaling SC 1524 may deliver, before a t3 time point, a scale-up command to a virtualization master 1530 so as to increase a CPU and a memory allocated to the PHY SC 1512 and the MAC SC 1514.

The virtualization master 1530 may deliver the scale-up command to the virtualization software 1540, and may update and store information about the PHY SC 1512 and the MAC SC 1514 for which a resource to be allocated thereto is changed in response to the scale-up command. In response to the scale-up command, the virtualization software 1540 may increase the resource to be allocated to the PHY SC 1512 and the MAC SC 1514 of the vRAN package 1510. For example, the virtualization software 1540 may increase a CPU core and a RAM memory allocated to the PHY SC 1512 and the MAC SC 1514 of the vRAN package 1510.

Figure 15B:
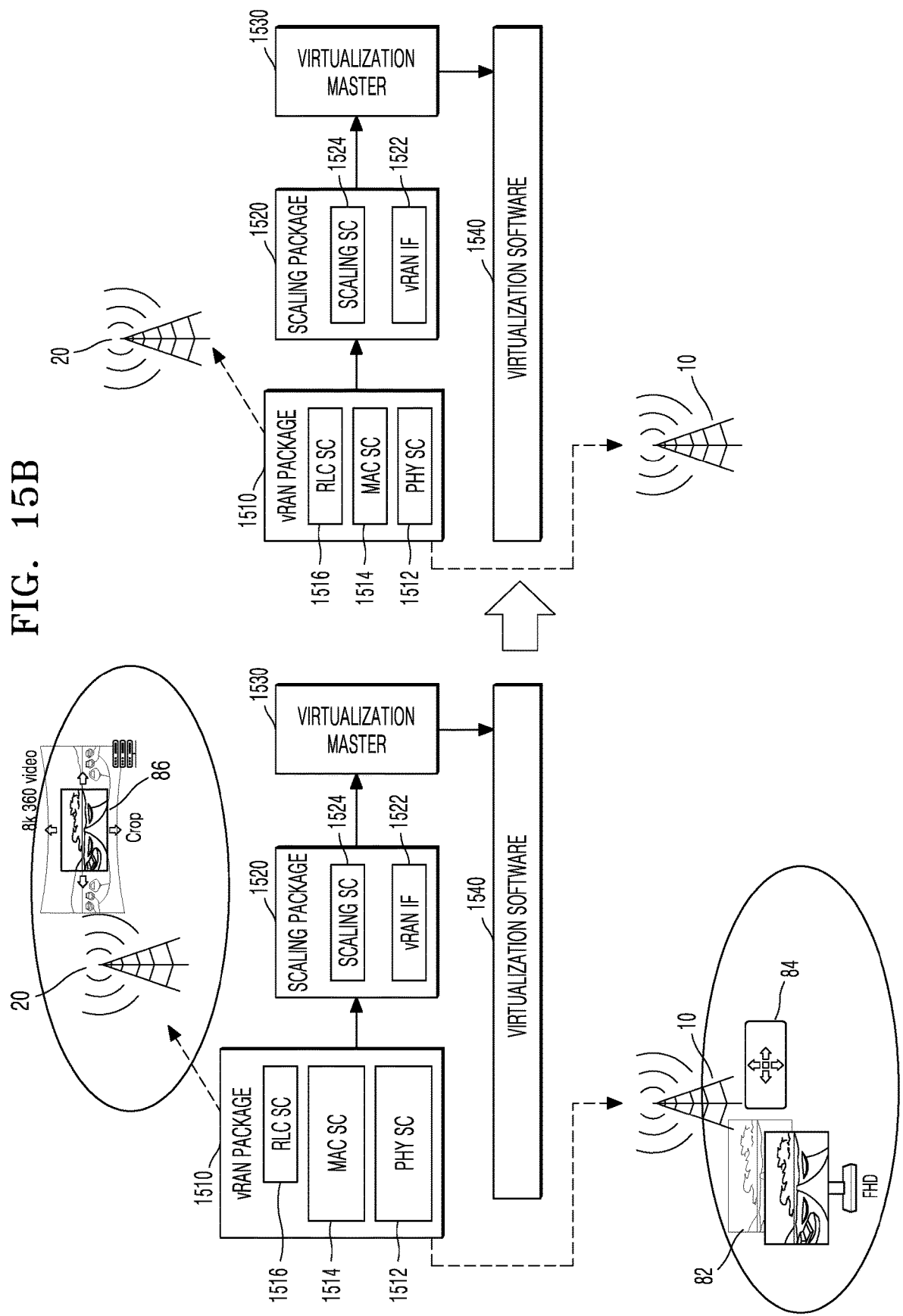
FIG. 15B is a diagram illustrating an example method of adjusting, by a server, a resource to be allocated to an SC, when traffic of an interactive streaming service occurs, according to another embodiment of the disclosure.

FIG. 15B is a diagram for describing a method of adjusting, by a server, a resource to be allocated to an SC, when traffic of an interactive streaming service occurs, according to another embodiment of the disclosure.

Referring to FIG. 15B, the server may drive software for performing a vRAN function through hardware included in the server. For example, the software may include a vRAN package 1510, a scaling package 1520, a virtualization master 1530, and virtualization software 1540. The vRAN package 1510, the scaling package 1520, the virtualization master 1530, and the virtualization software 1540 in FIG. 15B may correspond to a vRAN package, a scaling package, a virtualization master, and virtualization software that are described above with reference to FIG. 15A.

Hereinafter, in a present embodiment of the disclosure, descriptions of FIG. 15B which correspond to those of FIG. 15A are not provided.

According to an embodiment of the disclosure, the scaling package 1520 may predict a time when the interactive streaming service ends and thus may adjust a resource to be allocated to a PHY SC 1512 and a MAC SC 1514. The scaling package 1520 may include a vRAN IF 1522 and a scaling SC 1524. The vRAN IF 1522 may receive traffic information about traffic of UEs 82 and 84 from the vRAN package 1510 and information about a resource allocated to the vRAN package 1510 so as to process the traffic.

For example, the scaling SC 1524 may predict that the interactive streaming service will end after a t4 time point in every evening. The scaling SC 1524 may previously predict the end of the traffic of the interactive streaming service with respect to the BS 10 before a time when the traffic ends and thus may rapidly control a resource to be applied to the PHY SC 1512 and the MAC SC 1514. In detail, the scaling SC 1524 may deliver a scale-down command to the virtualization master 1530 so as to decrease a resource to be allocated to the PHY SC 1512 and the MAC SC 1514 of the vRAN package 1510. The virtualization master 1530 may deliver the scale-down command to the virtualization software 1540, and may update and store information about the PHY SC 1512 and the MAC SC 1514 of the vRAN package 1510, the information being changed in response to the scale-down command. In response to the scale-down command, the virtualization software 1540 may decrease the resource to be allocated to the PHY SC 1512 and the MAC SC 1514 of the vRAN package 1510. For example, the virtualization software 1540 may decrease a CPU core and a RAM memory allocated to the PHY SC 1512 and the MAC SC 1514 of the vRAN package 1510.

Figure 16:
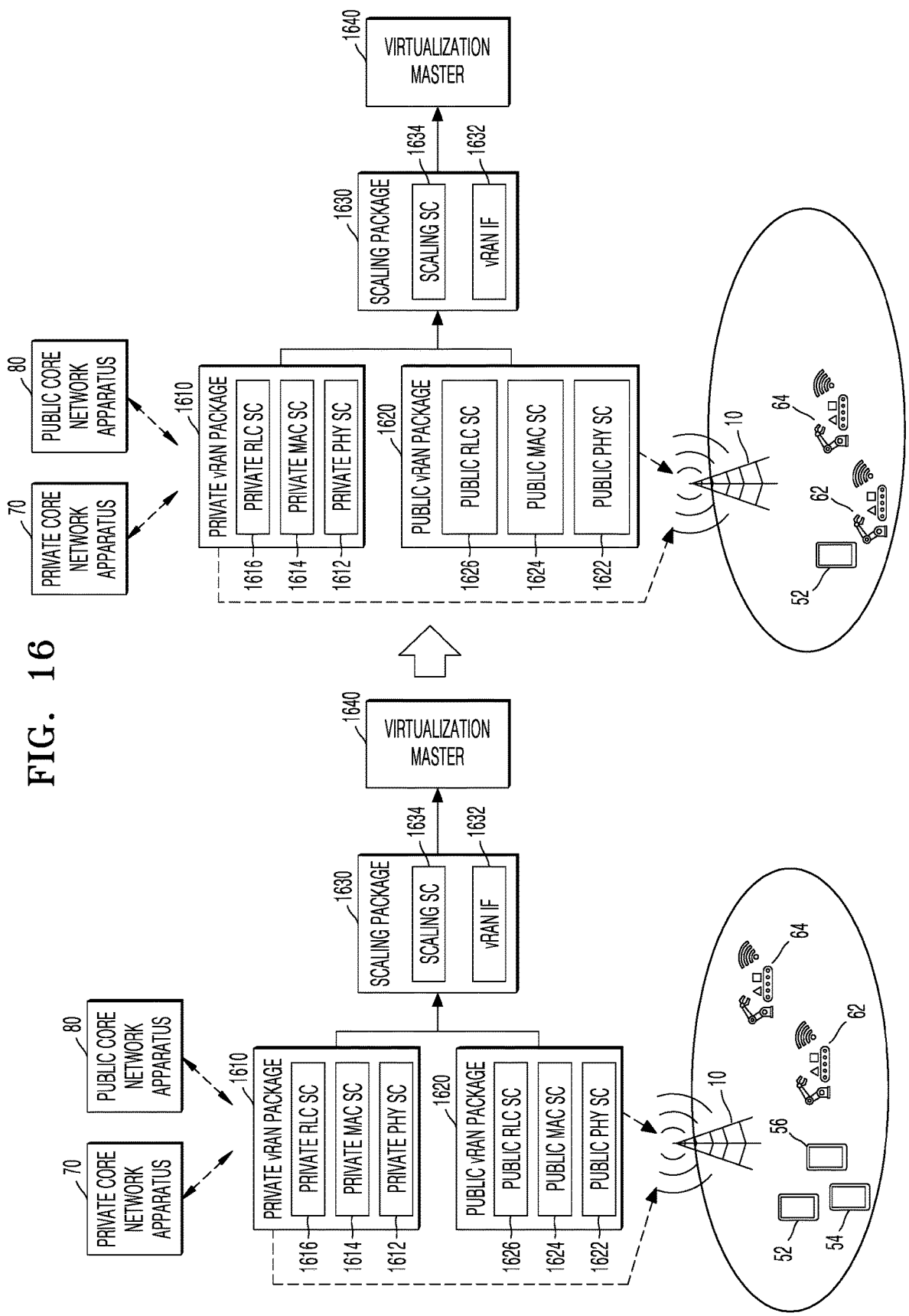
FIG. 16 is a diagram illustrating an example method of adjusting, by a server, a resource to be allocated to an SC, when traffic of a private new radio (NR) service and a public NR service occurs, according to an embodiment of the disclosure.

FIG. 16 is a diagram for describing a method of adjusting, by a server, a resource to be allocated to an SC, when traffic of a private NR service and a public NR service occurs, according to an embodiment of the disclosure.

Referring to FIG. 16, the server may drive software for performing a vRAN function through hardware included in the server. In particular, an OS may be driven in the hardware, and may manage the hardware and virtualization software (not shown) that is executed in the server. Because descriptions of the hardware, the OS, and the virtualization software are the same as those provided with reference to FIG. 2 (see also FIGS. 3-7), further descriptions are not provided here.

Hereinafter, to describe the method of adjusting, by the server, a resource to be allocated to an SC of a vRAN package, the method being performed when it is predicted that traffic of the private NR service and the public NR service will occur, an operation of each of a plurality of items of software described with reference to FIG. 2 will now be described in detail. In addition, an operation in each software may be performed in a manner that a CPU in the server executes instructions stored in a RAM, a storage, or the like.

The private NR service is used to provide a communication service to devices 62 and 64 in a particular group, and traffic due to the private NR service may be delivered to a private core network apparatus 70 that is separately arranged. Also, the public NR service is used to provide a common-use communication service to UEs 52, 54 and 56, and traffic due to the public NR service may be delivered to a public core network apparatus 80.

A private vRAN package 1610 may receive traffic occurred in the BS 10 due to the private NR service. A PHY SC 1612, a MAC SC 1614, and a RLC SC 1616 included in the private vRAN package 1610 may respectively perform a PHY layer function, a MAC layer function, and a RLC layer function on the delivered traffic. A public vRAN package 1620 may receive traffic occurred in the BS 10 due to the public NR service. A PHY SC 1622, a MAC SC 1624, and a RLC SC 1626 included in the public vRAN package 1620 may respectively perform a PHY layer function, a MAC layer function, and a RLC layer function on the delivered traffic.

The private vRAN package 1610 may deliver processed traffic to the private core network apparatus 70, and the public vRAN package 1620 may deliver processed traffic to the public core network apparatus 80.

According to an embodiment of the disclosure, a scaling package 1630 may output a command for adjusting resources allocated to the SCs 1612, 1614 and 1616, and 1622, 1624 and 1626 which are respectively included in the private vRAN package 1610 and the public vRAN package 1620. The scaling package 1630 may include a vRAN IF 1632 and a scaling SC 1634. The vRAN IF 1632 may receive traffic information about traffic of the BS 10, the traffic being processed by the private vRAN package 1610 and the public vRAN package 1620. The vRAN IF 1632 may receive information about a resource used by the private vRAN package 1610 and the public vRAN package 1620 so as to process traffic. However, this is merely an example, and the information about a resource used by the private vRAN package 1610 and the public vRAN package 1620 so as to process traffic may be obtained by the scaling SC 1634 via hardware monitoring.

According to an embodiment of the disclosure, the scaling SC 1634 may determine traffic to occur in the BS 10, based on traffic information about traffic being previously processed by each of the private vRAN package 1610 and the public vRAN package 1620. For example, the scaling SC 1634 may identify that traffic processed by the public vRAN package 1620 is equal to or greater than at least first threshold value in a t1-t2 time period every day but is decreased by a second threshold value or less after a t3 time point. Accordingly, the scaling SC 1634 may deliver, before a t1 time point, a scale-up command to a virtualization master 1640 so as to increase a CPU and a memory allocated to the PHY SC 1622, the MAC SC 1624, and the RLC SC 1626 included in the public vRAN package 1620.

The virtualization master 1640 may deliver the scale-up command to the virtualization software, and may update and store information about the PHY SC 1622, the MAC SC 1624, and the RLC SC 1626 for which a resource to be allocated thereto is changed in response to the scale-up command.

Also, the scaling SC 1634 may deliver, before a t3 time point, a scale-down command to the virtualization master 1640 so as to decrease a CPU and a memory to be allocated to the PHY SC 1622, the MAC SC 1624, and the RLC SC 1626 included in the public vRAN package 1620.

The virtualization master 1640 may deliver the scale-down command to the virtualization software, and may update and store information about the PHY SC 1622, the MAC SC 1624, and the RLC SC 1626 for which a resource to be allocated thereto is changed in response to the scale-down command.

Figure 17:
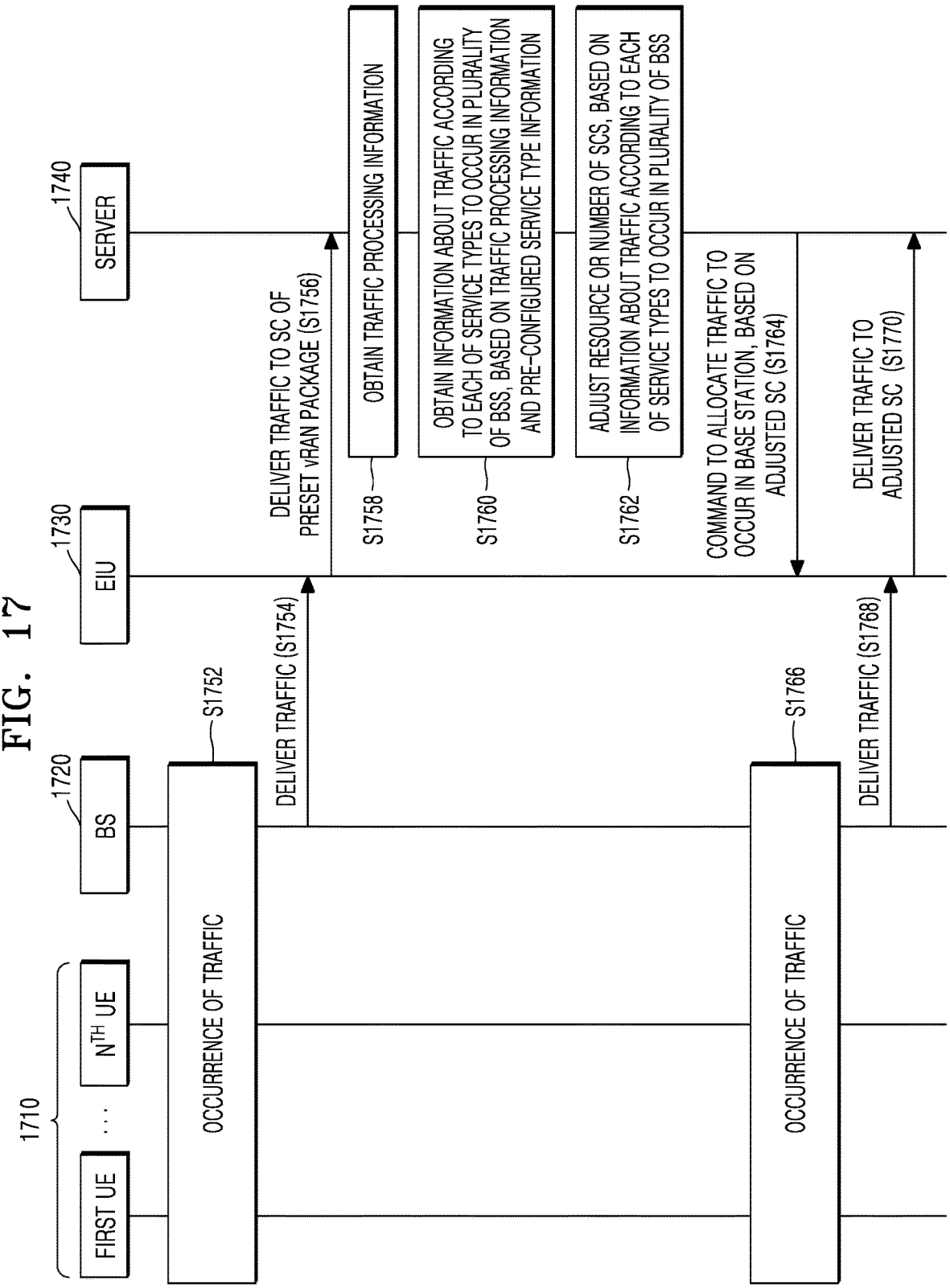
FIG. 17 is a flowchart illustrating example operations of a server for processing traffic between a plurality of user equipments (UEs) and a BS by adjusting a SC, according to an embodiment of the disclosure.

FIG. 17 is a flowchart for describing operations of a server for processing traffic between a plurality of UEs 1710 and a BS 1720 by adjusting at least one SC, according to an embodiment of the disclosure.

In operation S1752, traffic may occur between the plurality of UEs 1710 and the BS 1720. As described above with reference to FIGS. 2-7, the traffic refers to a data flow passing through a communication network in a predefined time, and a present embodiment of the disclosure, the traffic may occur between the plurality of UEs 1710 and the BS 1720 so as to exchange information for achieving a particular purpose (e.g., usage of a particular service).

In operation S1754, the BS 1720 may deliver the traffic to an EIU 1730. The EIU 1730 is a portion of a path connecting a server 1740 to a plurality of BSs (including the BS 1720) of a cell site(s).

In operation S1756, the EIU 1730 may deliver the traffic to a SC of a preset vRAN package of the server 1740. Information about BSs respectively allocated to at least one vRAN package generated in the server 1740 may be pre-configured in the EIU 1730.

In operation S1758, the server 1740 may obtain traffic processing information. The traffic processing information may include information about traffic occurred in the plurality of BSs, and information about a resource used in processing the traffic. The server 1740 may obtain the information about the traffic by monitoring the traffic delivered from each of the plurality of BSs (including the BS 1720) to the vRAN package via the EIU 1730. Also, the server 1740 may obtain information about a resource allocated to each vRAN package so as to process the delivered traffic.

Operation S1758 corresponds to operation S810 described above with reference to FIG. 8, and thus descriptions overlapping with those of operation S810 are not provided here.

In operation S1760, the server 1740 may obtain information about traffic according to each of service types to occur in the plurality of BSs, based on the traffic processing information and pre-configured service type information.

Operation S1760 corresponds to operation S820 described above with reference to FIG. 8, and thus descriptions overlapping with those of operation S820 are not provided here.

In operation S1762, the server 1740 may adjust a resource or the number of the SCs, based on the information about the traffic according to each of the service types to occur in the plurality of BSs.

Operation S1762 corresponds to operation S830 described above with reference to FIG. 8, and thus descriptions overlapping with those of operation S830 are not provided here.

In operation S1764, the server 1740 may command the EIU 1730 to allocate the traffic to occur in the BS 1720, based on the adjusted SC. For example, when a BS to be allocated to each vRAN package is changed because a vRAN package is newly generated or a vRAN package is removed in operation S1762, the server 1740 may deliver BS allocation information according to each of changed vRAN packages to the EIU 1730. Also, when a resource to be allocated to the SC is changed in operation S1762, the server 1740 may deliver information about the changed SC to the EIU 1730. However, this is merely an example, and thus, when the resource to be allocated to the SC is changed, the server 1740 may not deliver the information thereof to the EIU 1730.

In operation S1766, traffic may occur between the plurality of UEs 1710 and the BS 1720. In a present embodiment of the disclosure, for convenience of description, occurrence of the traffic is illustrated to indicate the traffic occurred after the SC of the server 1740 is adjusted, but this is merely an example, and the present embodiment of the disclosure is not limited to a case in which the occurrence of the traffic is performed after the SC is adjusted.

In operation S1768, the BS 1720 may deliver the traffic to the EIU 1730.

In operation S1770, the EIU 1730 may deliver the traffic to the adjusted SC, in response to a command received in operation S1764. For example, in a case where a resource allocated to at least one SC included in a first vRAN package from among a plurality of vRAN packages stored in the server 1740 is changed, and thus, a command for allocating the BS 1720 to the first vRAN package is received, the EIU 1730 may deliver the traffic to the at least one SC of the first vRAN package. Elements in a block diagram may be combined, an element may be added thereto, or at least one of the elements may be omitted according to actual specifications of an apparatus. That is, at least two elements may be combined to one element, or one element may be divided into two elements when necessary. Also, functions performed by each element are for describing the embodiments of the disclosure, and detailed operations or devices do not limit the scope of the disclosure.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, the BS and the UE may be operated in a manner that portions of an embodiment of the disclosure are combined with portions of another embodiment of the disclosure. Also, modifications based on the technical scope of the embodiments of the disclosure may be applied to various systems such as a Frequency Division Duplex (FDD) LTE system, a Time Division Duplex (TDD) LTE system, a 5G or NR system, or the like.

What is claimed is:

1. A method of performing, by a server, a radio access network (RAN) function, wherein the RAN function communicates with a core network entity via a backhaul, the method comprising:

obtaining traffic processing information via a fronthaul for a plurality of services having different requirements for at least one of data transmission rate, latency, or maximum connection density, wherein the traffic processing information includes information about traffic that occurred from the plurality of services, and information about at least one hardware resource used for processing the traffic at software components (SCs) virtualizing the RAN function;

identifying an amount of traffic that occurred in the RAN function for a service among the plurality of services based on the traffic processing information;

predicting an amount of traffic to occur in the RAN function for the service based on the identified amount of the traffic that occurred in the RAN function; and adjusting the at least one hardware resource for the SCs or a number of SCs allocated to the RAN function, based on the predicted amount of traffic, for processing the traffic predicted to occur in the RAN function.

2. The method of claim 1, wherein the obtaining of the traffic processing information comprises:

receiving the traffic processing information from a plurality of base stations and/or an external device connected to the server.

3. The method of claim 1, wherein the service types are classified according to at least one capability from among a data transmission rate, latency, and a maximum connection density that are requested for each of services.

4. The method of claim 1, wherein the adjusting comprises:

increasing the number of the SCs, when the amount of the traffic predicted to occur is to increase, and decreasing the number of the SCs when the amount of the traffic predicted to occur is to decrease.

5. The method of claim 1, wherein the adjusting comprises adjusting the number of the SCs in a unit of a package comprising a plurality of SCs.

6. The method of claim 1, wherein the predicting of the amount of the traffic comprises:

identifying a pattern of amount of traffic in the RAN function for the service, based on the traffic processing information; and predicting the traffic to occur, based on the pattern of the amount of the traffic.

7. The method of claim 1, wherein the adjusting comprises:

when an amount of traffic predicted to occur in a particular service is increased, increasing a hardware resource of a SC to perform a RAN function corresponding to the particular service, and when an amount of traffic predicted to occur in the particular service is decreased, decreasing the hardware resource of the SC to perform the RAN function corresponding to the particular service.

8. The method of claim 1, wherein the RAN function includes at least one of a physical (PHY) layer function, a medium access control (MAC) layer function, a radio link control (RLC) layer function, or a packet data convergence protocol (PDCP) layer function.

9. The method of claim 1, wherein the SC comprises at least one of a container or a virtual machine (VM).

10. A server for performing a radio access network (RAN) function, wherein the RAN function is operable to communicate with a core network entity via a backhaul, the server comprising:
- a transceiver;
- a memory storing one or more instructions; and
- at least one processor operable to execute the one or more instructions stored in the memory to:
  - obtain traffic processing information via a fronthaul for a plurality of services having different requirements for at least one of data transmission rate, latency, or maximum connection density, wherein the traffic processing information includes information about traffic that occurred from the plurality of services, and information about at least one hardware resource used for processing the traffic at software components (SCs) virtualizing the RAN function,
  - identify an amount of traffic that occurred in the RAN function for a service among the plurality of services based on the traffic processing information,
  - predict amount of traffic to occur in the RAN function for the service based on the identified amount of the traffic that occurred in the RAN function, and
  - adjust the at least one hardware resource for the SCs or a number of SCs allocated to the RAN function, based on the predicted amount of traffic, for processing the traffic predicted to occur in the RAN function.

11. The server of claim 10, wherein the at least one processor is further operable to execute the one or more instructions to receive the traffic processing information from a plurality of base stations or an external device connected to the server.

12. The server of claim 10, wherein the service types are classified according to at least one capability from among a data transmission rate, latency, and a maximum connection density that are requested for each of services.

13. The server of claim 10, wherein the at least one processor is further operable to execute the one or more instructions to:
- increase the number of the SCs, when the amount of the traffic predicted to occur is to increase, and
- decrease the number of the SCs, when the amount of the traffic predicted to occur is to decrease.

14. The server of claim 10, wherein the at least one processor is further operable to execute the one or more instructions to adjust the number of the SCs in a unit of a package comprising a plurality of SCs.

15. The server of claim 10, wherein the at least one processor is further operable to execute the one or more instructions to:
- identify a pattern of amount of traffic in the RAN function for the service, based on the traffic processing information; and
- predict the traffic to occur, based on the pattern of the amount of the traffic.

16. The server of claim 10, wherein the at least one processor is further operable to execute the one or more instructions to:
- when an amount of traffic predicted to occur in a particular service is increased, increase a hardware resource of a SC to perform a RAN function corresponding to the particular service, and
- when an amount of traffic predicted to occur in the particular service is decreased, decrease the hardware resource of the SC to perform the RAN function corresponding to the particular service.

17. The server of claim 10, wherein the RAN function includes at least one of a physical (PHY) layer function, a medium access control (MAC) layer function, a radio link control (RLC) layer function, or a packet data convergence protocol (PDCP) layer function.

18. The server of claim 10, wherein the SCs comprises at least one of a container or a virtual machine (VM).

19. A computer program product comprising a non-transitory, computer-readable recording medium having recorded thereon a program, which when executed by a server, causes the server to perform a method of performing at least a part of a radio access network (RAN) function, wherein the RAN function communicates with a core network entity via a backhaul, the method comprising:
- obtaining traffic processing information via a fronthaul for a plurality of services having different requirements for at least one of data transmission rate, latency, or maximum connection density, wherein the traffic processing information includes information about traffic that occurred from the plurality of services, and information about at least one hardware resource used for processing the traffic at software components (SCs) virtualizing the RAN function;
- identifying an amount of traffic that occurred in the RAN function for a service among the plurality of services based on the traffic processing information;
- predicting amount of traffic to occur in the RAN function for the service based on the identified amount of the traffic that occurred in the RAN function; and
- adjusting the at least one hardware resource for the SCs or a number of SCs allocated to the RAN function, based on the predicted amount of traffic, for processing the traffic predicted to occur in the RAN function.

* * * * *